US012761599B2

(12) United States Patent
Gofuku et al.

(10) Patent No.: US 12,761,599 B2
(45) Date of Patent: Oct. 13, 2026

(54) CARTRIDGE AND IMAGE FORMING APPARATUS

(71) Applicant: CANON KABUSHIKI KAISHA, Tokyo (JP)

(72) Inventors: Shuichi Gofuku, Shizuoka (JP); Takashi Kimura, Tokyo (JP); Tetsuo Uesugi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/911,424

(22) Filed: Oct. 10, 2024

(65) Prior Publication Data

US 2025/0123589 A1 Apr. 17, 2025

(30) Foreign Application Priority Data

Oct. 13, 2023 (JP) ................................ 2023-177813

(51) Int. Cl.
*G03G 21/10* (2006.01)
*G03G 15/08* (2006.01)
(Continued)

(52) U.S. Cl.
CPC ..... *G03G 21/1832* (2013.01); *G03G 15/0886* (2013.01); *G03G 21/0005* (2013.01);
(Continued)

(58) Field of Classification Search
CPC ........... G03G 15/0886; G03G 21/0005; G03G 21/102; G03G 21/12; G03G 21/1676; G03G 21/1814; G03G 21/1832
See application file for complete search history.

(56) References Cited

U.S. PATENT DOCUMENTS 8,270,891 B2 9/2012 Ogashiwa
9,063,501 B2 6/2015 Hirukawa et al.
(Continued)

FOREIGN PATENT DOCUMENTS

JP H06-110358 A 4/1994
JP 2008-242165 A 10/2008
(Continued)

OTHER PUBLICATIONS

Co-pending U.S. Appl. No. 18/980,291, filed Dec. 13, 2024.
Co-pending U.S. Appl. No. 18/987,335, filed Dec. 19, 2024.
Co-pending U.S. Appl. No. 19/010,542, filed Jan. 6, 2025.

*Primary Examiner* — Sophia S Chen
(74) *Attorney, Agent, or Firm* — Venable LLP

(57) ABSTRACT

A cartridge includes a toner accommodating portion provided with an opening through which the toner is received, a shutter rotatable about a rotational axis between a closed position where the shutter closes the opening and an open position where the shutter opens the opening, and a restricting member which includes a first engaging portion extending toward the shutter on a second end portion side of the shutter opposite from a first end portion side of the shutter with respect to a direction of the rotational axis. The restricting member includes a second engaging portion engageable with the shutter so that when the shutter is in the closed position, relative movement of the restricting member to the shutter in a direction from the first end portion toward the second end portion is restricted.

22 Claims, 41 Drawing Sheets

(51) Int. Cl.

| | |
|---|---|
| ***G03G 21/00*** | (2006.01) |
| ***G03G 21/12*** | (2006.01) |
| ***G03G 21/16*** | (2006.01) |
| ***G03G 21/18*** | (2006.01) |

(52) U.S. Cl.

CPC ........... *G03G 21/105* (2013.01); *G03G 21/12* (2013.01); *G03G 21/1676* (2013.01); *G03G 21/1814* (2013.01)

(56) References Cited

U.S. PATENT DOCUMENTS

| | | | |
|---|---|---|---|
| 9,146,500 | B2 | 9/2015 | Uesugi et al. |
| 9,354,553 | B2 | 5/2016 | Yoshida et al. |
| 9,465,318 | B2 | 10/2016 | Takeuchi et al. |
| 9,523,942 | B2 | 12/2016 | Takeuchi et al. |
| 9,529,304 | B2 | 12/2016 | Uesugi et al. |
| 9,665,040 | B2 | 5/2017 | Matsuzaki et al. |
| 9,964,921 | B2 | 5/2018 | Maeshima et al. |
| 9,989,892 | B2 | 6/2018 | Takeuchi et al. |
| 10,175,609 | B2 | 1/2019 | Matsuzaki et al. |
| 10,539,915 | B2 | 1/2020 | Mori et al. |
| 10,613,453 | B2 | 4/2020 | Kimura et al. |
| 10,620,567 | B2 | 4/2020 | Matsuzaki et al. |
| 10,671,013 | B2 | 6/2020 | Uesugi et al. |
| 10,691,063 | B2 | 6/2020 | Maeshima et al. |
| 10,732,545 | B2 | 8/2020 | Takeuchi et al. |
| 10,747,144 | B2 | 8/2020 | Kimura et al. |
| 10,761,472 | B2 | 9/2020 | Kashiide et al. |
| 10,824,106 | B2 | 11/2020 | Mori et al. |
| 10,838,356 | B2 | 11/2020 | Maeshima et al. |
| 10,884,356 | B2 | 1/2021 | Kimura et al. |
| 10,948,871 | B2 | 3/2021 | Uesugi et al. |
| 10,955,796 | B2 | 3/2021 | Uesugi et al. |
| 10,969,730 | B2 | 4/2021 | Sueshige et al. |
| 11,022,934 | B2 | 6/2021 | Kashiide et al. |
| 11,048,207 | B2 | 6/2021 | Kimura et al. |
| 11,061,364 | B2 | 7/2021 | Uesugi et al. |
| 11,061,366 | B2 | 7/2021 | Uesugi et al. |
| 11,061,367 | B2 | 7/2021 | Uesugi et al. |
| 11,061,368 | B2 | 7/2021 | Uesugi et al. |
| 11,067,942 | B2 | 7/2021 | Uesugi et al. |
| 11,067,947 | B2 | 7/2021 | Uesugi et al. |
| 11,067,948 | B2 | 7/2021 | Uesugi et al. |
| 11,073,790 | B2 | 7/2021 | Uesugi et al. |
| 11,073,791 | B2 | 7/2021 | Uesugi et al. |
| 11,150,591 | B2 | 10/2021 | Mori et al. |
| 11,256,209 | B2 | 2/2022 | Kimura et al. |
| 11,314,201 | B2 | 4/2022 | Maeshima et al. |
| 11,320,782 | B2 | 5/2022 | Maeshima et al. |
| 11,334,023 | B2 | 5/2022 | Uesugi et al. |
| 11,360,408 | B2 | 6/2022 | Kimura et al. |
| 11,366,409 | B2 | 6/2022 | Kimura et al. |
| 11,409,227 | B2 | 8/2022 | Uesugi et al. |
| 11,435,693 | B2 | 9/2022 | Uesugi et al. |
| 11,442,404 | B2 | 9/2022 | Uesugi et al. |
| 11,442,405 | B2 | 9/2022 | Uesugi et al. |
| 11,506,993 | B2 | 11/2022 | Kimura et al. |
| 11,609,530 | B2 | 3/2023 | Kashiide et al. |
| 11,650,536 | B2 | 5/2023 | Kashiide et al. |
| 11,669,044 | B2 | 6/2023 | Kimura et al. |
| 11,687,029 | B2 | 6/2023 | Maeshima et al. |
| 11,703,793 | B2 | 7/2023 | Kashiide et al. |
| 11,709,453 | B2 | 7/2023 | Kashiide et al. |
| 11,714,374 | B2 | 8/2023 | Kashiide et al. |
| 11,733,636 | B2 | 8/2023 | Mori et al. |
| 11,762,330 | B2 | 9/2023 | Uesugi et al. |
| 11,815,830 | B2 | 11/2023 | Matsuzaki et al. |
| 11,829,096 | B2 | 11/2023 | Ozaki et al. |
| 12,078,952 | B2 | 9/2024 | Kashiide et al. |
| 12,117,764 | B2 | 10/2024 | Kimura et al. |
| 12,124,211 | B2 | 10/2024 | Uesugi et al. |
| 12,130,581 | B2 | 10/2024 | Maeshima et al. |
| 12,164,259 | B2 | 12/2024 | Kashiide et al. |
| 12,174,582 | B2 | 12/2024 | Maeshima et al. |
| 12,210,311 | B2 | 1/2025 | Ozaki et al. |
| 2008/0240779 | A1 | 10/2008 | Ogashiwa |
| 2014/0376963 | A1* | 12/2014 | Suzuki ............... G03G 15/0886 399/123 |
| 2014/0376972 | A1* | 12/2014 | Kawarago .......... G03G 15/0886 399/260 |
| 2023/0418209 | A1 | 12/2023 | Maeda et al. |
| 2023/0418219 | A1 | 12/2023 | Harada et al. |
| 2023/0418221 | A1 | 12/2023 | Kashiide et al. |
| 2024/0004342 | A1 | 1/2024 | Kashiide et al. |
| 2024/0036495 | A1 | 2/2024 | Matsuzaki et al. |
| 2024/0310779 | A1 | 9/2024 | Uesugi et al. |
| 2024/0369967 | A1 | 11/2024 | Maeshima et al. |
| 2024/0369968 | A1 | 11/2024 | Maeshima et al. |

FOREIGN PATENT DOCUMENTS

| | | |
|---|---|---|
| JP | 2010-139580 A | 6/2010 |
| JP | 2013-246341 A | 12/2013 |

* cited by examiner (a)

(b)

CARTRIDGE AND IMAGE FORMING APPARATUS

FIELD OF THE INVENTION AND RELATED ART

The present invention relates to a cartridge for use with an image forming apparatus, and the image forming apparatus including the cartridge.

In Japanese Laid-Open Patent Application No. 2013-246341 discloses a collecting tank which is detachably mountable to a main assembly of an image forming apparatus and which is for collecting residual toner (waste toner), in which a receiving opening for the residual toner and a cap portion for sealing the receiving opening are provided.

SUMMARY OF THE INVENTION

A principal object of the present invention is to provide a new form of a cartridge provided with a shutter for opening and closing an opening and a new form of an image forming apparatus including the cartridge.

According to an aspect of the present invention, there is provided a cartridge comprising: a toner accommodating portion configured to accommodate toner and provided with an opening through which the toner is received; a shutter rotatable about a rotational axis between a closed position where the shutter closes the opening and an open position where the shutter opens the opening, the shutter including a first end portion and a second end portion opposite from the first end portion with respect to a direction of the rotational axis; and a restricting member which includes a first engaging portion extending toward the shutter on a second end portion side and which is movable between an engaging position where the first engaging portion engages with the shutter so as to restrict rotation of the shutter from the closed position to the open position and a disengaging position where engagement between the first engaging portion and the shutter is released so that the rotation of the shutter from the closed position to the open position is permitted, wherein the restricting member includes a second engaging portion engageable with the shutter so that when the shutter is in the closed position, relative movement of the restricting member to the shutter in a direction from the first end portion toward the second end portion is restricted.

Further features of the present invention will become apparent from the following description of exemplary embodiments with reference to the attached drawings.

Figure 7:
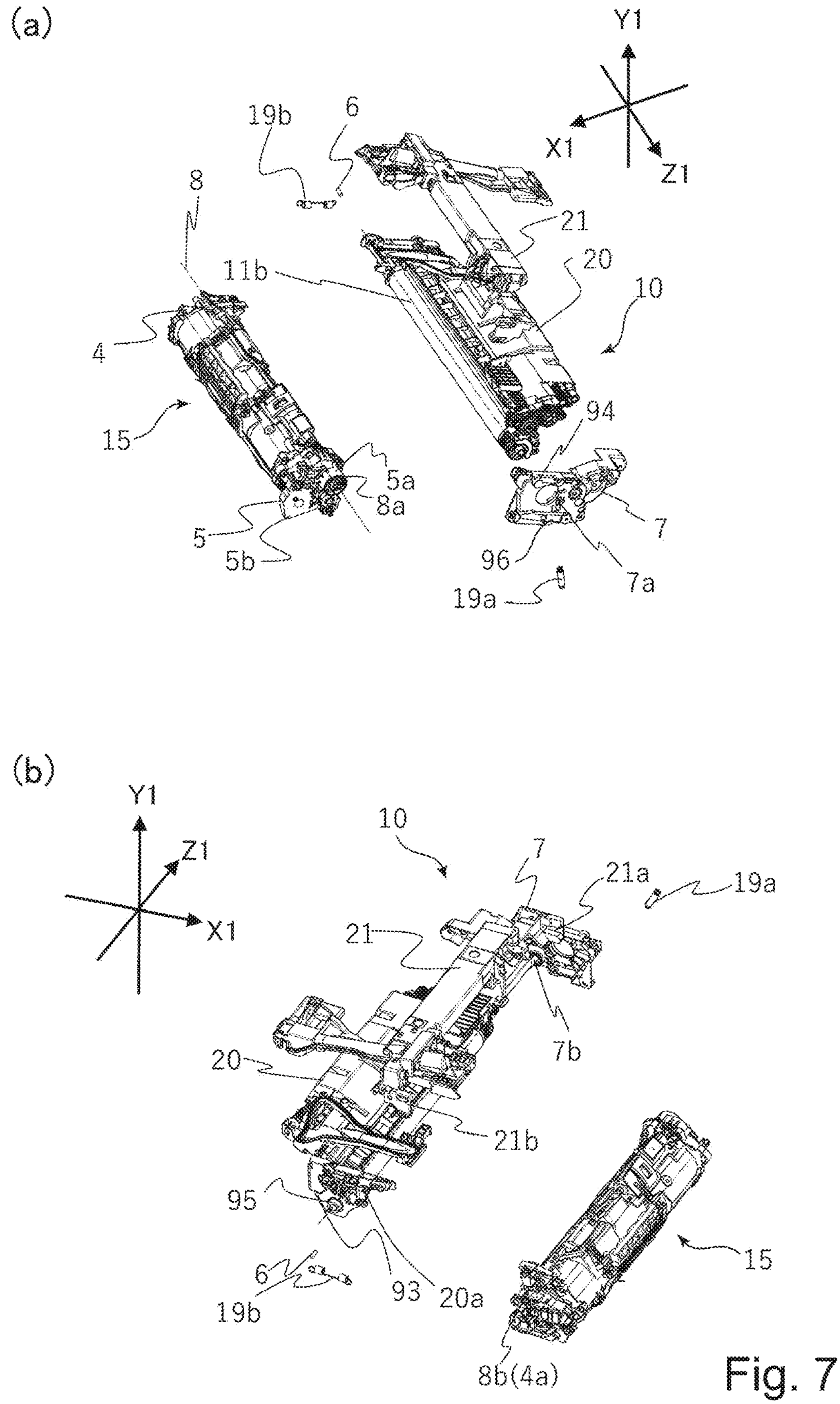

Parts (a) and (b) of FIG. 7 are exploded views of the process cartridge according to the embodiment.

Figure 8:
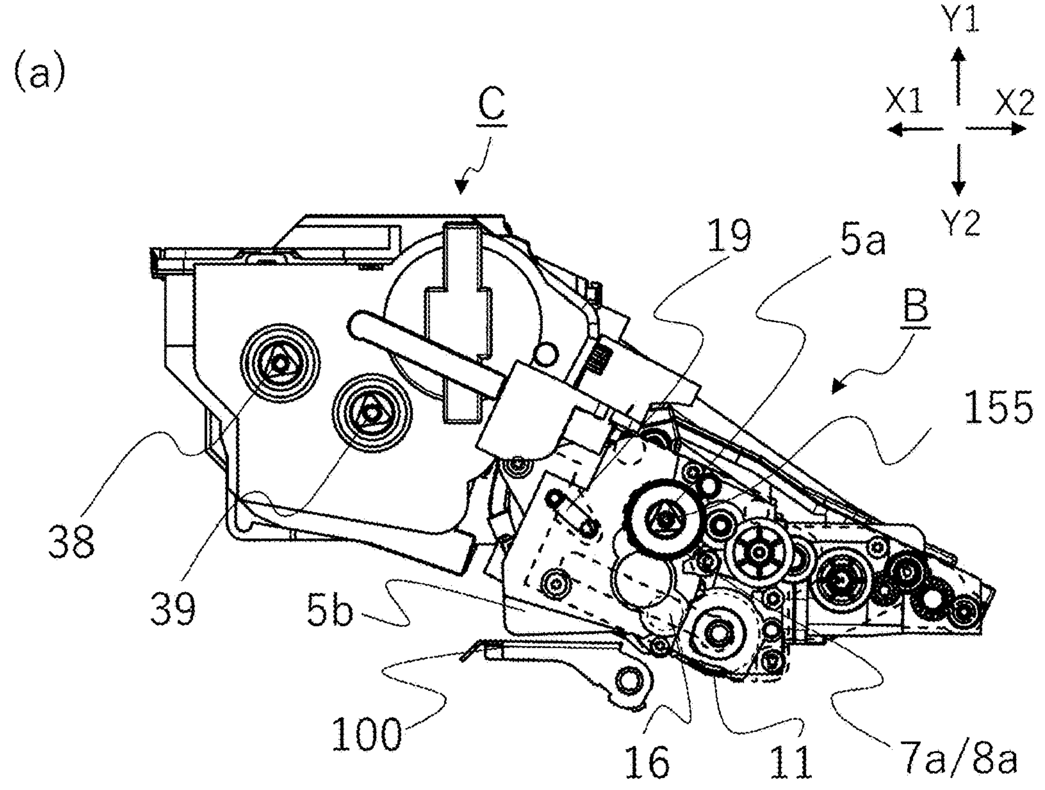
Figure 8:
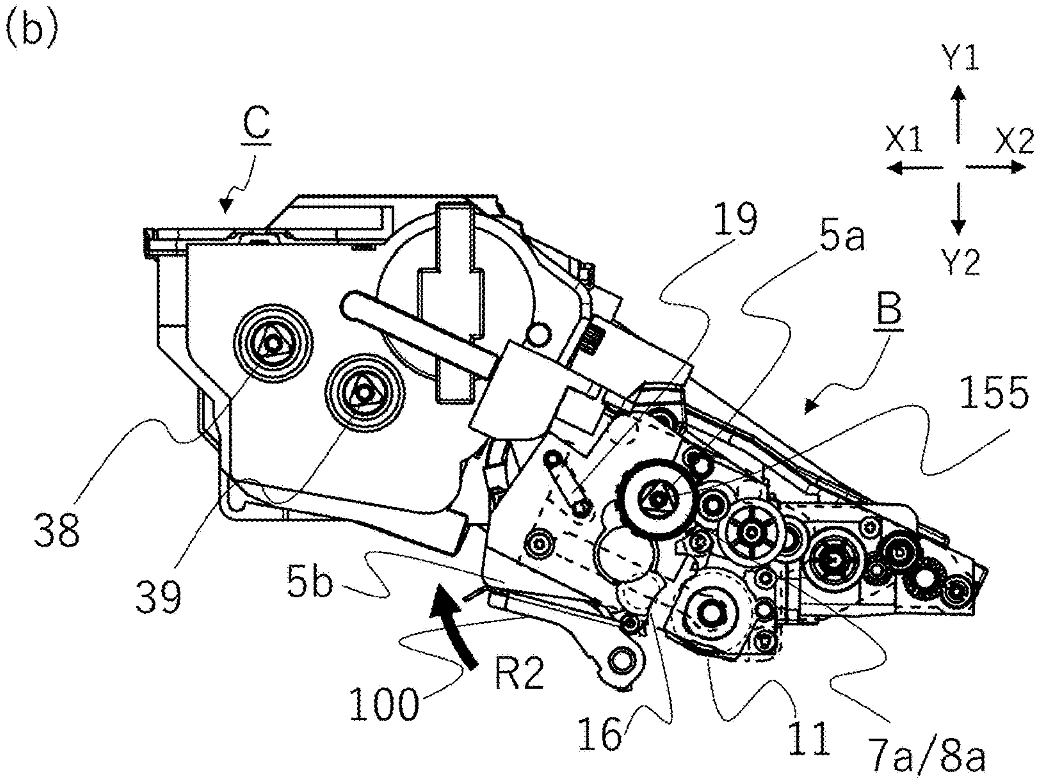

Parts (a) and (b) of FIG. 8 are illustrations of the process cartridge according to the embodiment.

Figure 9:
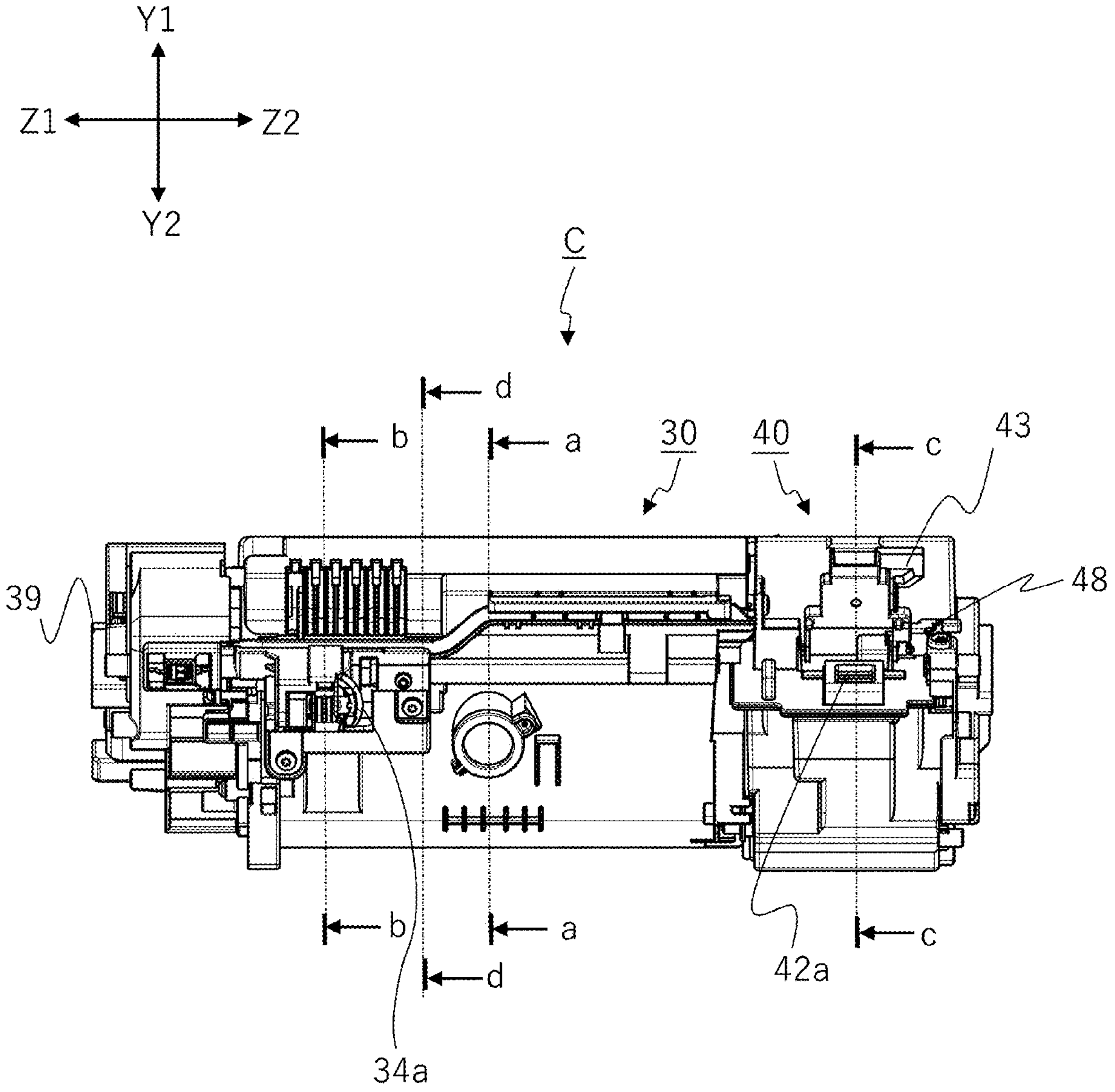

FIG. 9 is a front view of a toner cartridge according to the embodiment.

Figure 10:
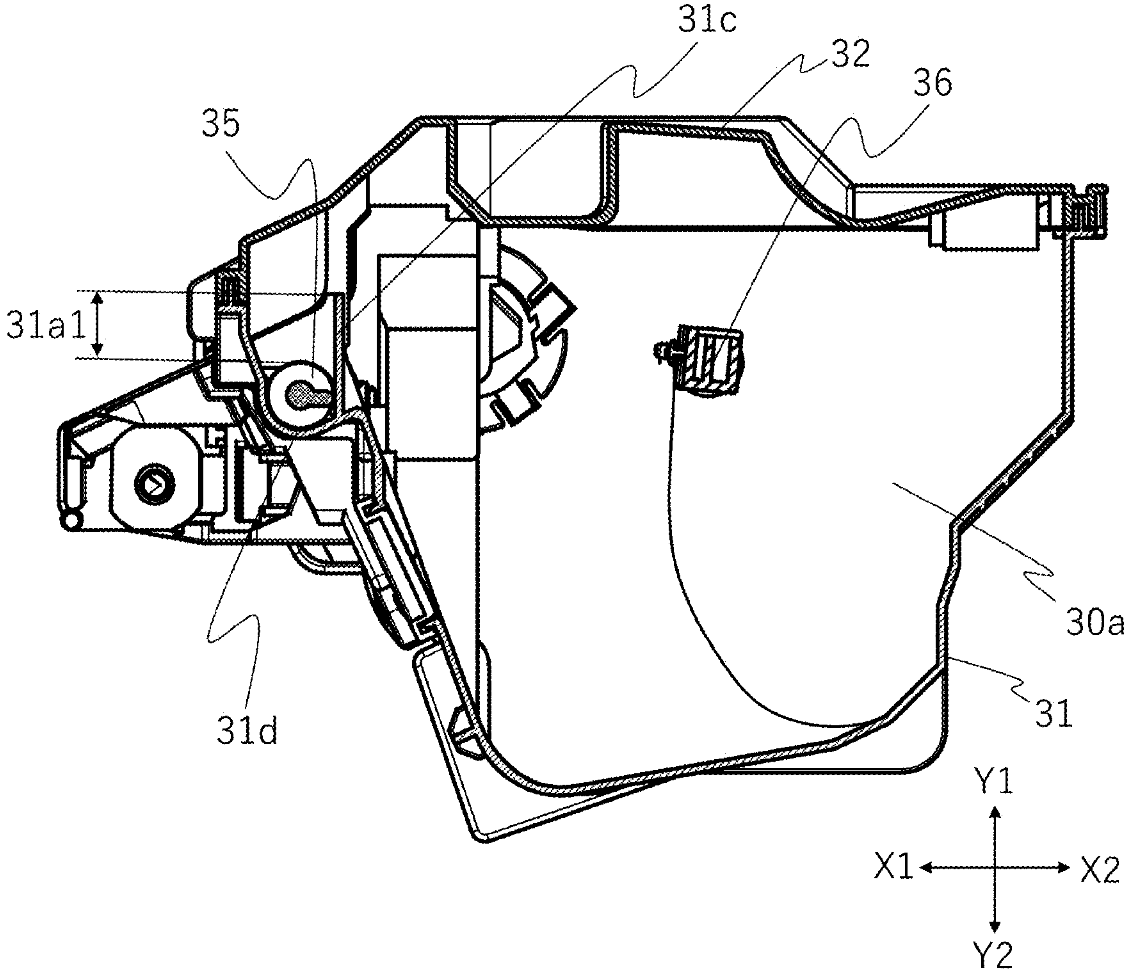

FIG. 10 is a sectional view of the toner cartridge according to the embodiment.

Figure 11:
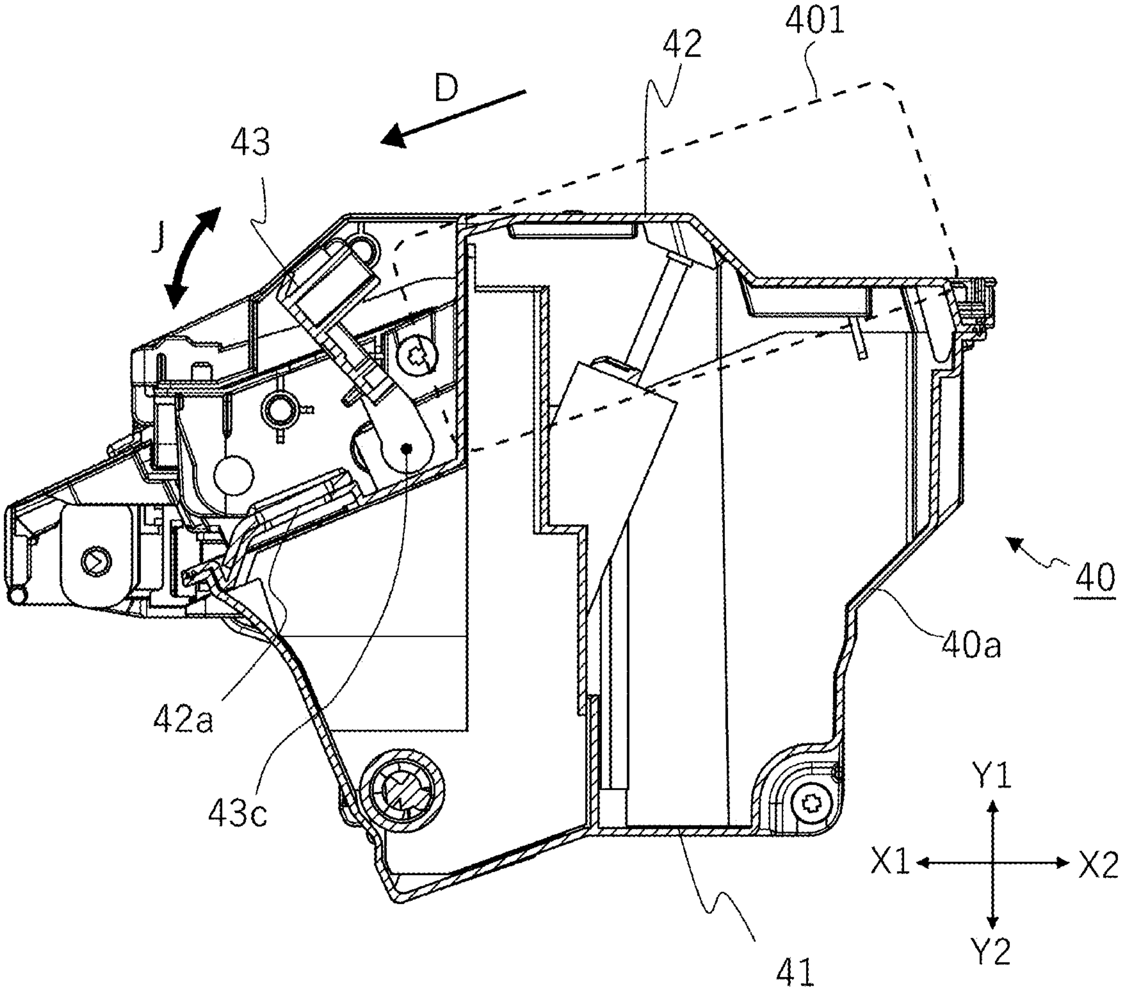

FIG. 11 is a sectional view of the toner cartridge according to the embodiment.

Figure 12:
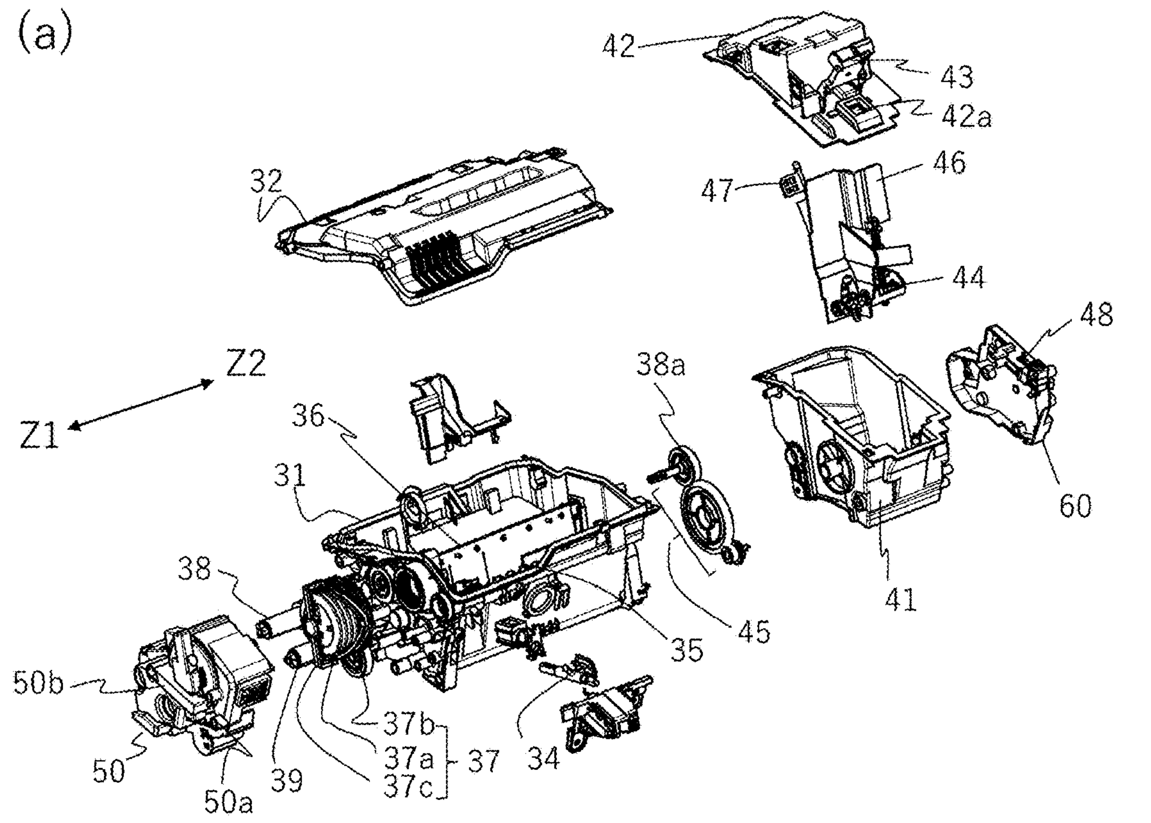
Figure 12:
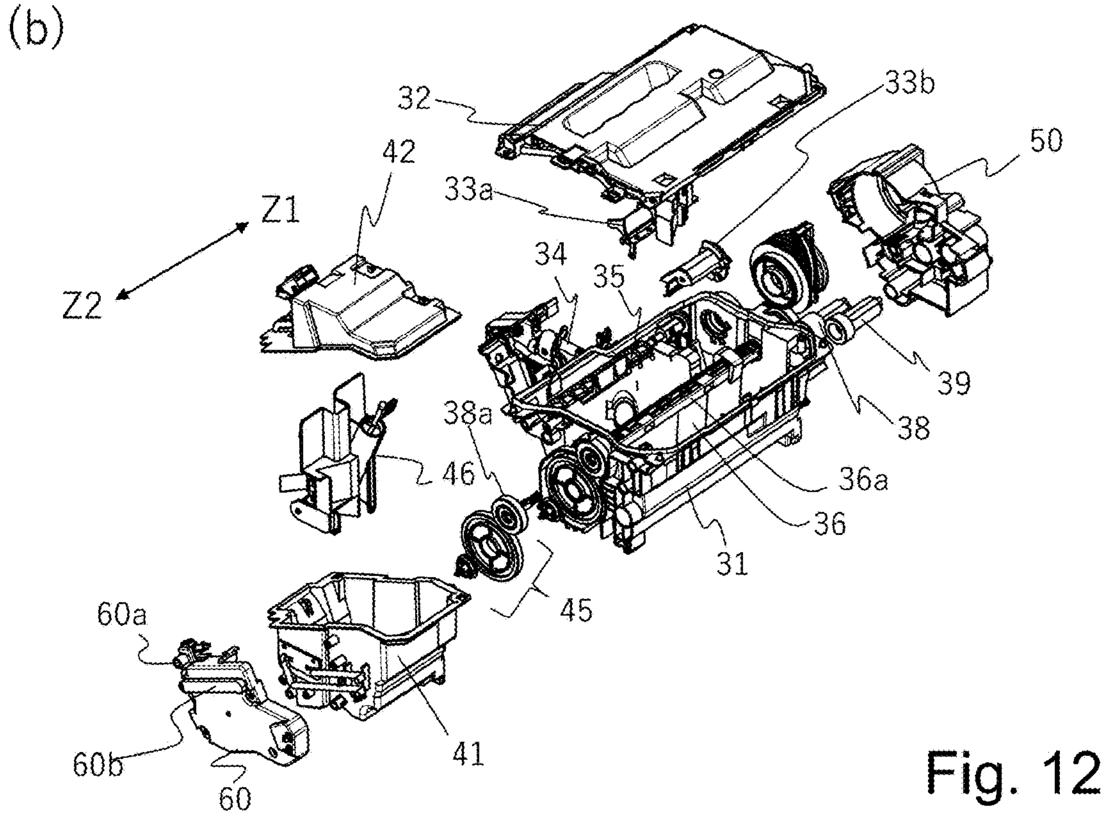

Parts (a) and (b) of FIG. 12 are exploded views of the toner cartridge according to the embodiment.

Figure 13:
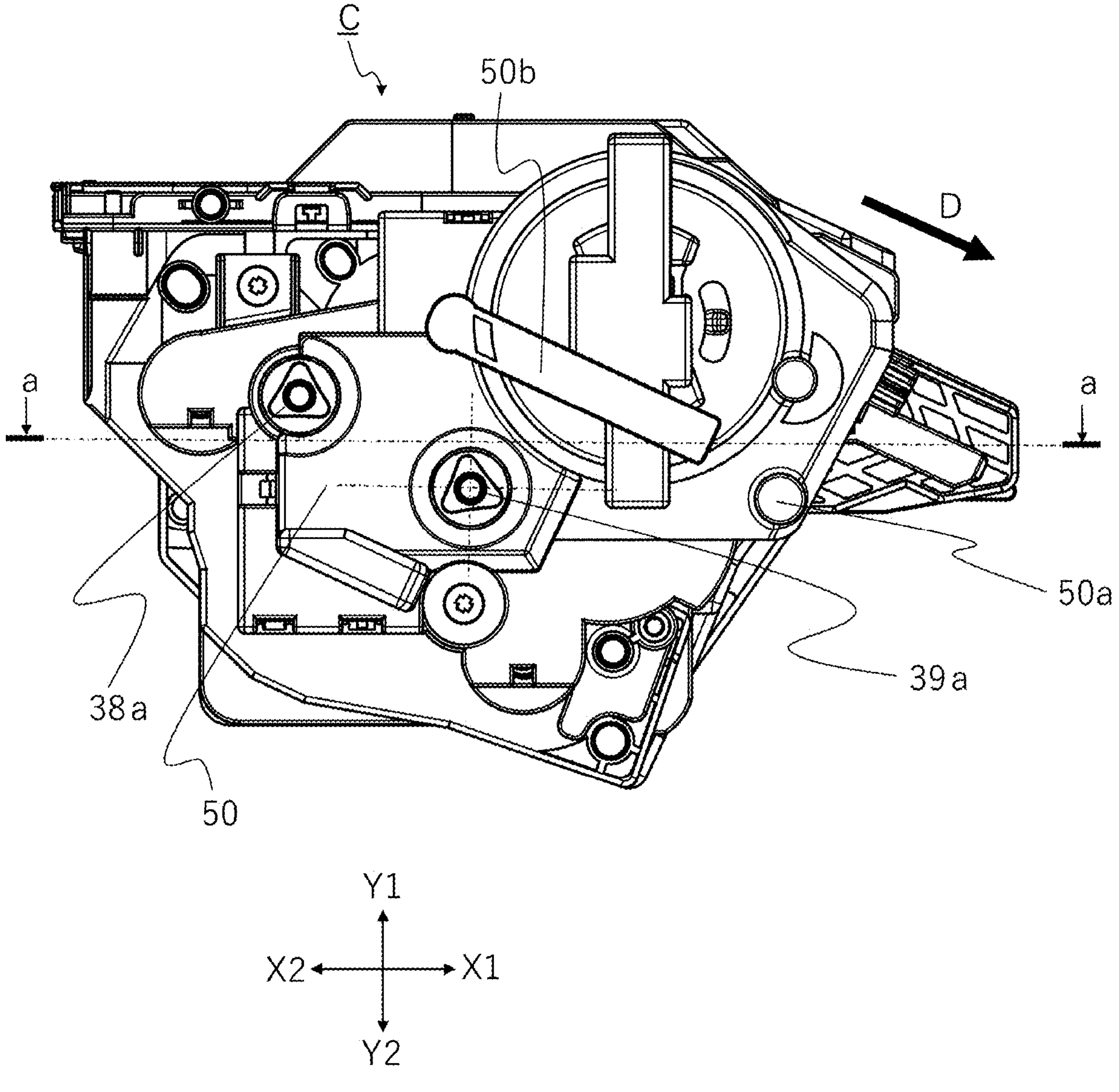

FIG. 13 is a side view of the toner cartridge according to the embodiment.

Figure 14:
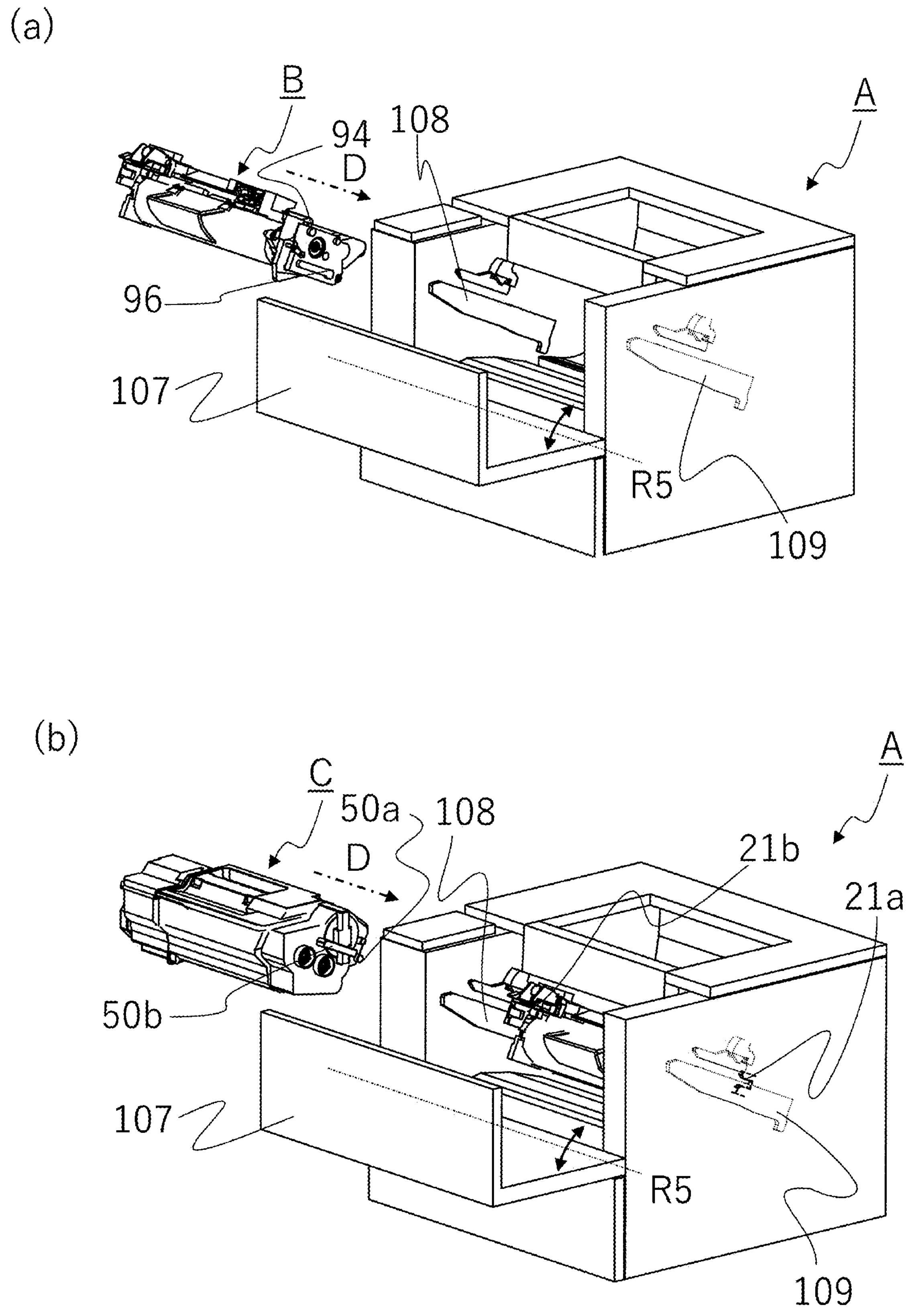

Parts (a) and (b) of FIG. 14 are illustrations of the image forming apparatus according to the embodiment.

Figure 15:
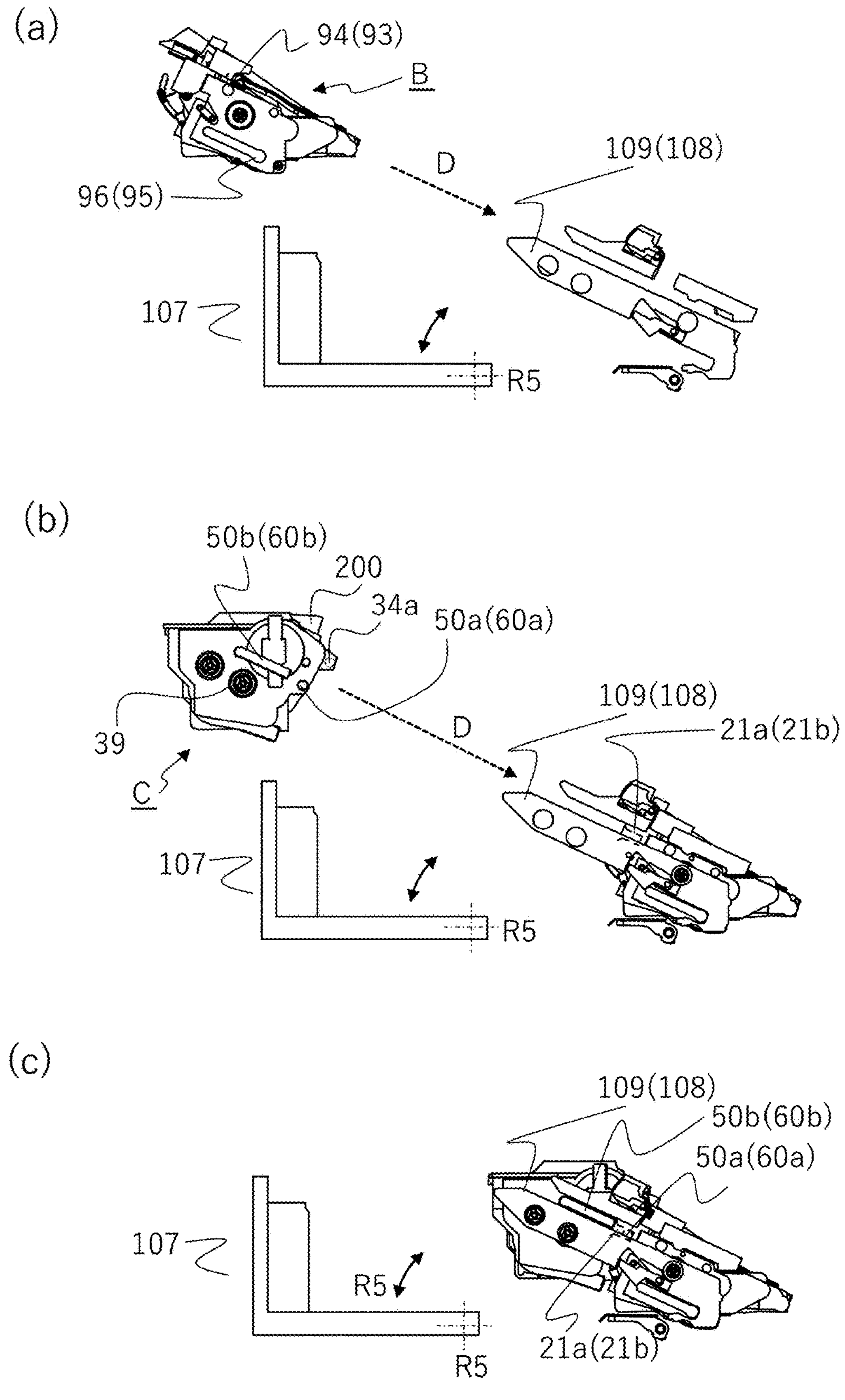

Parts (a) to (c) of FIG. 15 are illustrations of the image forming apparatus according to the embodiment.

Figure 16:
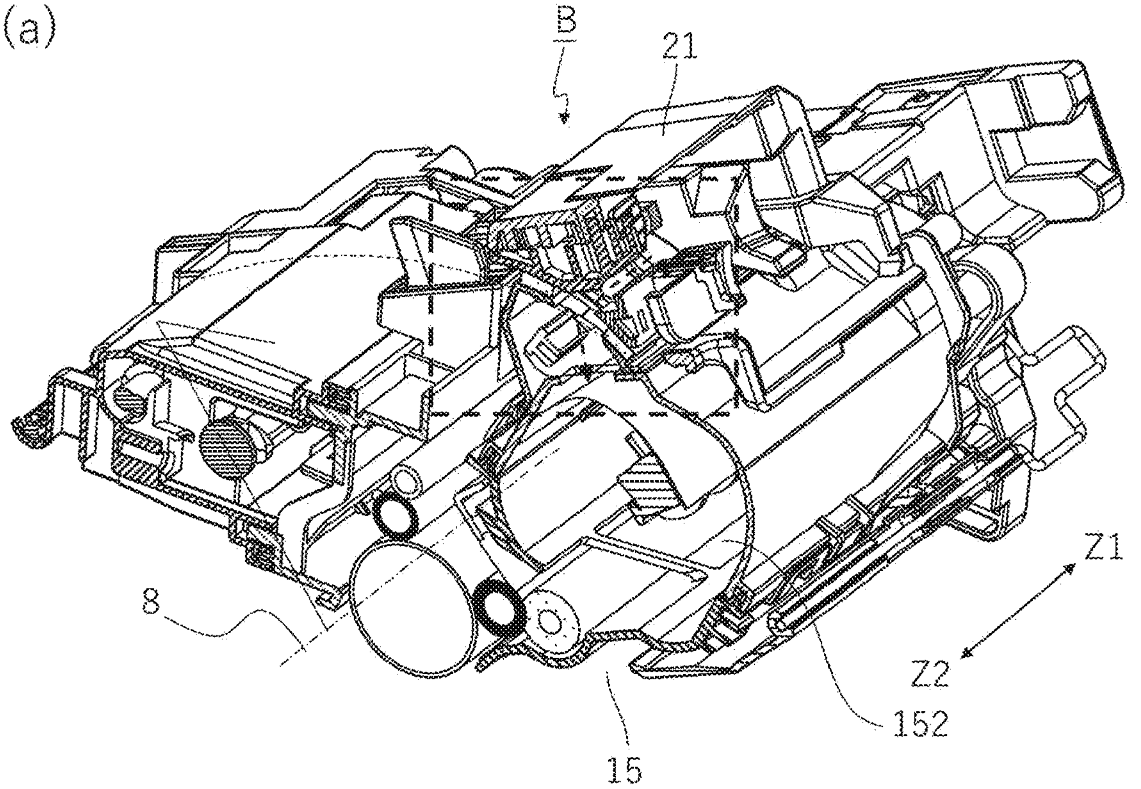
Figure 16:
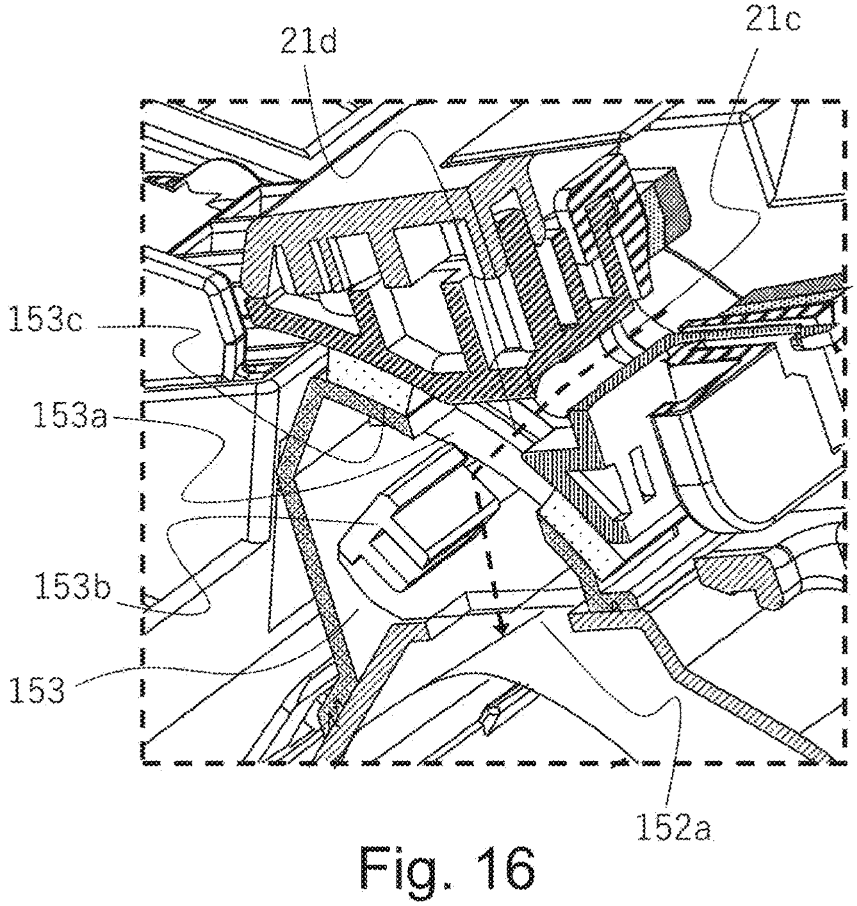

Parts (a) and (b) of FIG. 16 are perspective views showing a cross section of the process cartridge according to the embodiment.

Figure 17:
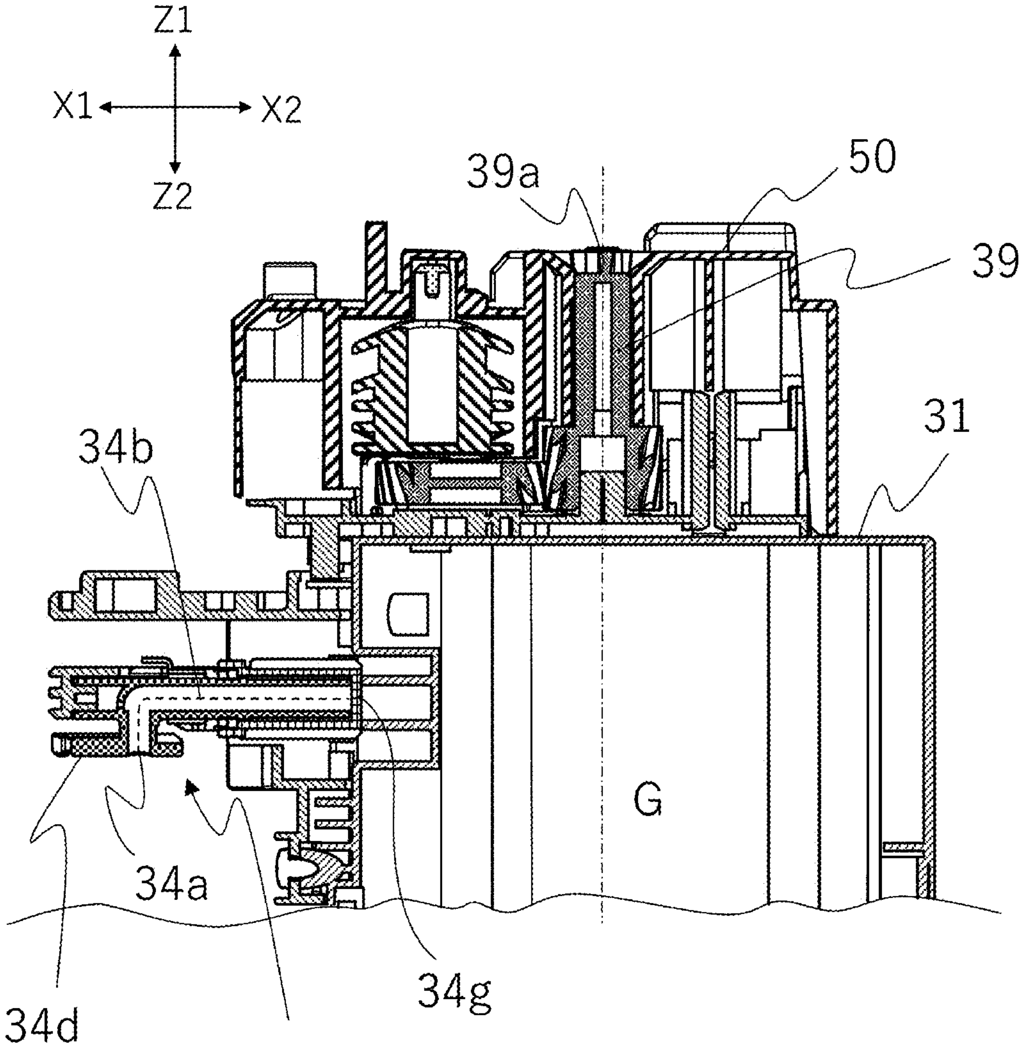

FIG. 17 is a sectional view of the toner cartridge according to the embodiment.

Figure 18:
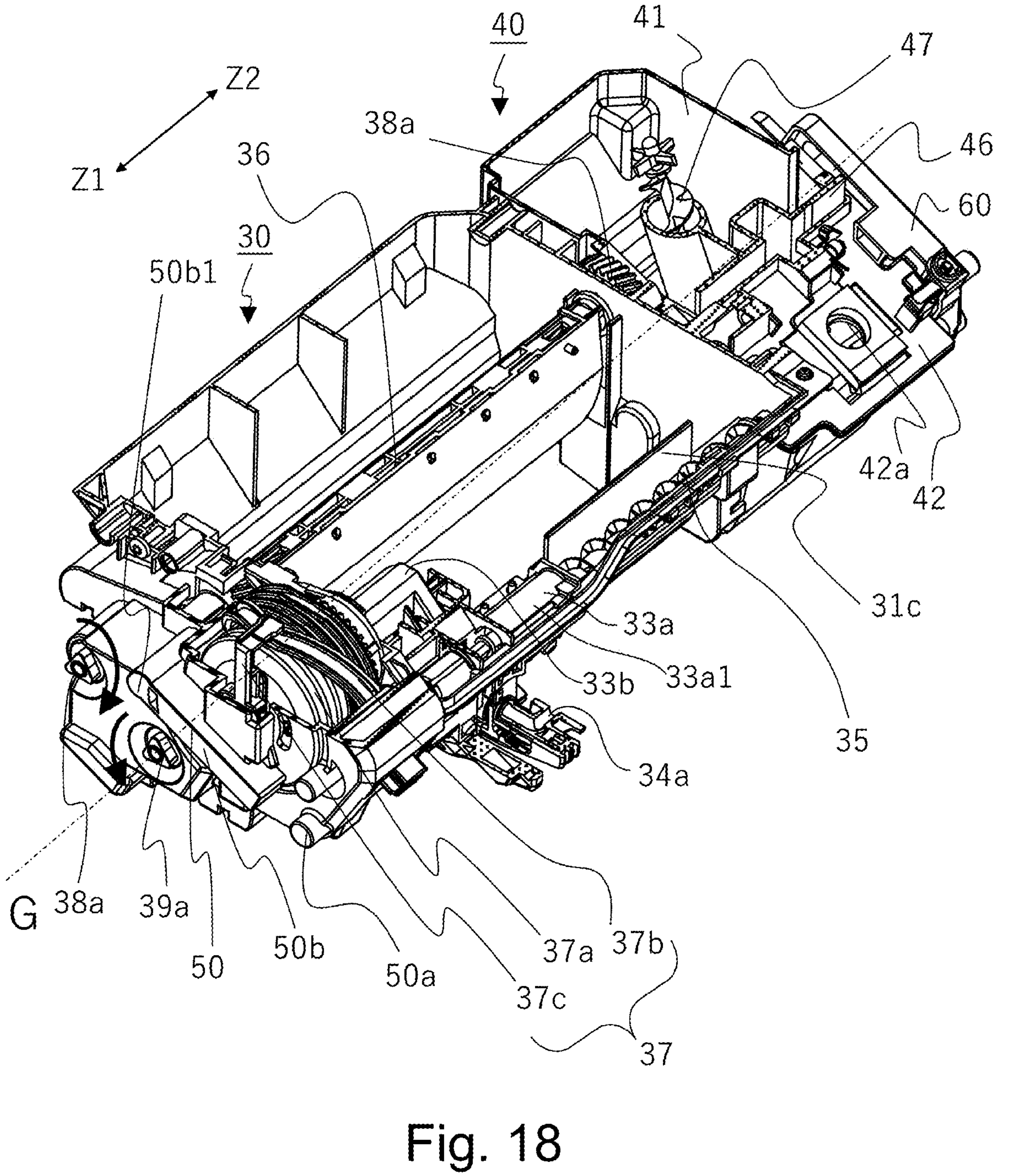

FIG. 18 is an illustration of the toner cartridge according to the embodiment.

Figure 19:
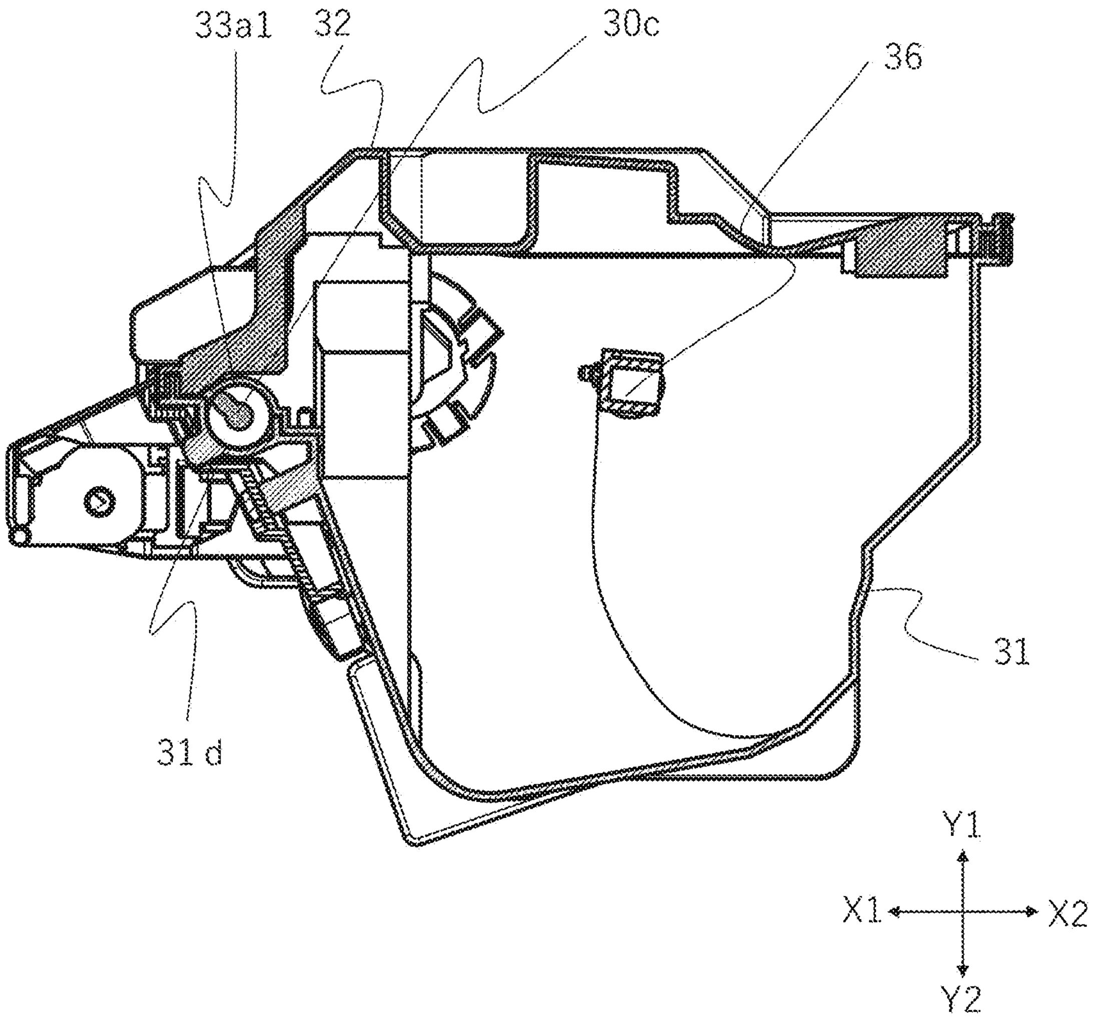

FIG. 19 is a sectional view of the toner cartridge according to the embodiment.

Figure 20:
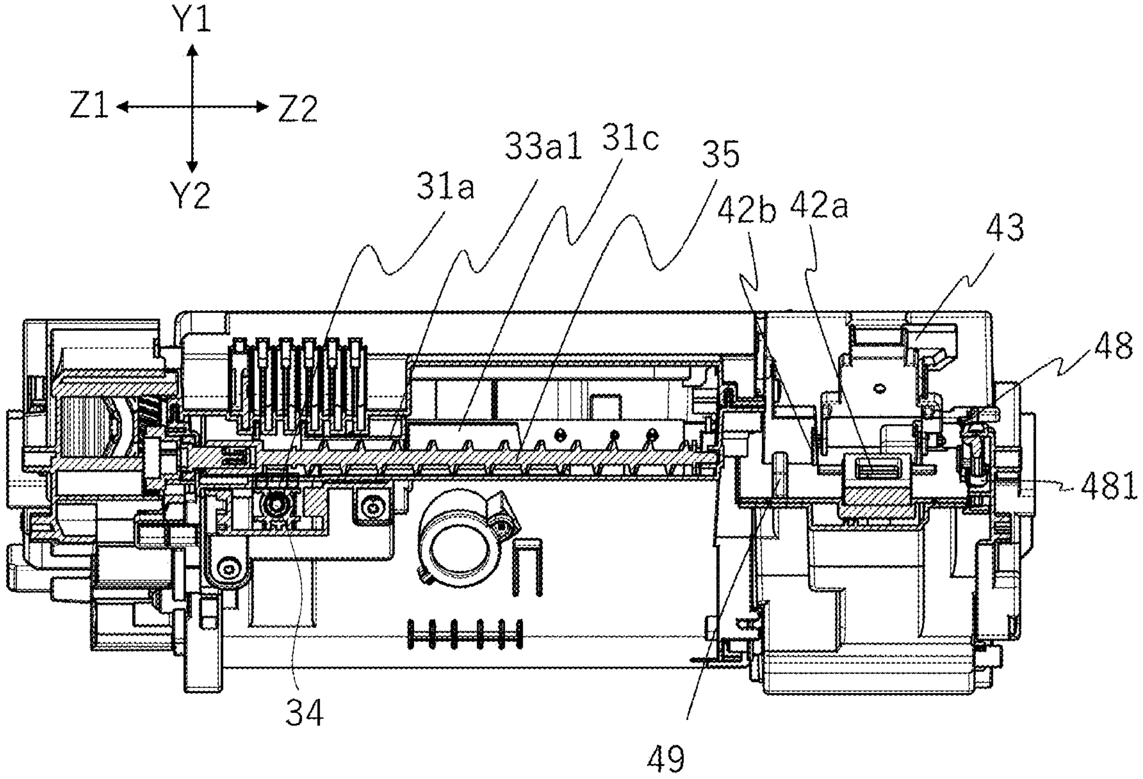

FIG. 20 is a sectional view of the toner cartridge according to the embodiment.

Figure 21:
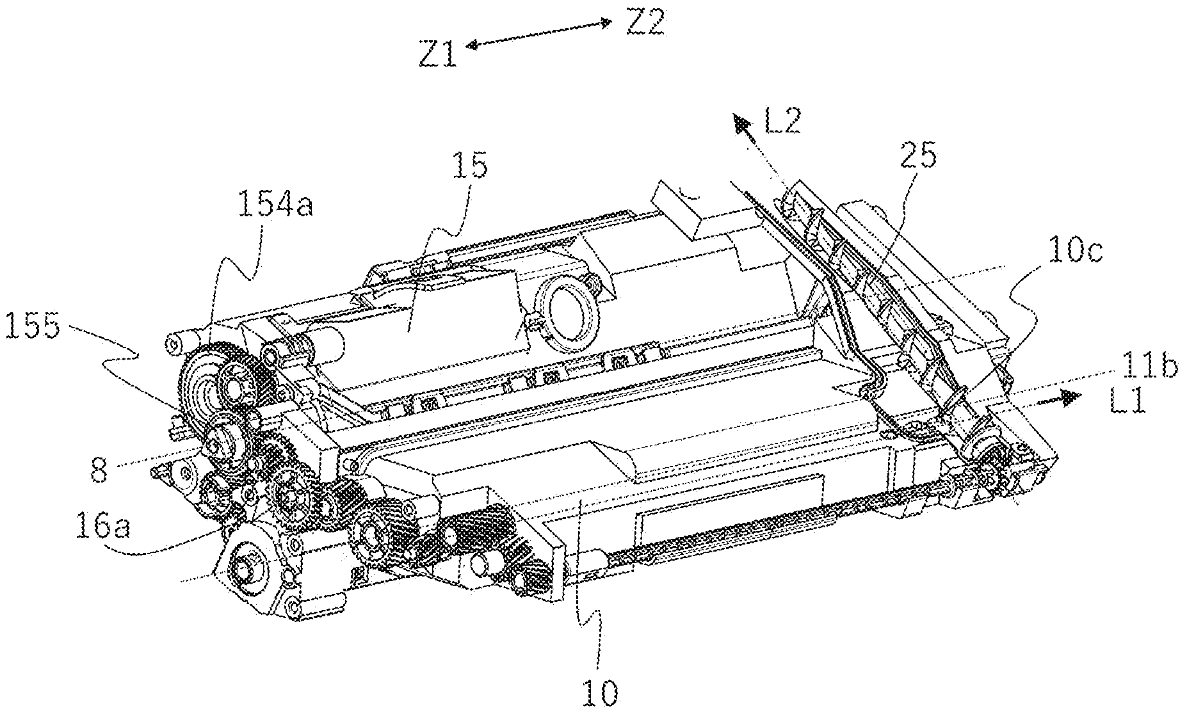

FIG. 21 is a perspective view of the process cartridge according to the embodiment.

Figure 22:
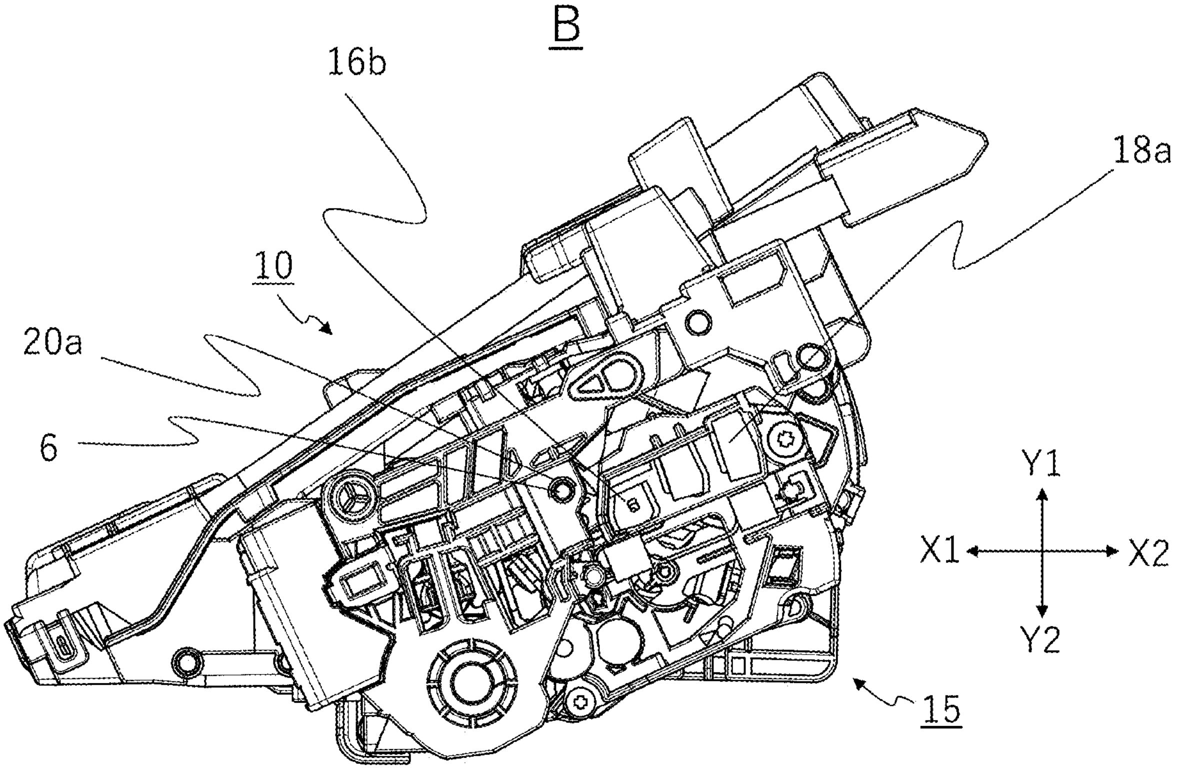

FIG. 22 is a side view of the process cartridge according to the embodiment.

Figure 23:
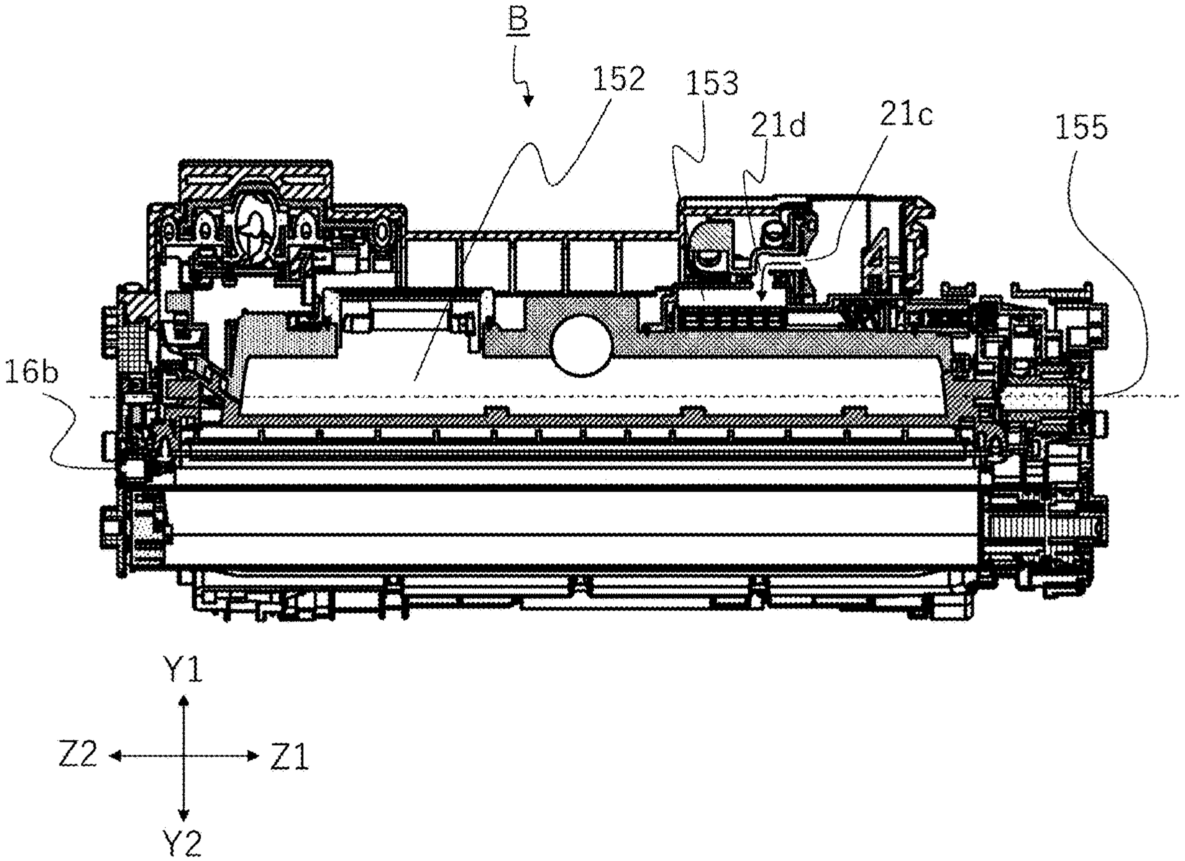

FIG. 23 is a sectional view of the process cartridge according to the embodiment.

Figure 24:
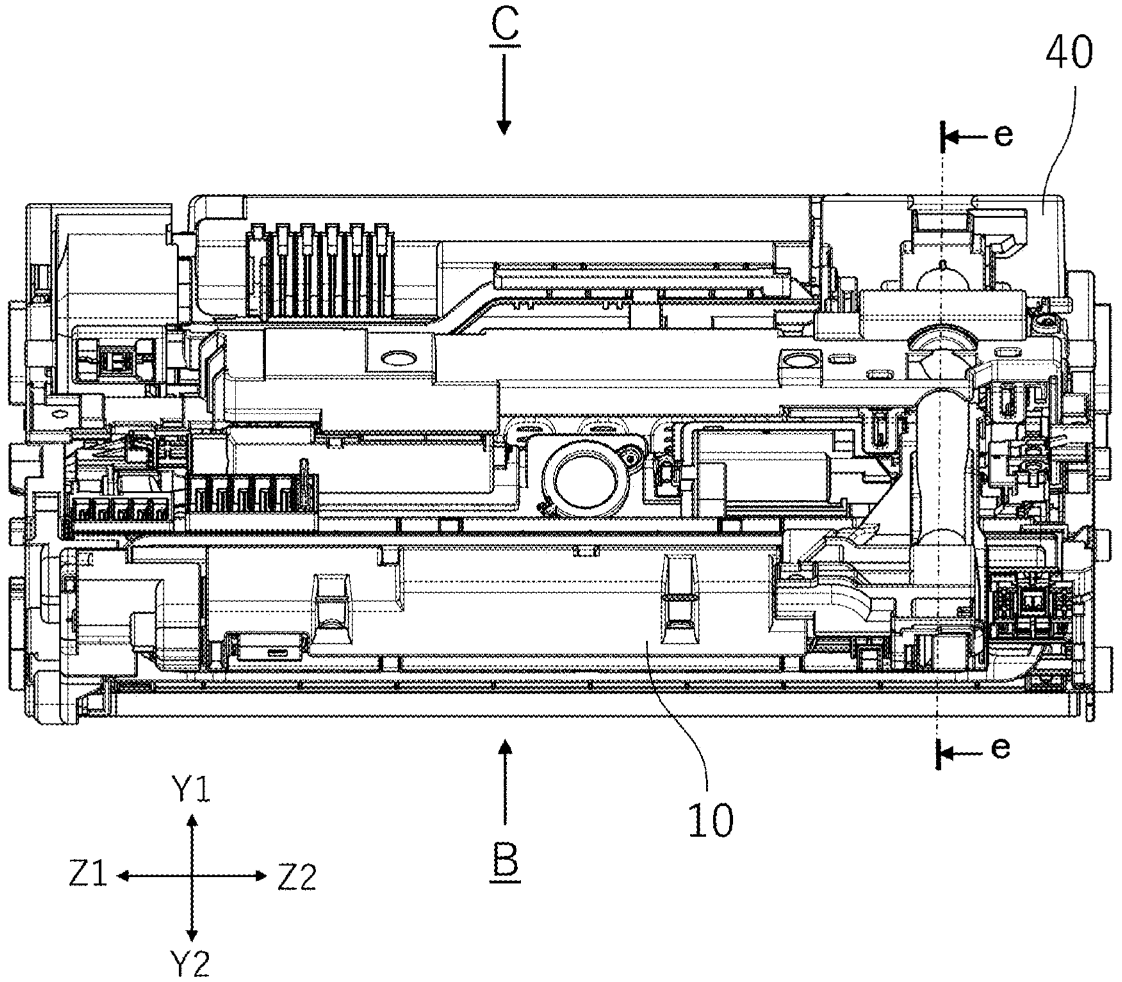

FIG. 24 is an illustration of the process cartridge and the toner cartridge according to the embodiment.

Figure 25:
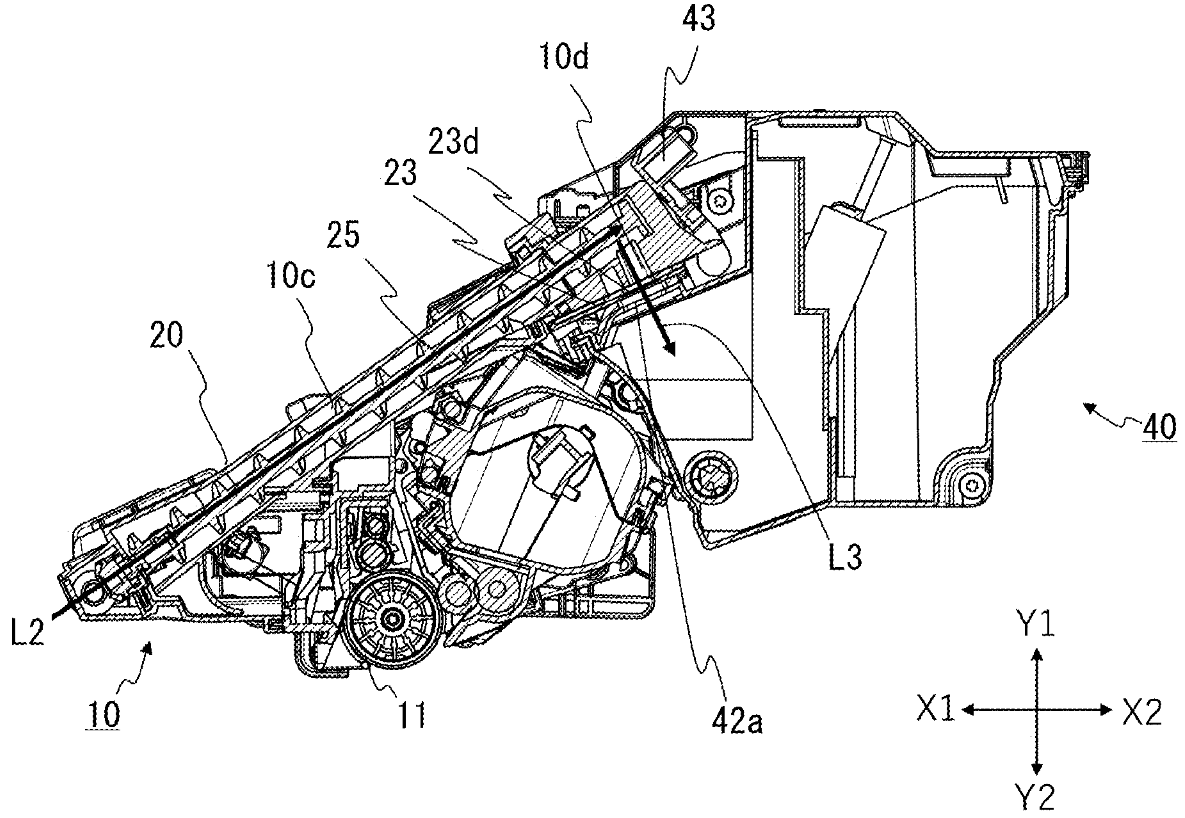

FIG. 25 is an illustration of the process cartridge and the toner cartridge according to the embodiment.

Figure 26:
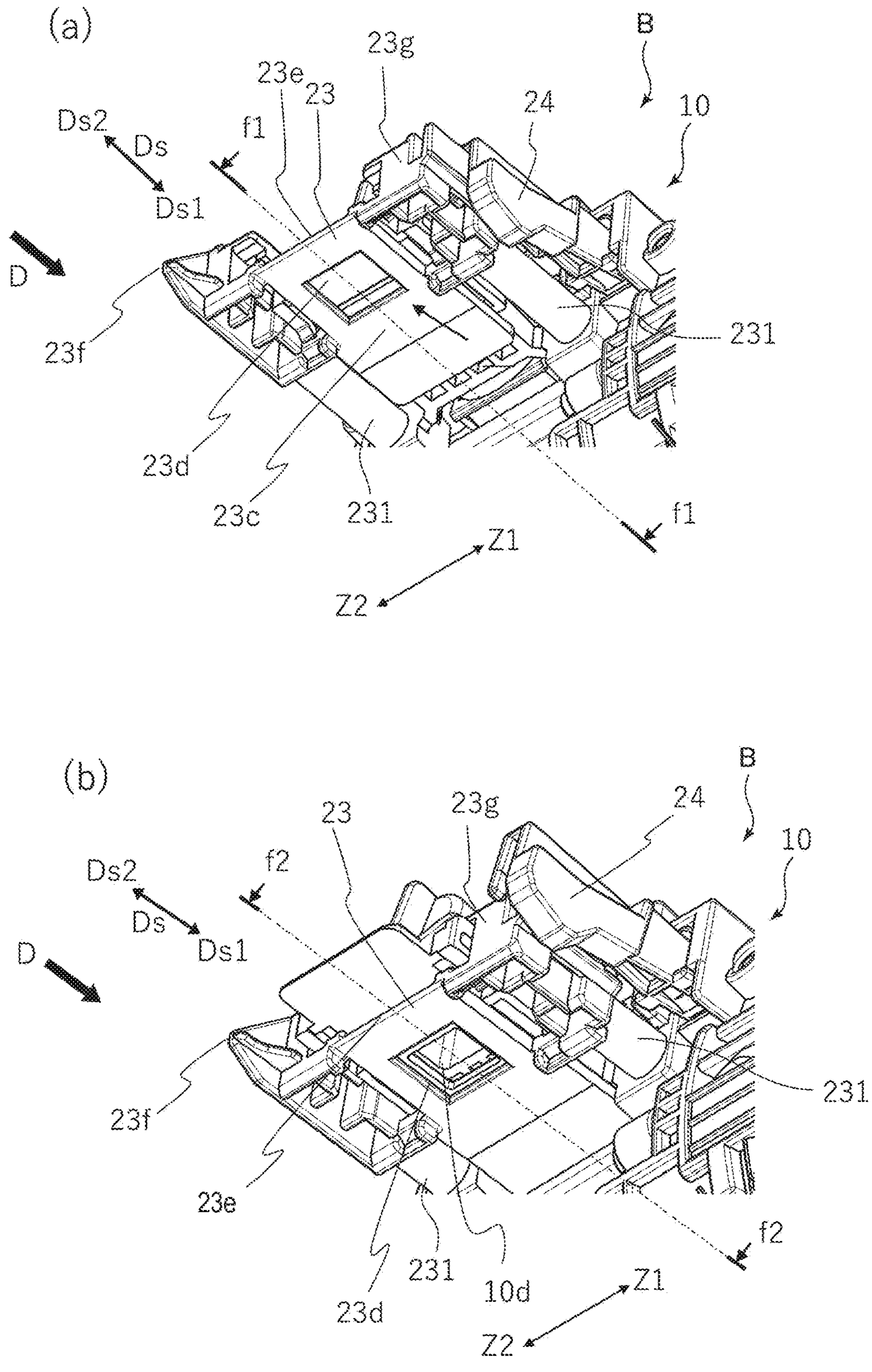

Parts (a) and (b) of FIG. 26 are illustrations of a discharge opening shutter in the embodiment.

Figure 27:
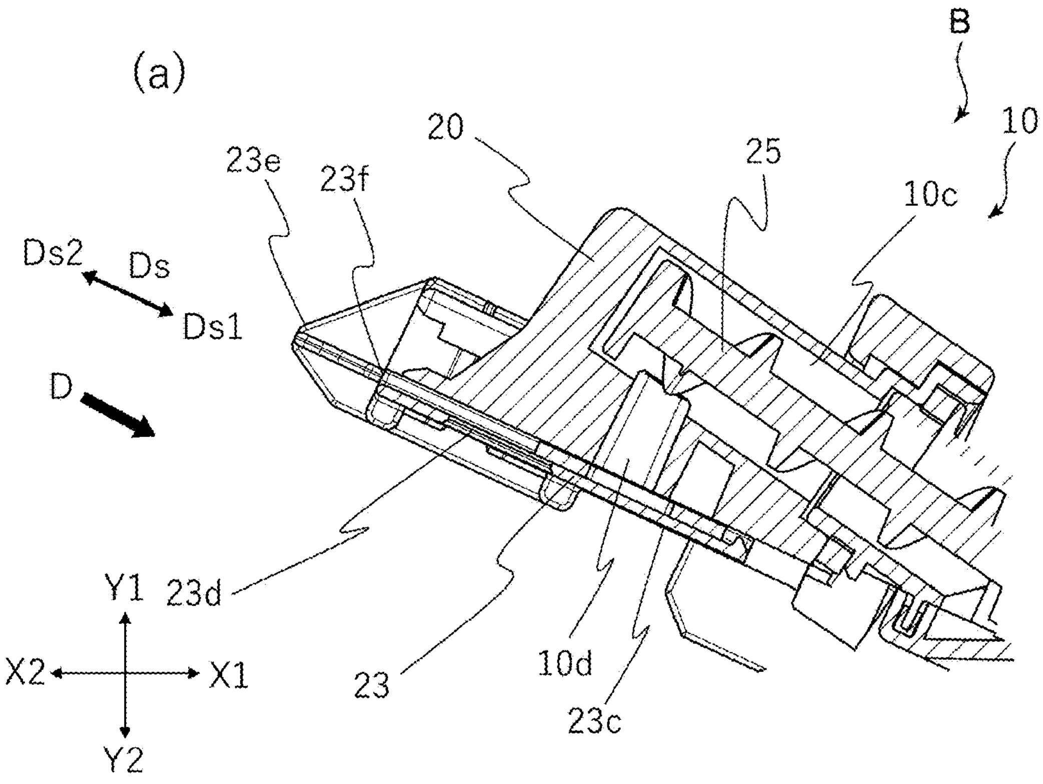
Figure 27:
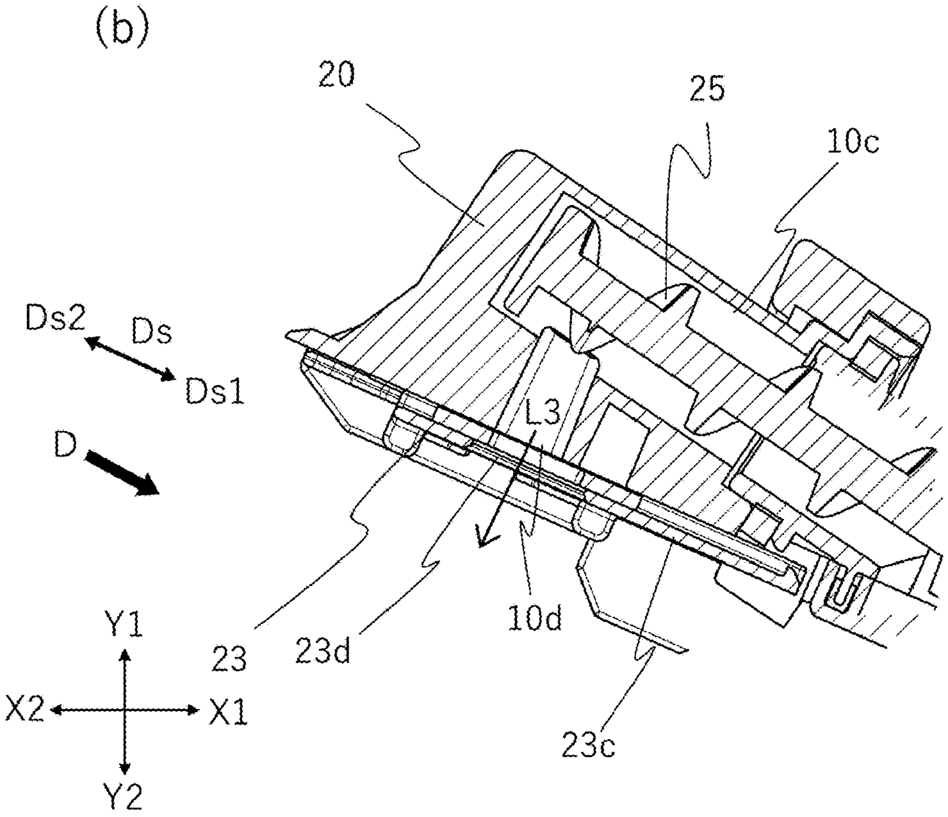

Parts (a) and (b) of FIG. 27 are illustrations of the discharge opening shutter in the embodiment.

Figure 28:
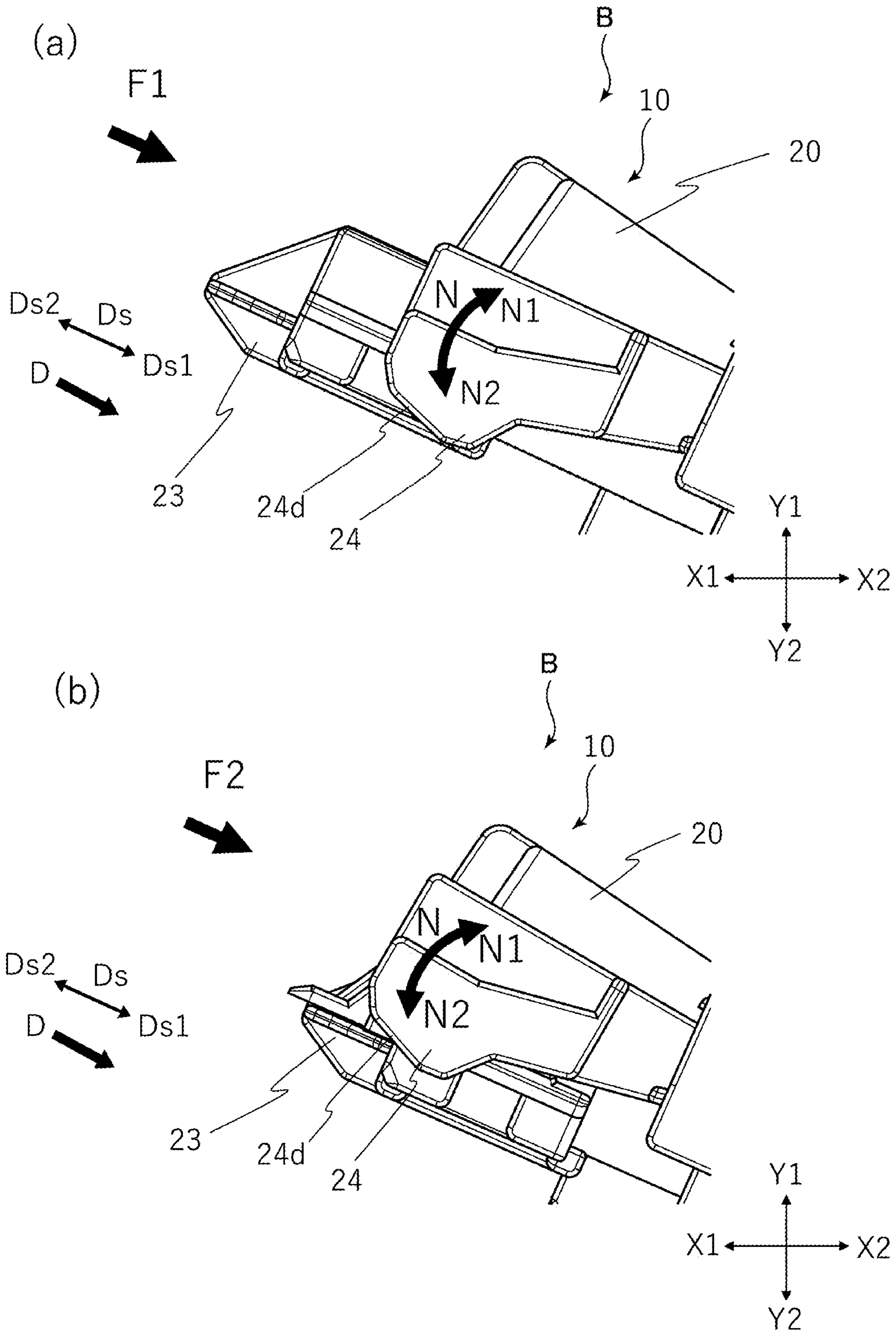

Parts (a) and (b) of FIG. 28 are illustrations of a discharge opening lock in the embodiment.

Figure 29:
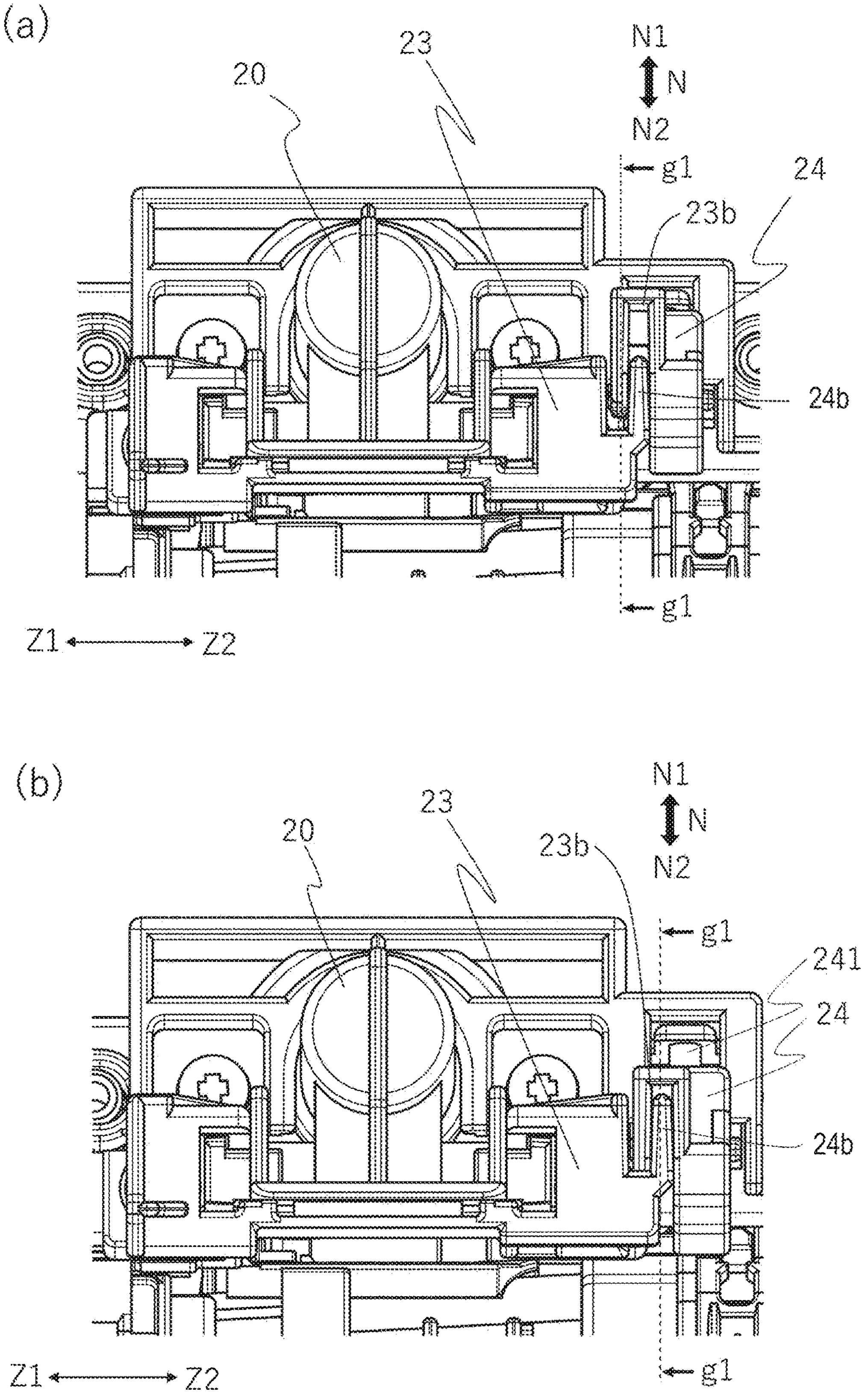

Parts (a) and (b) of FIG. 29 are illustrations of the discharge opening lock in the embodiment.

Figure 30:
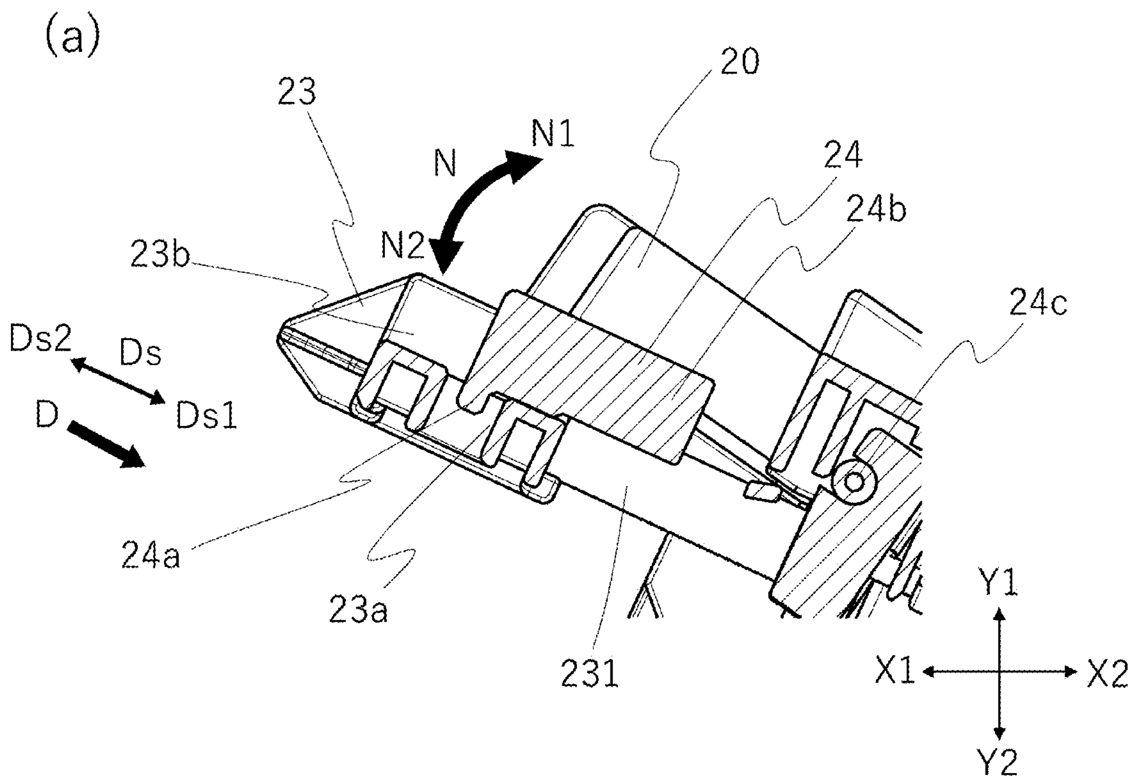
Figure 30:
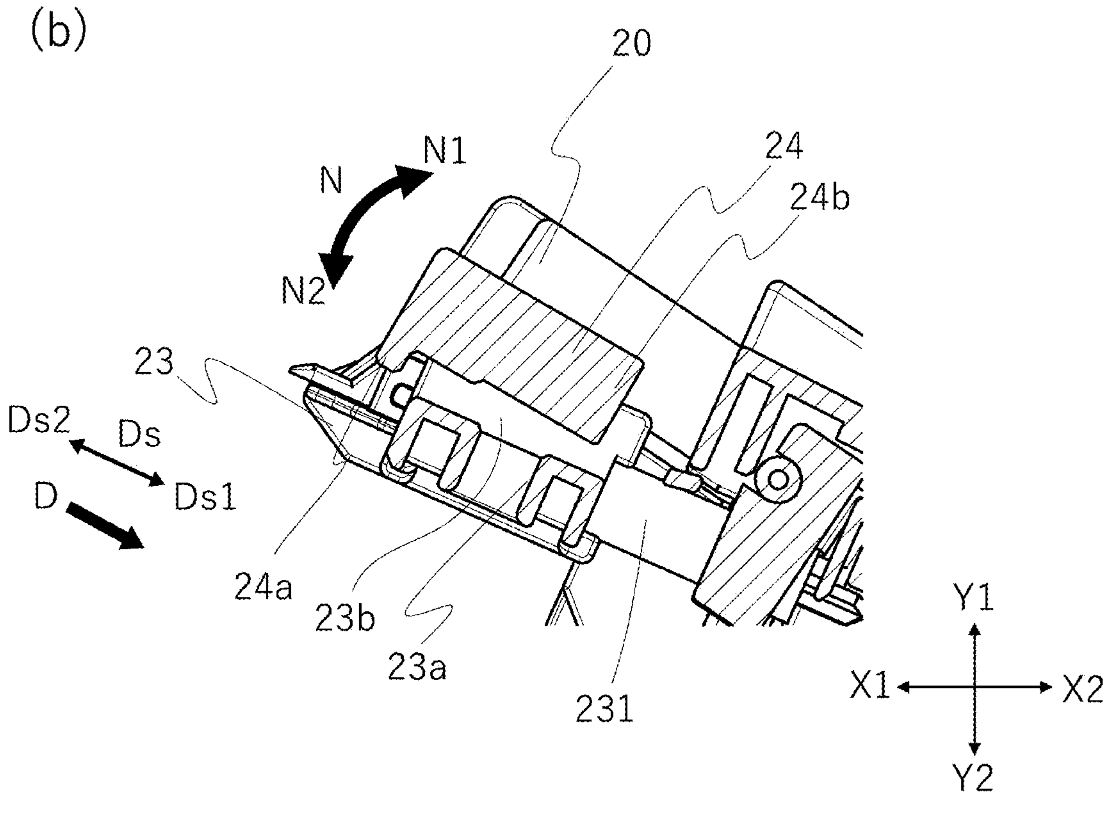

Parts (a) and (b) of FIG. 30 are illustrations of the discharge opening lock in the embodiment.

Figure 31:
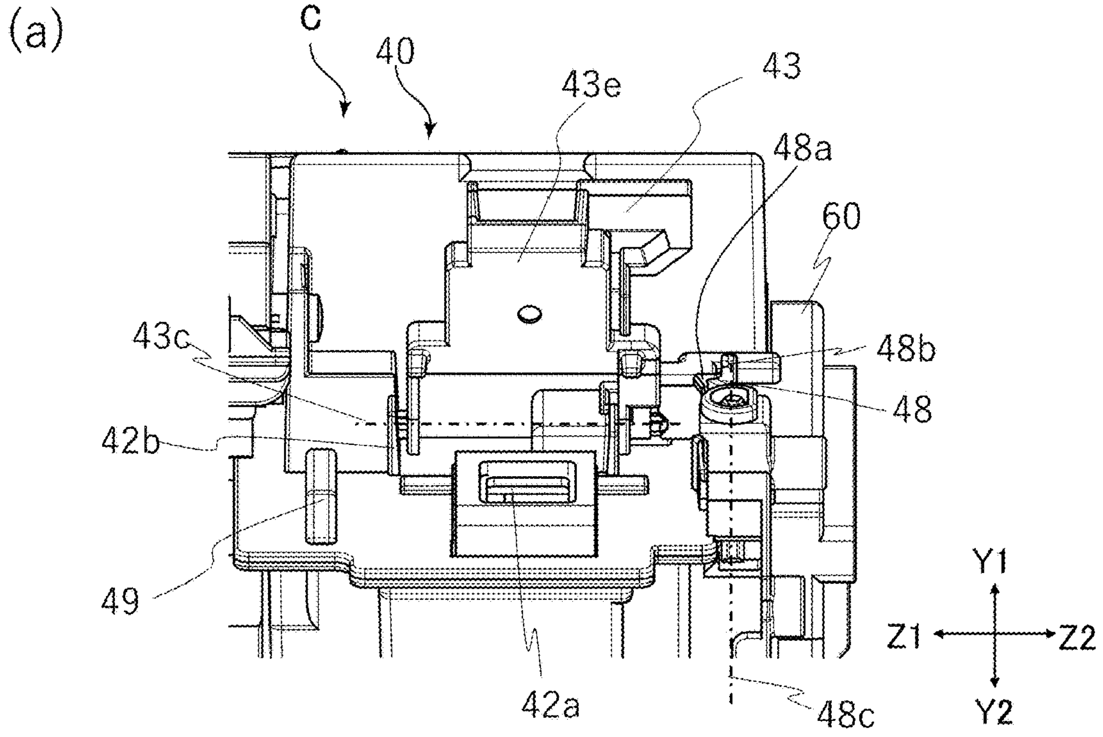
Figure 31:
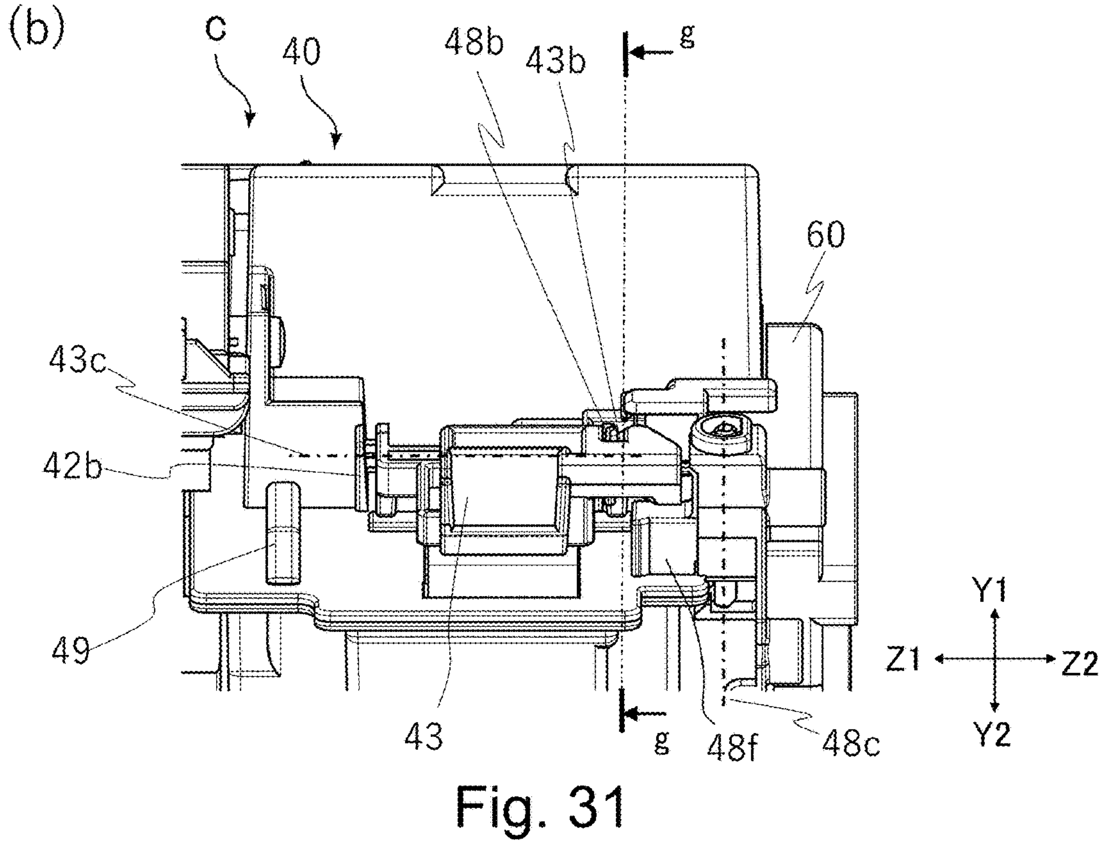

Parts (a) and (b) of FIG. 31 are illustrations of the receiving opening shutter and the receiving opening lock in the embodiment.

Figure 32:
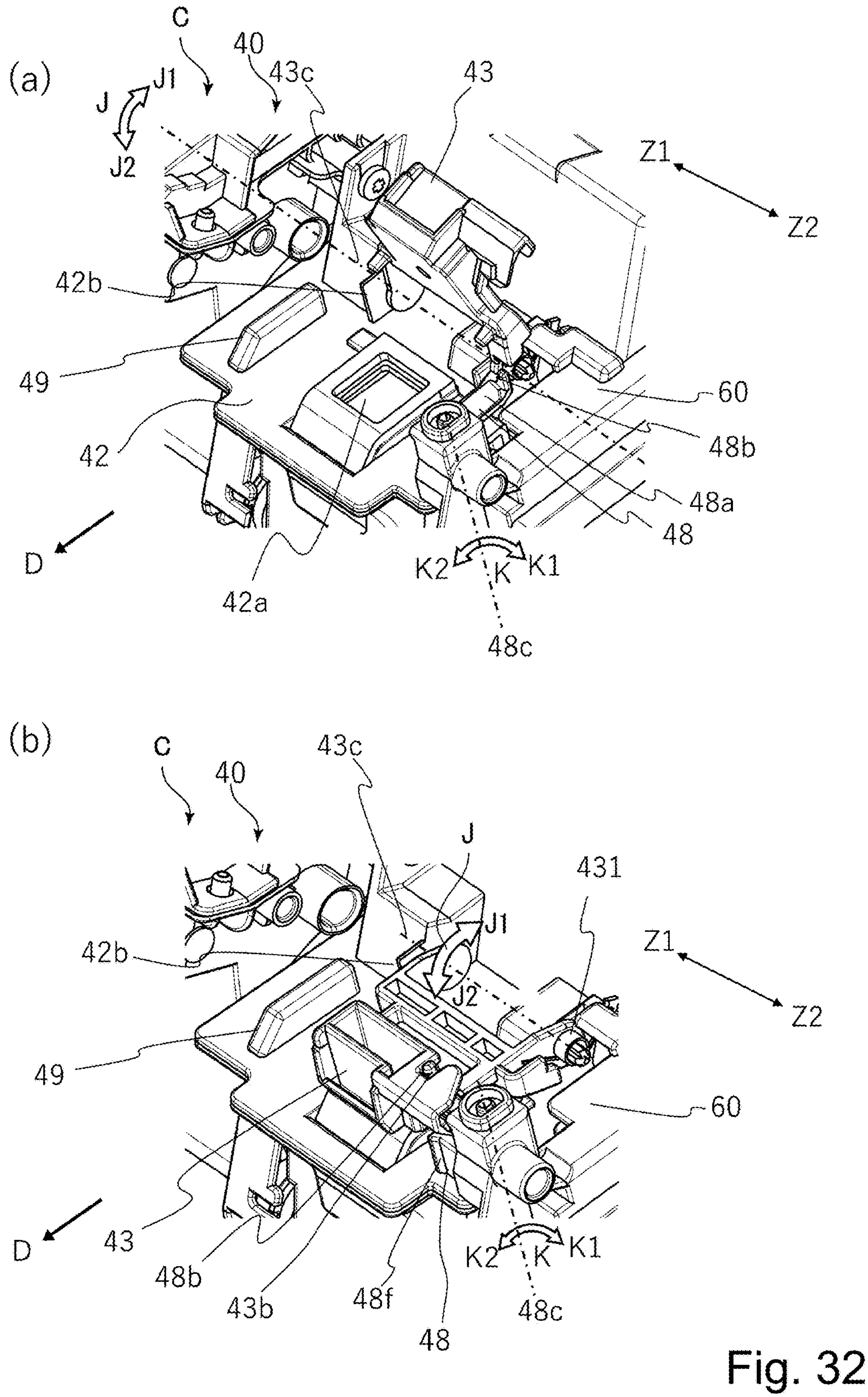

Parts (a) and (b) of FIG. 32 are illustrations of the receiving opening shutter and the receiving opening lock in the embodiment.

Figure 33:
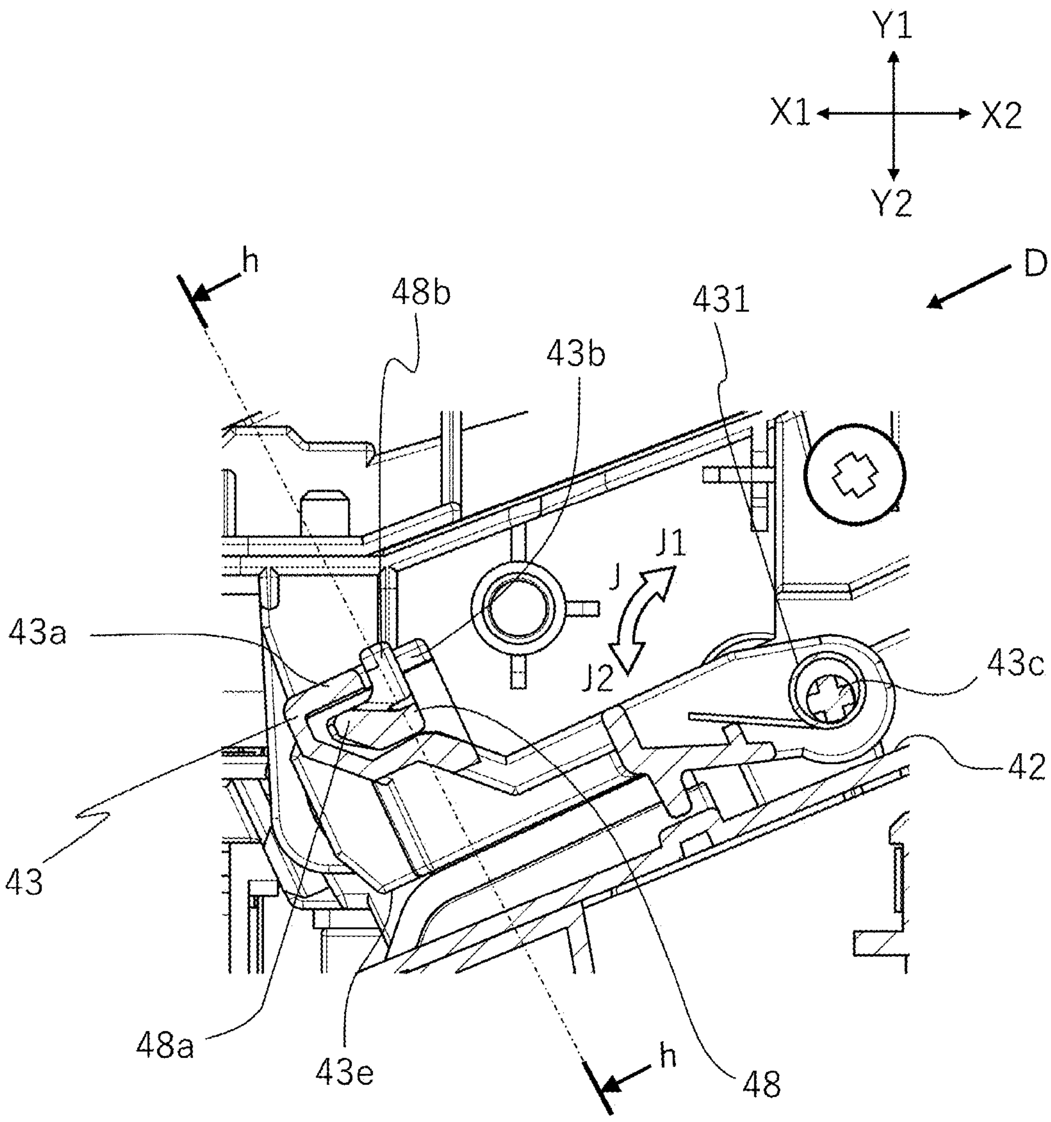

FIG. 33 is an illustration of the receiving opening shutter and the receiving opening lock in the embodiment.

Figure 34:
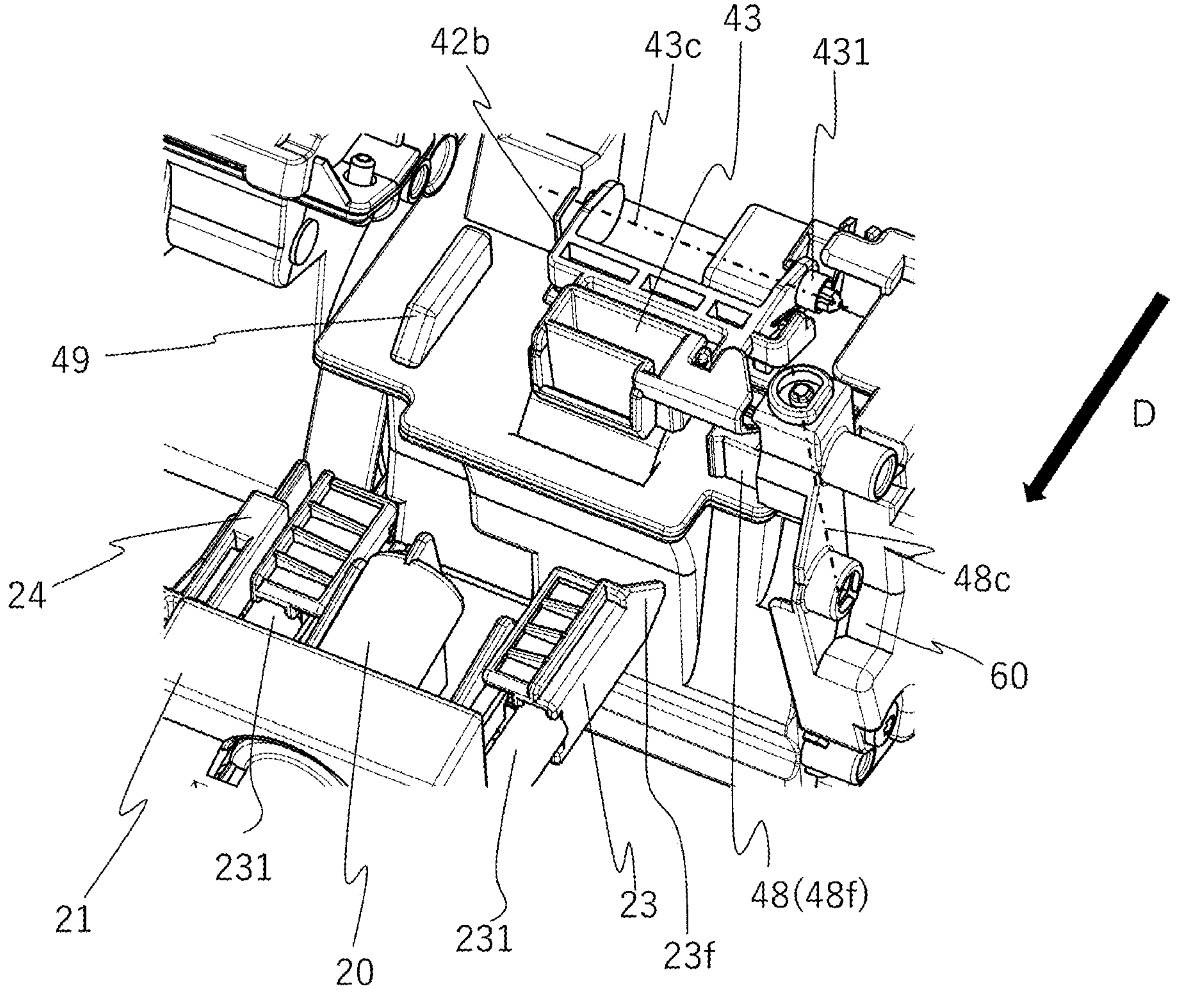

FIG. 34 is an illustration of each shutter and each lock in the embodiment.

Figure 35:
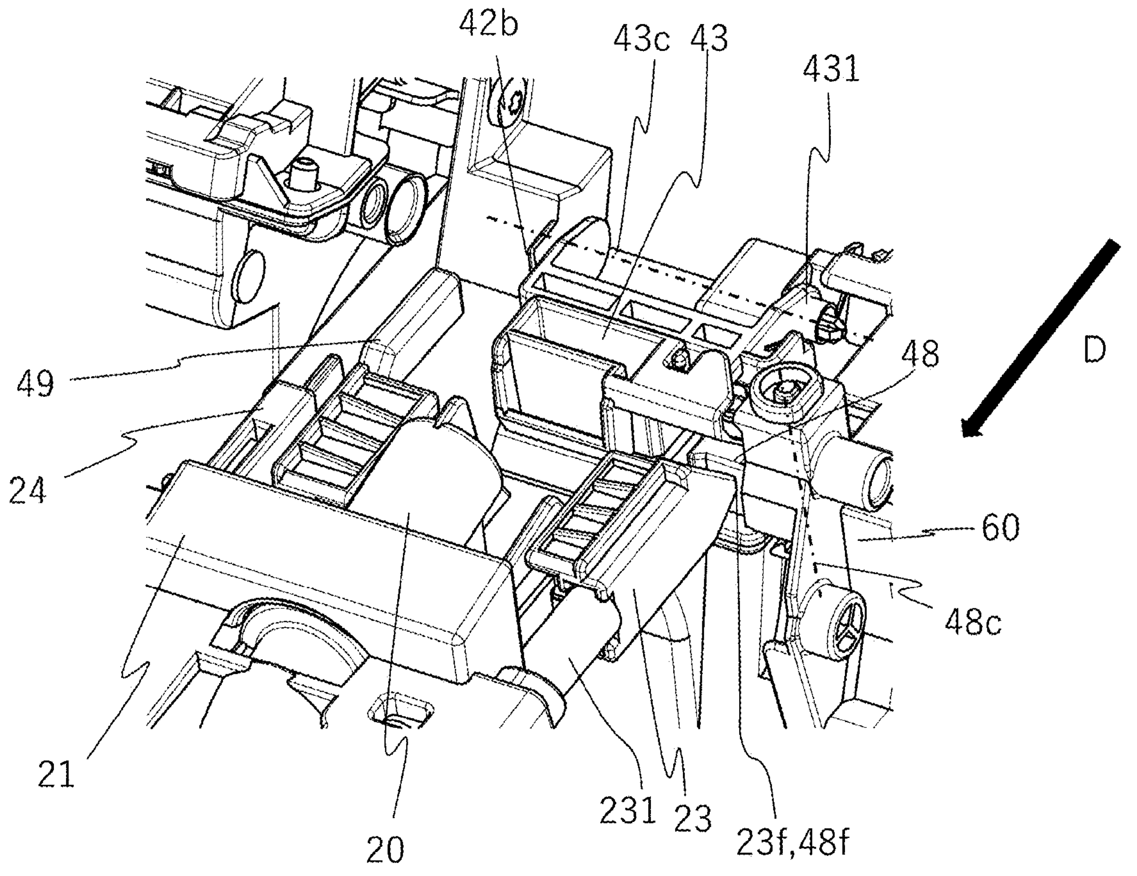

FIG. 35 is an illustration of each shutter and each lock in the embodiment.

Figure 36:
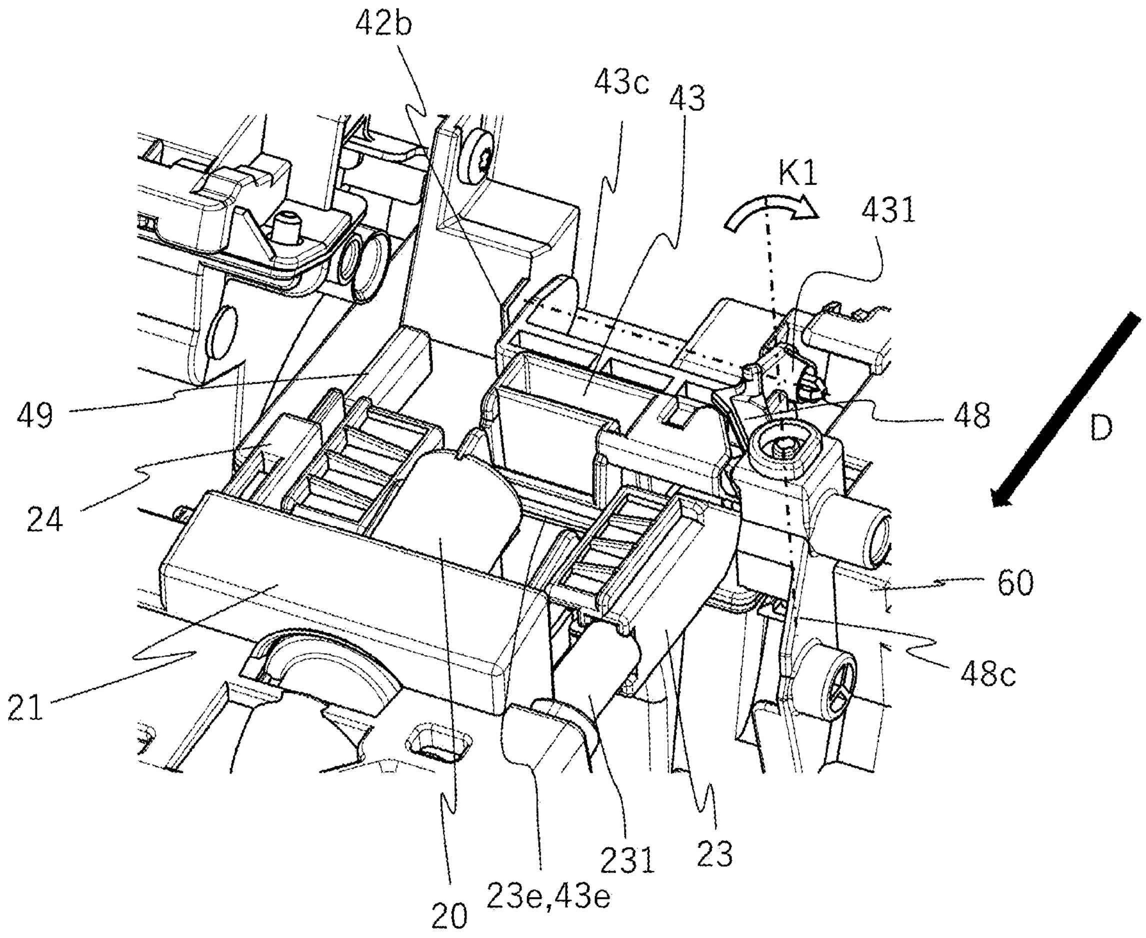

FIG. 36 is an illustration of each shutter and each lock in the embodiment.

Figure 37:
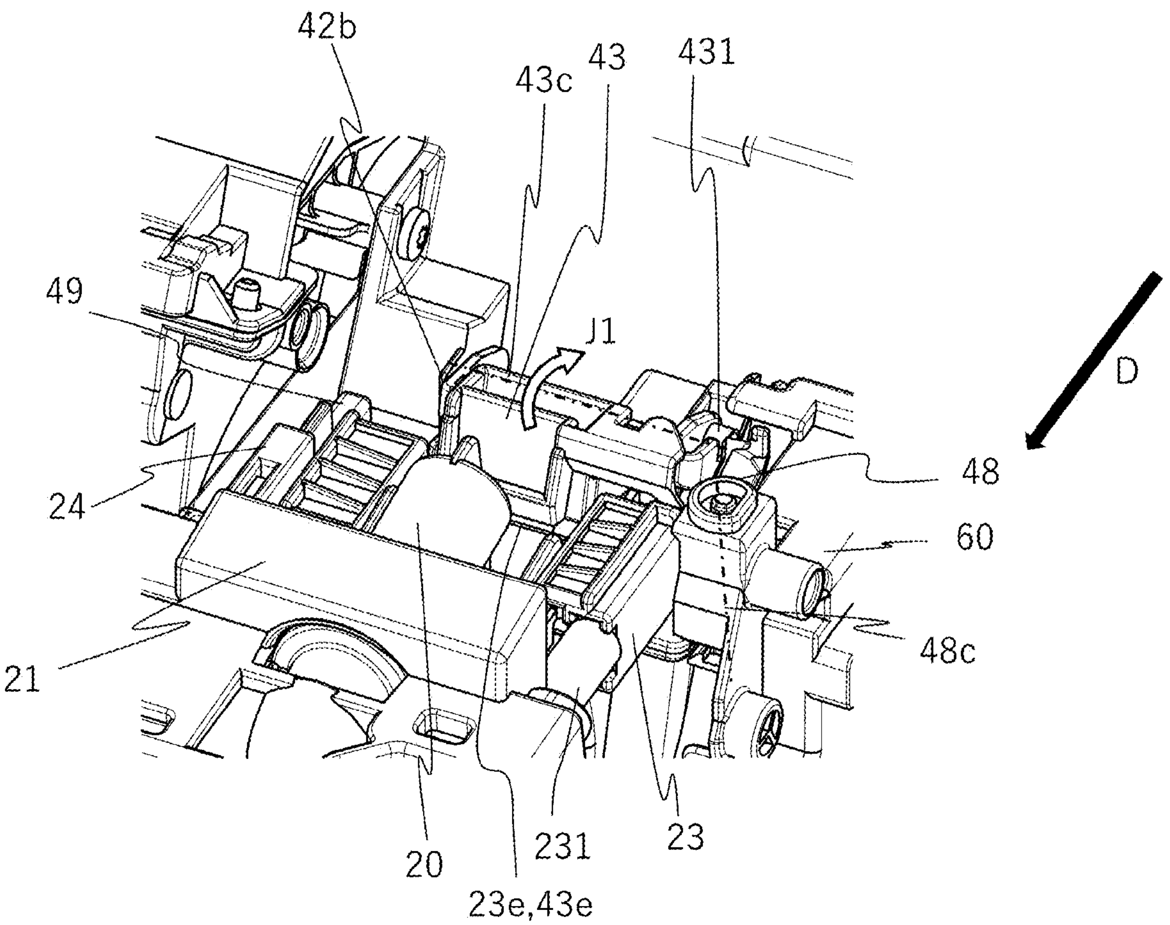

FIG. 37 is an illustration of each shutter and each lock in the embodiment.

Figure 38:
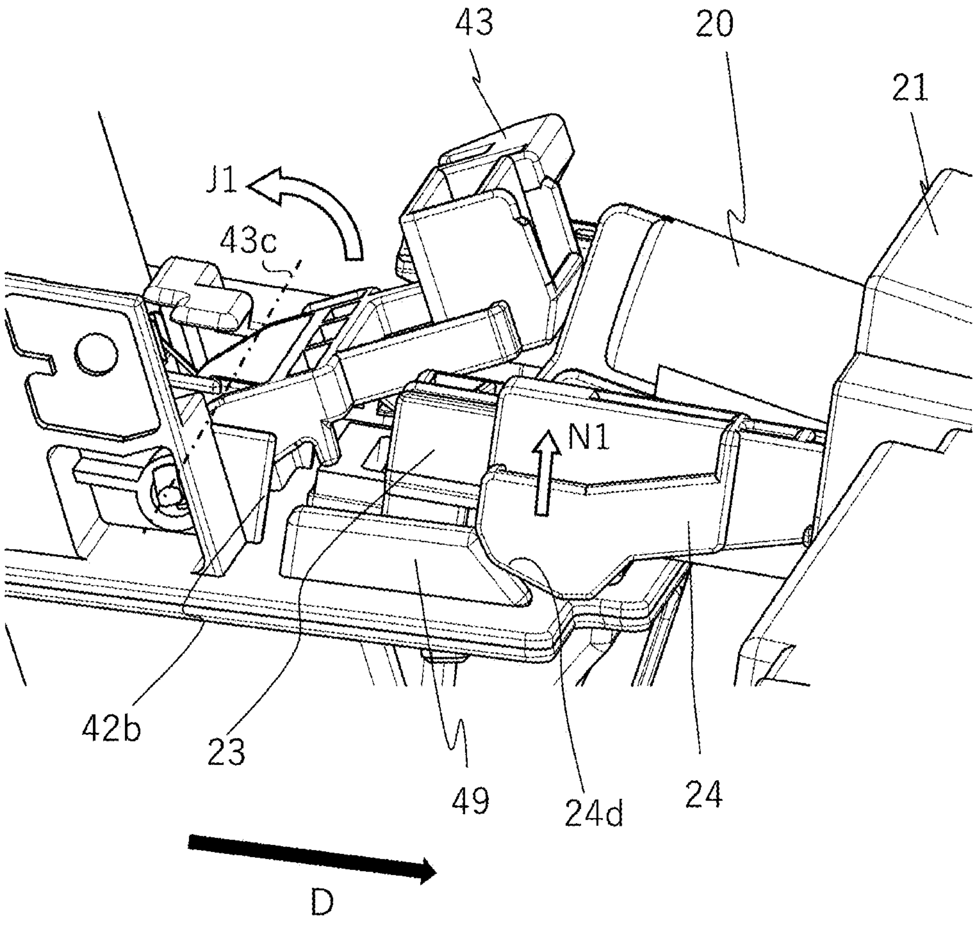

FIG. 38 is an illustration of each shutter and each lock in the embodiment.

Figure 39:
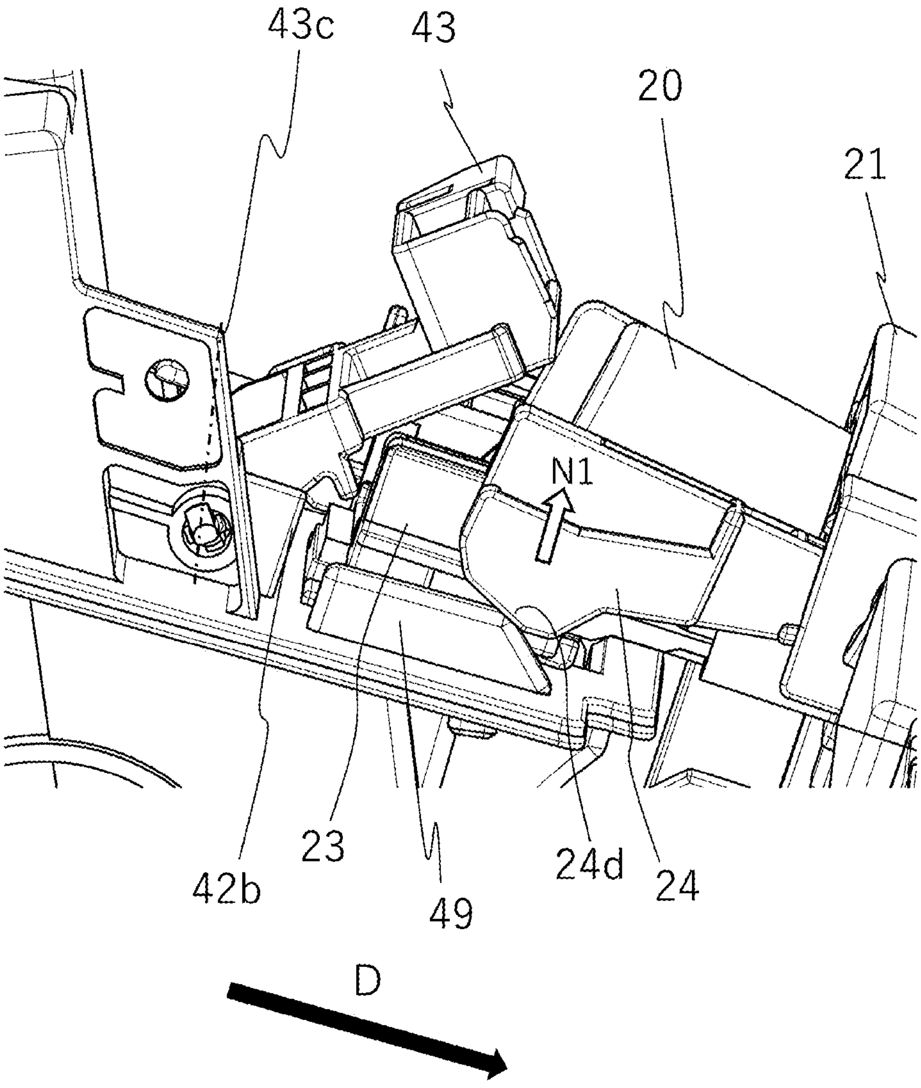

FIG. 39 is an illustration of each shutter and each lock in the embodiment.

Figure 40:
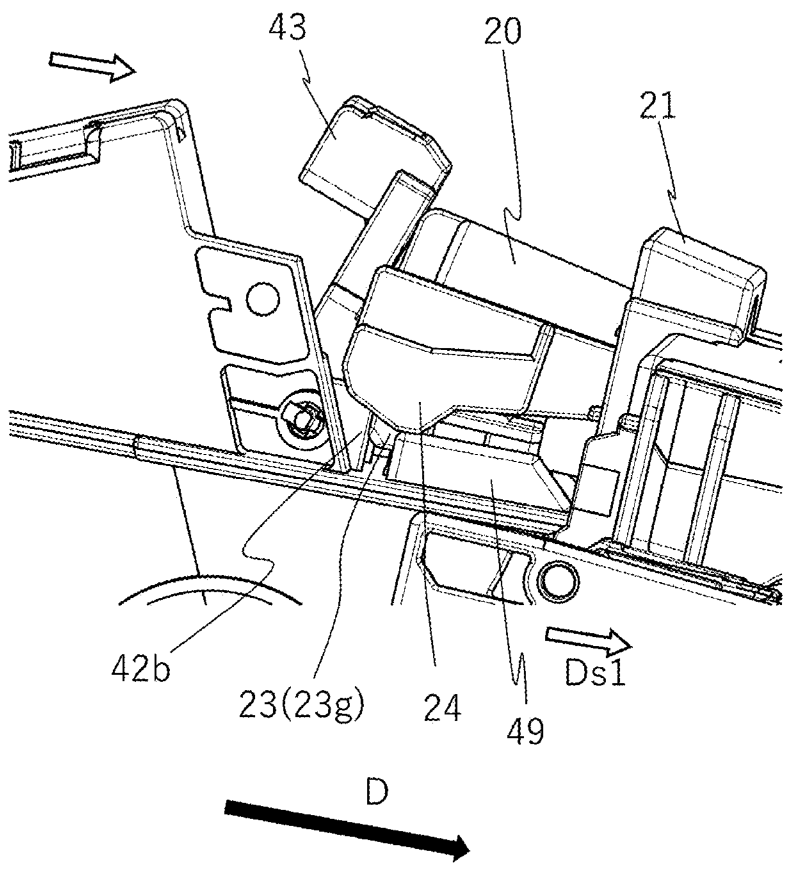

FIG. 40 is an illustration of each shutter and each lock in the embodiment.

Figure 41:
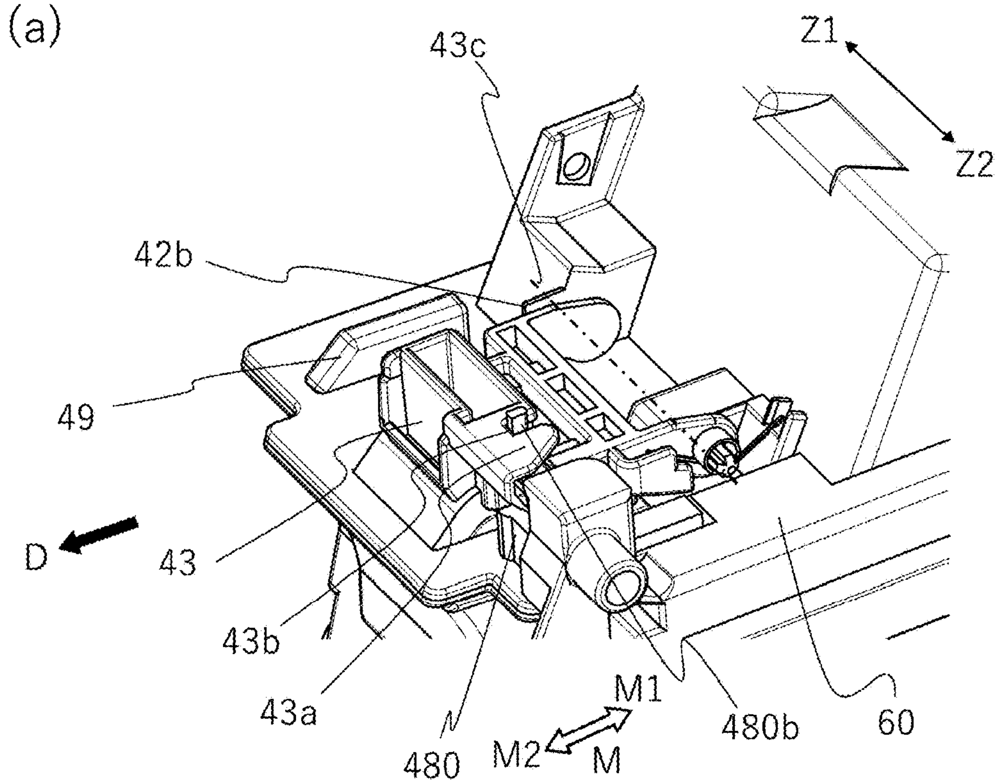
Figure 41:
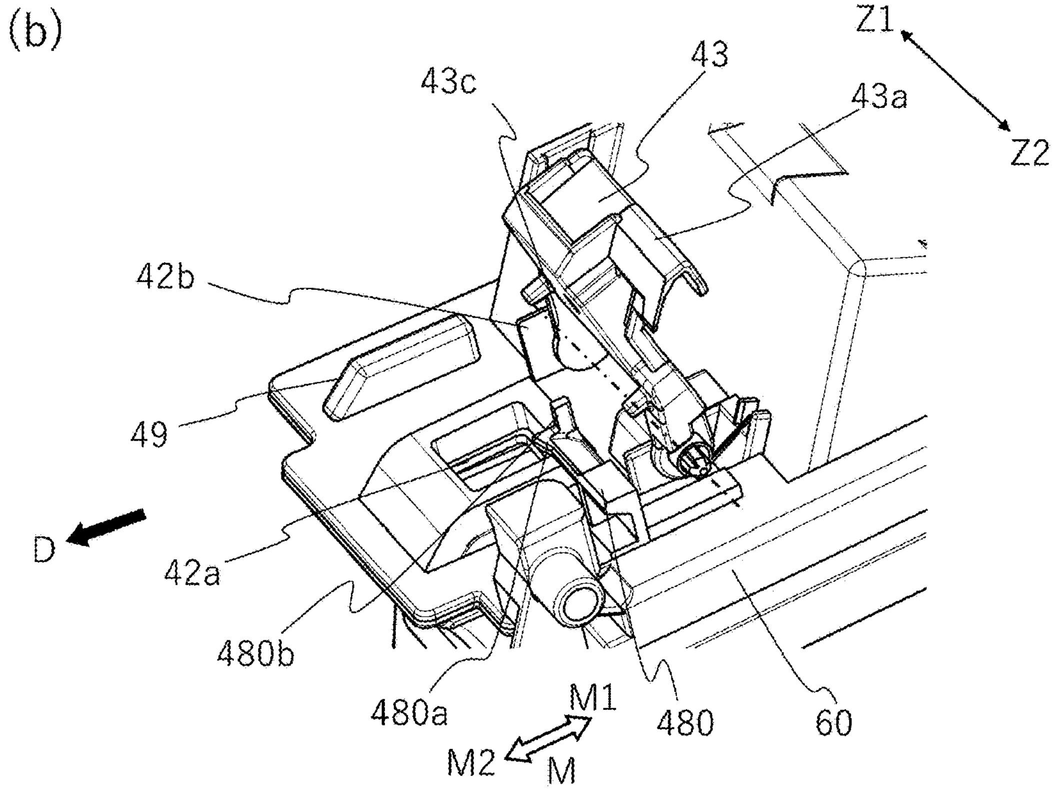

Parts (a) and (b) of FIG. 41 are illustrations of a receiving opening shutter and a receiving opening lock in a modified embodiment.

DESCRIPTION OF THE EMBODIMENTS

In the following, embodiments according to the present invention will be described with reference to the drawings.

Figure 2:
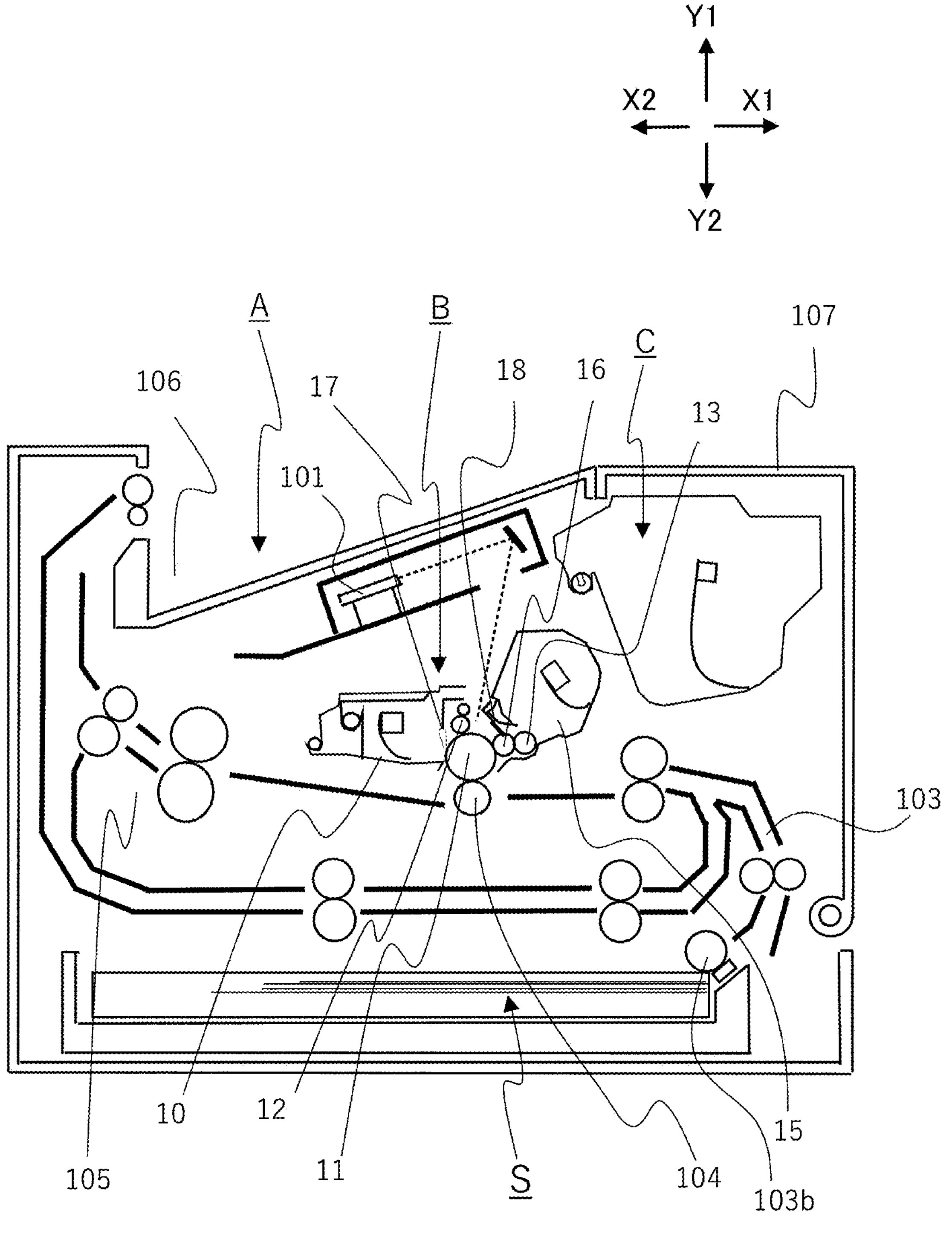
FIG. 2 is a schematic view of an image forming apparatus according to the embodiment.

FIG. 2 is a sectional view showing a schematic constitution of an image forming apparatus according to an embodiment. The image forming apparatus is a monochromatic laser printer for forming an image on a sheet S by an electrophotographic scheme.

Incidentally, as the sheet S which is a recording material (recording medium), it is possible to use various sheet materials, different in size and material, including paper such as plain paper and thick paper; a surface-treated sheet material such as coated paper; special-shaped sheet materials such as an envelope and index paper; plastic films; clothes; and the like. The "image forming apparatus" is not limited to a so-called monofunction printer having only a printing function, but may also be a copying machine, a facsimile machine, or a multi-function machine having a plurality of functions.

(Image Forming Apparatus)

As shown in FIG. 2, the image forming apparatus includes a printer main body A, a process cartridge B, and a toner cartridge C. In this embodiment, the printer main body A is a portion such that the process cartridge B and the toner cartridge C are excluded from the image forming apparatus. Each of the process cartridge B and the toner cartridge C is detachably mountable to (mountable to and demountable from) the printer main body A. The process cartridge B includes a photosensitive drum 11. In the printer main body B, a sheet feeding portion 103, a transfer roller 104, a fixing portion 105, and a laser scanner 101 are provided.

In the following description and the drawings, a direction of a rotational axis (rotational axis direction) of the photosensitive drum 11 is Z direction, in which a direction (arrow Z1 in the drawings) toward one end side of the rotational axis is Z1 direction and a direction (arrow Z2 in the drawings) toward the other end side of the rotational axis is Z2 direction. A horizontal direction perpendicular to the Z direction is X direction, in which one side (arrow X1 in the drawing) of the horizontal direction is X1 direction and the other side (arrow X2 in the drawings) is X2 direction. A vertical direction when the image forming apparatus is installed on a horizontal surface is Y direction, in which an upper side (arrow Y2 in the drawings) in the vertical direction is Y1 direction and a lower side (arrow Y2 in the drawings) in the vertical direction is Y2 direction. The X direction, the Y direction, and the Z direction may preferably be perpendicular to each other.

In the following description, arrangements of elements in the process cartridge B and the toner cartridge C will be described on the basis of a state in which these cartridges are mounted to the printer main body A unless otherwise mentioned.

In the image forming apparatus in this embodiment, a sheet S on which an image is formed is discharged toward the X1 direction of the X direction. The X1 direction is referred to as a front side of the image forming apparatus, and the X direction can be said as a front-rear direction of the image forming apparatus. Further, on the basis of the case where the image forming apparatus is viewed in the X1 direction (i.e., from the front side), it is possible to say that the Z1 direction is a left(-hand) side of the image forming apparatus and the Z2 direction is a right(-hand) side of the image forming apparatus and that the Z direction is a left-right direction of the image forming apparatus.

The sheet feeding portion 103 is an example of a feeding means for feeding the surface S. The sheet feeding portion 103 includes an accommodating portion feeding tray, cassette) where sheets S are stacked and accommodated, and a feeding roller 103*b* for feeding the sheet S in contact with a topmost sheet of a sheet bundle stacked in the accommodating portion. Further, the sheet feeding portion 103 includes a separating member for preventing double feeding (multi-feeding) of the sheets S. An example of the separating member is a pad-shaped elastic member for forming a separation nip in contact with the feeding roller 103*b* and for separating another sheet S from the topmost sheet S contacting the feeding roller 103*b*.

The laser scanner 101 is an example of an exposure means or an exposure device for exposing the photosensitive drum 11 to light. As the exposure means or the exposure device, an LED exposure device may be used. The transfer roller 104 is an example of a transfer means or a transfer member for transferring an image from an image bearing member or an intermediary transfer member onto the sheet S. Between the transfer roller 104 and the photosensitive drum 11, a transfer portion (transfer nip) where transfer of the toner image is carried out is formed.

The fixing portion 105 is an example of the fixing means for fixing the toner image, transferred on the sheet S, on the sheet S. The fixing portion 105 forms a nip between a rotatable member pair and is constituted so as to heat and press the toner image on the sheet S while nipping and conveying the sheet S in the nip. The fixing portion 105 is, for example, a unit of a film heating type in which a cylindrical film, a nip-forming portion including a ceramic heater provided in an inside space of the film, and a pressing roller for nipping the film in cooperation with the film forming portion. Incidentally, the film is an example of a heating member for heating the toner image, and a roller member (fixing roller) having rigidity may be used. Further, the ceramic heater is an example of a heating means for heating the heating member, and a halogen lamp or a coil unit of an induction heating type may be used as the heating means.

(Process Cartridge)

Figure 3:
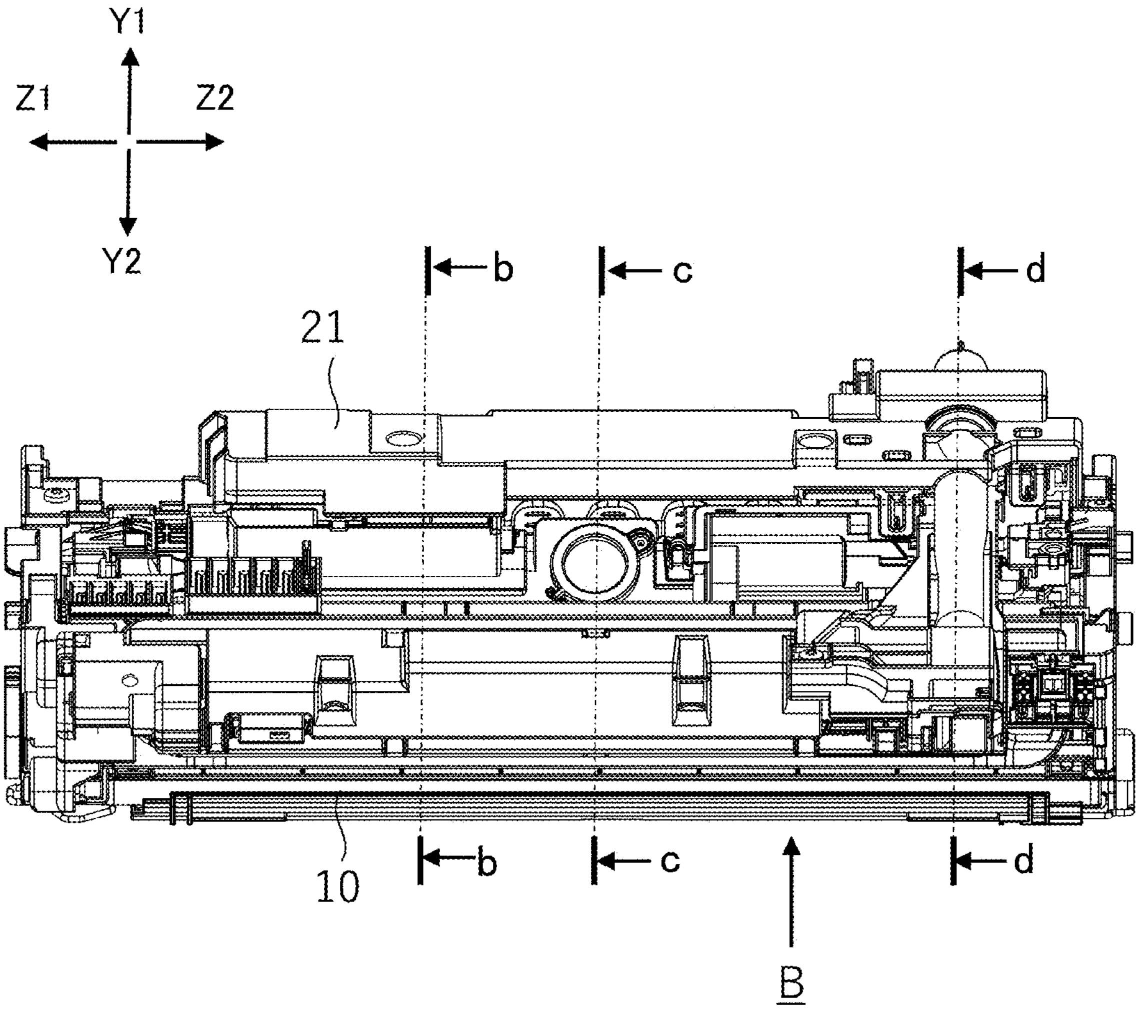
FIG. 3 is a front view of a process cartridge according to the embodiment.
Figure 4:
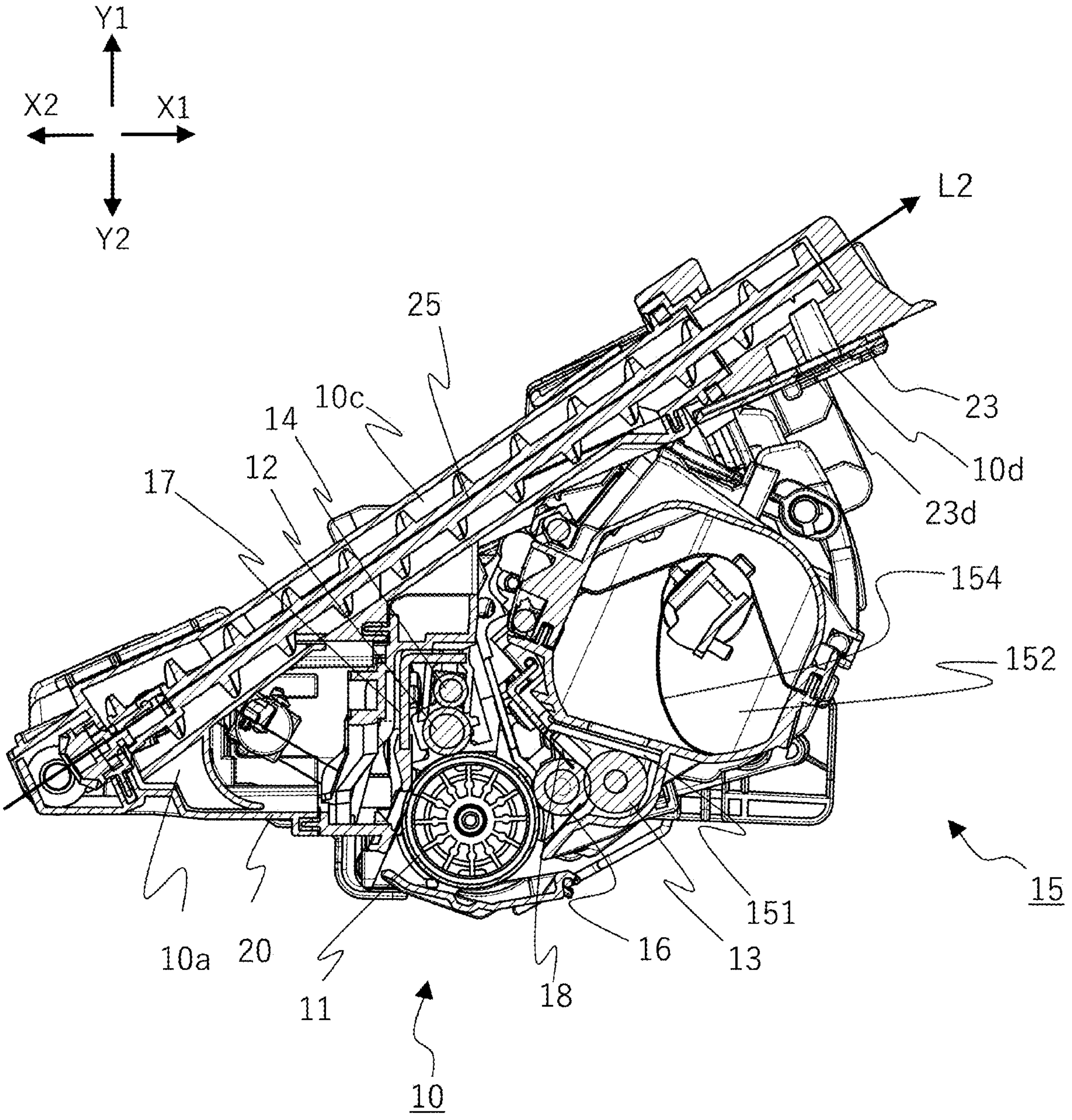
FIG. 4 is a sectional view of the process cartridge according to the embodiment.
Figure 5:
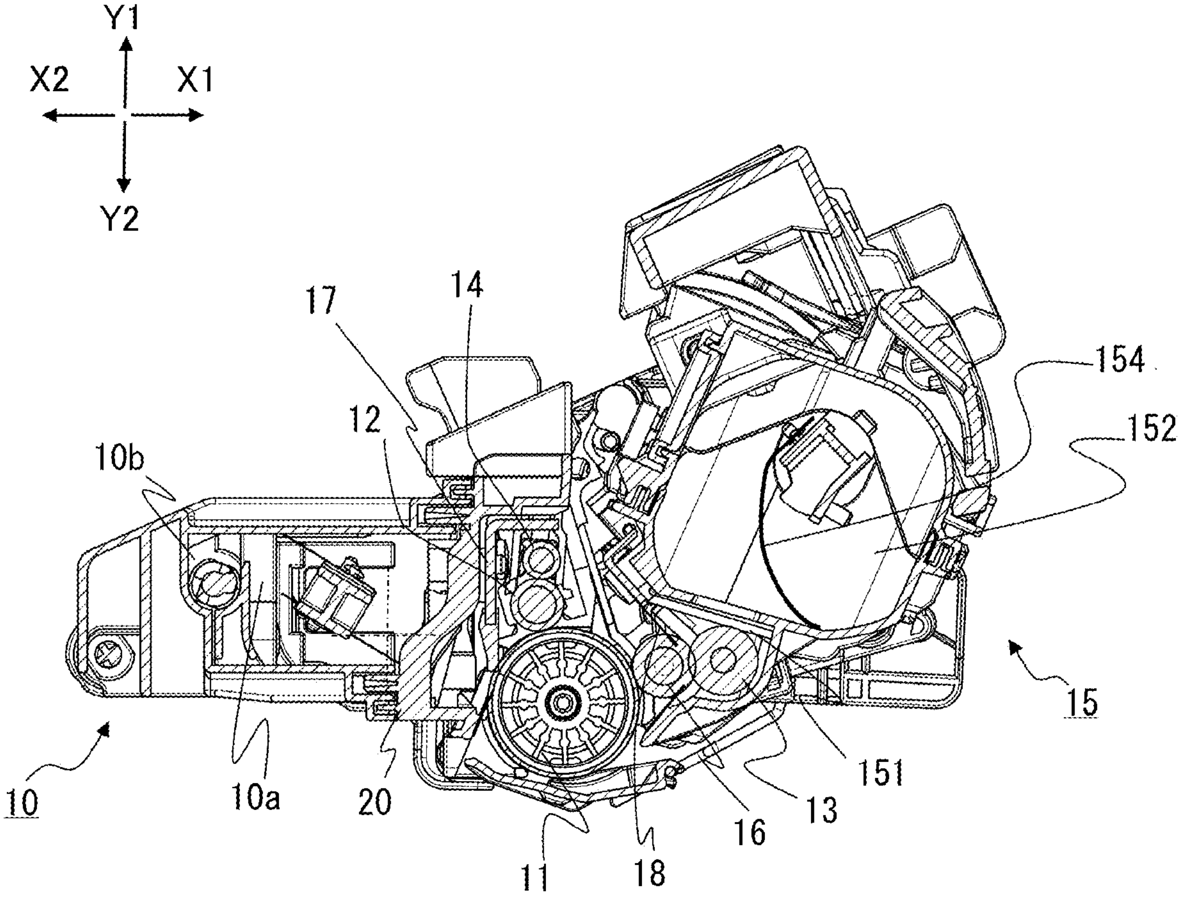
FIG. 5 is a sectional view of the process cartridge according to the embodiment.
Figure 6:
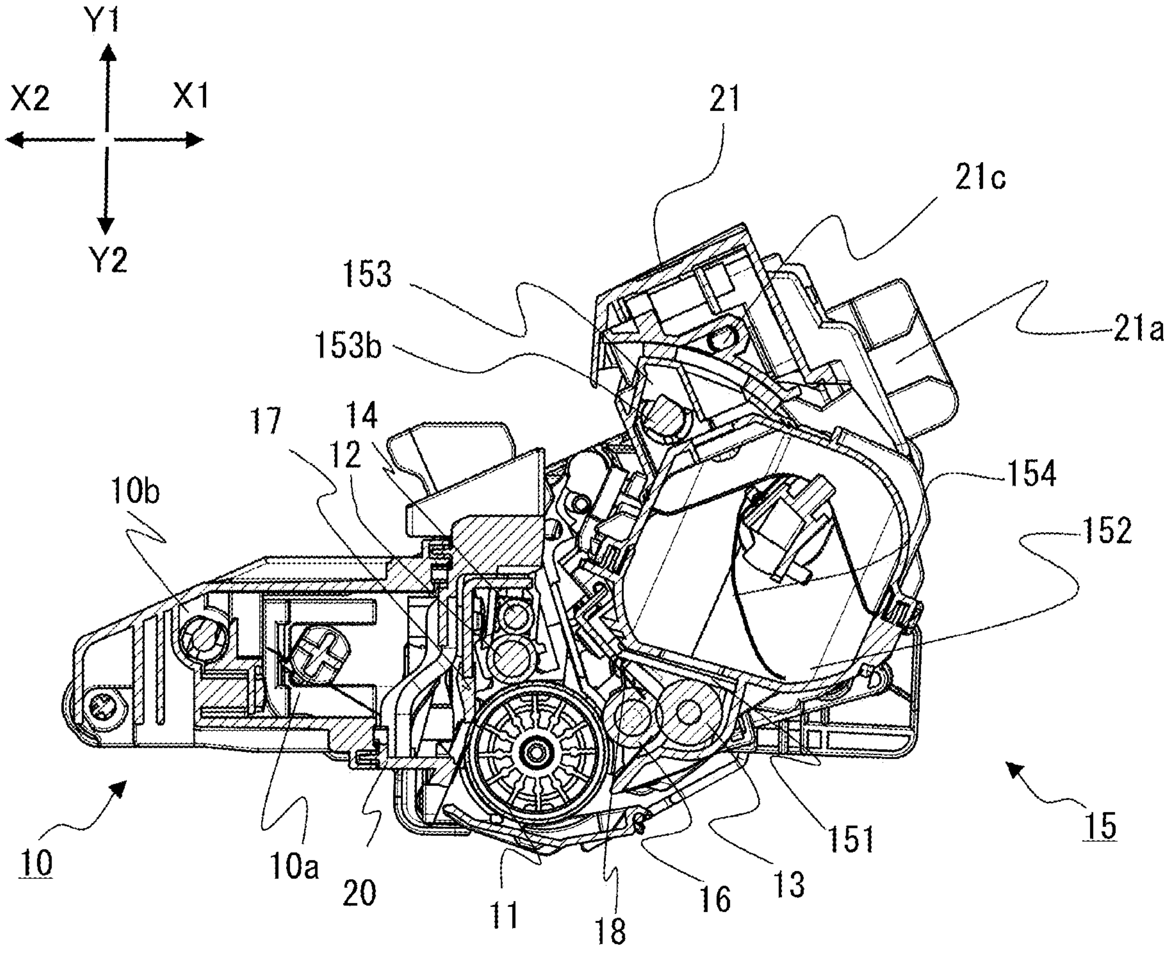
FIG. 6 is a sectional view of the process cartridge according to the embodiment.

The process cartridge B will be described using FIGS. 3 to 6. FIG. 3 is a front view (schematic view as seen from the X1 direction of FIG. 2) of the process cartridge B. FIG. 4 is a first sectional view (d-d cross section of FIG. 3) of the process cartridge B. FIG. 5 is a second sectional view (c-c cross section of FIG. 3) of the process cartridge B. FIG. 6 is a third sectional view (b-b cross section of FIG. 3) of the process cartridge B.

As shown in FIGS. 3 to 5, the process cartridge B includes a cleaning unit 10 and a developing unit 15. The cleaning unit 10 is a first unit (photosensitive member unit) provided with the photosensitive drum 11, and the developing unit 15 is a second unit provided with a developing roller 16.

The process cartridge B extends thin and long in a direction of a rotational axis of the photosensitive drum 11. Hereinafter, the direction of the rotational axis of the photosensitive drum 11 is referred to as a longitudinal direction of the process cartridge B in some cases.

As shown in FIGS. 4 and 5, the cleaning unit 10 includes the photosensitive drum 11 as the image bearing member, a cleaning blade 17, a charging roller 12 as a charging member, and a charging roller cleaner 14. Further, the cleaning unit 10 includes a residual toner primary accommodating portion 10*a*, a first residual toner conveying passage 10*b*, and a second residual toner conveying passage 10*c*. Further, the cleaning unit 10 includes a stay 21 and a side cover 7 which are described later (parts (a) and (b) of FIG. 7).

The photosensitive drum 11 is a photosensitive member molded in a cylindrical shape (drum shape). The photosensitive drum 11 is supported rotatably about the rotational axis (drum axis) by a frame of the cleaning unit 10. The charging roller 12 is disposed in contact with an outer peripheral surface of the photosensitive drum 11.

The charging roller 12 is a rotated by rotation of the photosensitive drum 11. The charging roller cleaner 14 is a cleaning member for cleaning the charging roller 12. The charging roller cleaner 14 is disposed in contact with the outer peripheral surface of the charging roller 12 and is rotated by rotation of the charging roller 12.

The cleaning blade 17 is an example of a cleaning member for cleaning the photosensitive drum 11. The cleaning blade 17 is an elastic member disposed in contact with the outer peripheral surface of the photosensitive drum 11. The cleaning blade 17 is disposed so as to elastically contact the photosensitive drum 11 at a free end thereof, and collects a deposited matter, such as a transfer residual toner, from the surface of the photosensitive drum 11 (hereinafter, this deposited matter is referred to as residual toner). The residual toner primary accommodating portion 10*a*, the first residual toner conveying passage 10*b*, and the second residual toner conveying passage 10*c* are elements for temporarily accommodating the residual toner collected by the cleaning blade 17 and for conveying the residual toner toward the toner cartridge C.

As shown in FIG. 6, the developing unit 15 includes the developing roller 16, a supplying roller 13, a developing blade 18, a stirring member 154, a developing chamber 151, a toner accommodating chamber 152, and a toner receiving chamber 153.

The developing roller 16 is a member (developing member, developer carrying member) which rotates while carrying toner as a developer and which is for supplying the toner to the photosensitive drum 11. The developing roller 16 is provided in the developing chamber 151. The supplying roller 13 is provided in the developing chamber 151 and supplies the toner to the developing roller 16.

Further, the supplying roller 13 collects excessive toner deposited on the developing roller 16. The supplying roller 13 can be omitted. The developing blade 18 is provided so as to contact an outer peripheral surface of the developing roller 16. The developing blade 18 is a member which regulates an amount of the toner carried on the developing roller 16 and which triboelectrically charges the toner carried on the developing roller 16 by rubbing the toner.

The toner accommodating chamber 152 communicates with each of the developing chamber 151 and the toner receiving chamber 153. The toner accommodating chamber accommodates the toner supplied through the toner receiving chamber 153.

The stirring member 154 is provided in the toner accommodating chamber 152. The stirring member 154 includes a rotation shaft extending in the Z direction and an elastic sheet projecting from the rotation shaft. The stirring member 154 stirs the toner accommodated in the toner accommodating chamber 152 and supplies the toner to the developing chamber 151.

The developing unit 15 is constituted so that an amount of the toner in the toner accommodating chamber 152 can be detected by an unshown remaining amount detecting means. On the basis of a detection result of the remaining amount detecting means, a controller of the printer main body A executes a supplying operation, in which the toner is supplied from the toner cartridge C to the process cartridge B, when the amount of the toner in the toner accommodating chamber 152 becomes not more than a threshold set in advance.

The remaining amount detecting means is, for example, a sensor of optical detection type in which a sensor substrate, including a light emitting element and a light receiving element, provided in the printer main body A and a light accommodating member mounted to the frame of the developing unit 15 are provided. The light guiding member forms an optical path in which light emitted from the light emitting element passes through a space inside the toner accommodating chamber 152 and reaches the light receiving element. For example, in a state in which the stirring member 154 is rotated, the controller of the printer main body A is capable of calculating the amount of the toner in the toner accommodating chamber 152 on the basis of a ratio of a light detecting time of the light receiving element to a rotation cyclic period of the stirring member 154.

A stay 21 of the cleaning unit 10 is provided with a supply opening 21*c*. The supply opening 21*c* is an opening through the toner is received from the toner cartridge C. The supply opening 21*c* communicates with the toner receiving chamber 153 of the developing unit 15. The toner supplied from the toner cartridge C by the supplying operation is supplied to the toner accommodating chamber 152 through the supply opening 21*c* and the toner receiving chamber 153.

(Image Forming Operation)

An image forming operation of the image forming apparatus will be described using FIG. 2. The image forming operation is a series of operations in which on the basis a print execution instruction from a user, the image forming apparatus forms the image on the sheet S while conveying the sheet S and then discharges the sheet S as a resultant product.

In the image forming operation, by a driving source of the printer main body A, the photosensitive drum 11 is rotationally driven at a predetermined peripheral speed (process speed). The charging roller 12 electrically charges the surface of the photosensitive drum 11 uniformly to a predetermined potential under application of a voltage from a high-voltage power source of the printer main body A. The laser scanner 101 irradiates the photosensitive drum 11 with laser light on the basis of image information received together with the print execution instruction and thus performs light exposure, so that an electrostatic latent image is formed on the surface of the photosensitive drum 11. The developing roller 16 supplies the toner to the photosensitive drum 11, so that the electrostatic latent image is developed into a toner image.

On the other hand, in parallel to such a toner image forming operation, the sheets S are fed one by one by the sheet feeding portion 103. Specifically, the feeding roller 103*b* is rotated, so that the topmost sheet S in the accommodating portion is fed. The fed sheet S is conveyed to the transfer portion in synchronism with a timing when the toner image formed on the photosensitive drum 11 reaches the transfer portion. Then, a voltage is applied to the transfer roller 104, so that the toner image is transferred from the photosensitive drum 11 onto the sheet S when the sheet S passes through the transfer portion.

The sheet S passed through the transfer portion is subjected to an image fixing process in the fixing portion 105. The fixing portion 105 fixes the toner image on the sheet S by heating and pressing the toner image on the sheet S while nipping and conveying the sheet S in a nip (fixing nip). The sheet S passed through the fixing portion 105 is discharged to an outside of the printer main body A by a discharging roller pair, and is stacked on a discharge tray 106 (stacking portion) provided at an upper portion of the printer main body A.

(Process Cartridge)

A constitution of the process cartridge B in this embodiment will be specifically described using FIGS. 4, 5, 7, 8, and 22. Parts (a) and (b) of FIG. 7 are exploded perspective views of the process cartridge B. Parts (a) and (b) of FIG. 8 are schematic side views showing contact and separation, respectively, of the developing unit 15 relative to the photosensitive drum 11 in the process cartridge B. FIG. 22 is a side view of the process cartridge B.

As shown in parts (a) and (b) of FIG. 7, the developing unit 15 includes bearing members 4 and 5 provided at opposite end portions of the frame of the developing unit 15 with respect to a rotational axis direction of the developing roller 16. The developing unit 15 is swingable (rotatable) relative to the cleaning unit 10 about a swing axis 8 described later, and is connected to the cleaning unit 10. The swing axis 8 is substantially parallel to the rotational axis 11*b* of the photosensitive drum 11.

As shown in part (a) of FIG. 7 and part (a) of FIG. 8, the bearing member 5 includes a cylindrical-shaped portion 5*a*. The cylindrical-shaped portion is engaged with a cylindrical hole-shaped portion 7*a* provided in the side cover 7 of the cleaning unit 10. A supporting axis 8*a* is defined as an axis common to the cylindrical hole-shaped axis 7*a* of the side cover 7 and the cylindrical-shaped portion 5*a* of the bearing member 5.

As shown in part (b) of FIG. 7 and FIG. 22, the process cartridge B includes a pin 6 for connecting the cleaning unit 10 and the developing unit 15. The pin 6 is inserted into a cylindrical hole-shaped portion 20*a* of a frame (cleaning frame) of the cleaning unit 10 and a cylindrical hole-shaped portion 4*a* of the bearing member 4 so as to bridge these hole-shaped portions. A supporting axis 8*b* is defined as an axis common to the pin 6 and the cylindrical hole-shaped portion 4*a* of the bearing member 4.

The supporting axis 8*a* and the supporting axis 8*b* substantially form the same rectilinear line. That is, the swing axis 8 is defined as a rectilinear line including the supporting axes 8*a* and 8*b*. The developing unit 15 is supported relative to the cleaning unit 10 so as to be swingable (rotatable) about the swing axis 8.

The developing unit 15 is urged by pressing springs 19*a* and 19*b* which are elastic members. Each of the pressing springs 19*a* and 19*b* is connected to the frame of the developing unit 15 and the cleaning frame 20. The pressing springs 19*a* and 19*b* urge the developing unit 15 toward a direction in which the developing roller 16 approaches the photosensitive drum 11.

Next, a contact and separation operation of the developing unit relative to the cleaning unit 10 will be described using parts (a) and (b) of FIG. 8. Incidentally, the process cartridge 8 shown in parts (a) and (b) of FIG. 8 shown in a state in which the side cover 7 is omitted in order to show a separating mechanism 100 of the printer main body A.

As shown in part (a) of FIG. 8, the printer main body A includes the separating mechanism 100. The process cartridge B includes a portion-to-be-acted subjected to action of the separating mechanism 100. The portion-to-be-acted in this embodiment is a projected portion 5*b* provided on the bearing member 5 of the developing unit 15. The separating mechanism 100 includes a pressing member (pressing lever) for pressing the projected portion 5*b* and a driving source (motor, solenoid, or the like) for driving the pressing member. The developing unit 15 is pressed at the projected portion 5*b* thereof, so that the developing roller 16 can be moved in a direction away from the photosensitive drum 11 against an urging force of the pressing springs 19*a* and 19*b*.

As shown in part (a) of FIG. 8, in the case where the projected portion 5*b* is not pressed by the pressing member of the separating mechanism 100, the developing unit 15 is positioned in a position (development contact position) where the developing roller 16 contacts the photosensitive drum 11. The development contact position is a position (developable position, image forming position) where the developing unit 15 is capable of developing the electrostatic latent image formed on the surface of the photosensitive drum 11. A state in which the developing unit 15 is in the development contact position is referred to as a development contact state of the process cartridge B. The development contact state is a state in which the process cartridge B is capable of preparing the toner image on the photosensitive drum 11.

As shown in part (b) of FIG. 8, in the case where the projected portion 5*b* is not pressed by the pressing member of the separating mechanism 100, the developing unit 15 moved in an arrow R2 direction in which a position (development separation position) where the developing roller 16 is separated from the photosensitive drum 11. The development separation position is a position (retracted position, non-image forming position) where the developing unit 15 is retracted so as not to develop the electrostatic latent image formed on the surface of the photosensitive drum 11. A state in which the developing unit 15 is in the development separation position is referred to as a development separation state of the process cartridge B. The development separation state is a state in which the process cartridge B does not prepare the toner image on the photosensitive drum 11.

Incidentally, when the pressing member of the separating mechanism 100 is separated from the projected portion 5*b*, by the urging force of the pressing springs 19*a* and 19*b*, the developing unit 15 is moved from the development separation position to the development contact position, so that the process cartridge B is changed in state from the development separation state to the development contact state.

Thus, the image forming apparatus is constituted so that the developing unit 15 is movable between the development separation position and the development contact position in a state in which the process cartridge B is mounted to the printer main body A. Further, the image forming apparatus is constituted so that the process cartridge B is capable of switching the state of the process cartridge B between the development separation state and the development contact state in the state in which the process cartridge B is mounted to the printer main body B. The controller of the printer main body A puts the process cartridge B in the development separation state when the image forming operation is not executed during non-image formation, for example, during turning-off of a main power source of the image forming apparatus).

By putting the process cartridge B in the development separation state during the non-image formation, it is possible to suppress deterioration due to rubbing with the toner in an opposing portion (developing region, development gap) where the developing roller 16 and the photosensitive drum 11 oppose each other, and unnecessary toner consideration.

(Toner Cartridge)

The toner cartridge C will be described using FIGS. 9, 10, 11, parts (a) and (b) of FIG. 12, and FIGS. 13, 17, 19, and 20. FIG. 9 is a front view showing a state in which the toner cartridge C is mounted to the printer main body A and is engaged with the process cartridge B. FIG. 10 is a principal sectional view (a-a cross-section of FIG. 9) showing a toner supplying portion 30 of the toner cartridge C. FIG. 11 is a sectional view (c-c cross section of FIG. 9) showing a residual toner collecting portion 40 of the toner cartridge C. Parts (a) and (b) of FIG. 12 are exploded perspective views of the toner cartridge C. FIG. 13 is a side view of the toner cartridge C. FIG. 17 is a sectional view (a-a cross section of FIG. 13) in which the toner cartridge C is cut along a rotational axis center of a shutter member 34. FIG. 19 is a sectional view (d-d cross section of FIG. 13) showing a leveling portion **33*al* of the toner cartridge C. FIG. 20 is a sectional view in which the toner cartridge C is cut along a virtual flat plane passing through a rotational axis of a screw member 35**.

As shown in FIGS. 9 to 11, the toner cartridge C roughly includes the toner supplying portion 30 (toner replenishing portion) for supplying the toner to the process cartridge, and the residual toner collecting portion 40 for collecting the residual toner from the process cartridge B.

The toner cartridge C extends thin and long in a direction (collect direction of the toner cartridge B) parallel to a longitudinal direction (direction of the rotational axis of the photosensitive drum 11) of the process cartridge B.

(Toner Supplying Portion)

The toner supplying portion 30 includes, as shown in FIG. 10 and parts (a) and (b) of FIG. 12, a toner accommodating portion **30*a*, and the screw member 35 and the stirring conveying unit 36 which are provided in the toner accommodating portion 30*a*. The toner accommodating portion 30*a* is formed by an accommodating frame 31 and an accommodating lid 32. A space inside the toner accommodating portion 30*a* is an accommodating space for accommodating the toner for being supplied to the process cartridge B. The toner accommodating portion 30*a* is provided with a discharge opening 31*a* for permitting discharge of the toner, accommodated in the toner accommodating portion 30*a*, to an outside of the toner accommodating portion 30*a*** (outside of the toner cartridge C).

The screw member 35 is a conveying member for conveying the toner toward a toner discharge opening **34*a*. The screw member 35 conveys the toner in the Z1 direction. The stirring conveying unit 36 is a unit for stirring the toner in the toner accommodating portion 30*a* and for conveying the toner toward the screw member 35. The stirring conveying unit 36 includes a rotation shaft penetrating through the toner accommodating portion 30*a* in the longitudinal direction (Z direction) of the toner cartridge C, and an elastic sheet supported by the rotation shaft. The stirring conveying unit 36 is rotated by input of a driving force to the rotation shaft thereof through a stirring drive input portion 38 described later, and stirs and conveys the toner in the toner accommodating portion 30*a*** by the elastic sheet.

The accommodating frame 31 is provided with the discharge opening **31*a* on a downstream side in the conveying direction of the screw member 35 (part (a) of FIG. 12). The discharge opening 31*a* is an opening through which the toner is discharged toward the toner discharge opening 34*a*. Further, the accommodating frame 31 includes a curved bottom portion 31*d* (R-shaped portion), as a portion corresponding to a screw portion of the screw member 35, curved with an outer diameter substantially equal to an outer diameter of the screw portion. The curved bottom portion 31*d*** is formed along a cylindrical surface about a rotational axis of the screw portion.

The accommodating frame 31 includes a partition wall **31*c*, for forming a toner storage portion 31*a*1, on a side upstream of the discharge opening 31*a* with respect to the conveying direction of the screw member 35 (FIG. 10). Between the partition wall 31*c* and an outerwall surface of the accommodating frame 31, the toner storage portion is formed. The toner storage portion is formed by the curved bottom portion 31*d* of the toner storage portion 31*a*1. The toner storage portion 31*al*** is a space which opens on an upper side thereof in an attitude (mounting completion attitude) when the toner cartridge C is mounted to the printer main body A, and thus is capable of storing the toner.

The accommodating frame 31 includes, as shown in FIGS. 19 and 20, the leveling portion **33*al* provided between the partition wall 31*c* and the discharge opening 31*a* with respect to the conveying direction of the screw member 35. The leveling portion 33*al* is a curved surface formed with an inner diameter substantially equal to an inner diameter of the curved bottom portion 31*d*, and forms a cylindrical space enclosing the screw member 35 in cooperation with the curved bottom portion 31*d*. A periphery of the screw member 35 is enclosed by the leveling portion 33*al* and the curved bottom portion 31*d*, so that relative to a rotation amount of the screw member 35, a conveying amount of the toner toward the discharge opening 31*a* can be made close to a constant value. The discharge opening 31*a* is disposed in a space partitioned from a remaining portion of the toner accommodating portion 30*a* by the partition member 33*a* including the leveling portion 33*al* (part (a) of FIG. 12, FIG. 18**).

The toner supplying portion 30 includes a pump **37*a* as a volume fluctuating portion as shown in part (a) of FIG. 12. The pump 37 is provided on an outside of the toner accommodating portion 30*a*** with respect to the longitudinal direction of the toner cartridge C.

As shown in part (a) of FIG. 12 and FIG. 13, the toner supplying portion 30 includes a pump/screw drive input portion (PS drive input portion 39) for driving the pump **37*a* and the screw member 35, and the stirring drive input portion 38 for driving the stirring conveying unit 36. The PS drive input portion 39 and the stirring drive input portion 38 are provided on the outside of the toner accommodating portion 30*a*. The PS drive input portion 39 and the stirring drive input portion 38 are disposed, so as to be rotatable, between the accommodating frame 31 and a drive-side side cover 50** described later.

The pump **37*a*, the PS drive input portion 39, and the stirring drive input portion 38 are provided at an end portion on an opposite side (Z1 direction) to a side (Z2 direction), with respect to the longitudinal direction of the toner cartridge C, where the residual toner collecting portion 40** is provided.

As shown in part (a) of FIG. 12, the toner cartridge C includes the drive-side side cover 50 covering the PS drive input portion 39, the stirring drive input portion 38, and the pump **37*a*. The drive-side side cover 50** forms an end surface of the toner cartridge C on one side (Z1 direction) with respect to the longitudinal direction.

The PS drive input portion 39 and the stirring drive input portion 38 includes coupling portions **39*a* and 38*a*, respectively, which are projected-shaped portions exposed from holes of the drive-side side cover 50 as viewed in the longitudinal direction (Z direction) (FIG. 18). In the case where the toner cartridge C is mounted to the printer main body A, the coupling portions 39***a* and 38*a* are engaged with coupling member, respectively, provided to the printer main body A, and receive input of the driving force.

As shown in FIG. 18, a rotational axis of the PS drive input portion 39 is an axis G. The axis G is substantially parallel to the rotational axis of the photosensitive drum 11 of the process cartridge B.

As shown in FIG. 18, the toner supplying portion 30 includes a cam gear 37*b* for expanding and contracting the pump 37*a*, and a link arm 37*c*. The cam gear 37*b* includes a gear portion connected to the PS drive input portion 39 so as to permit drive transmission therebetween, and a cam portion engaged with the link arm 37*c*.

The link arm 37*c* is connected to one end of the pump 37*a* and is constituted so as to expand and contract the pump 37*a* by movement of the link arm 37*c*.

When the driving force is inputted from the printer main body A to the PS drive input portion 39, the cam gear 37*b* is rotated about the axis G, so that the link arm 37*c* is reciprocated in a direction of the axis G by the cam portion. By this, the pump 37*a* is expanded and contracted in the direction of the axis G.

As shown in FIG. 18, the toner supplying portion 30 includes a nozzle member 33*b* connected to the pump 37*a* (volume fluctuating portion) and the discharge opening 31*a*.

As shown in FIGS. 18 and 20, the toner supplying portion 30 includes a shutter member 34 (conveying pipe member, flow passage member) including the toner discharge opening 34*a* which is an opening through which the toner is discharged to an outside of the toner cartridge C. The shutter member 34 is rotatably mounted below the discharge opening 31*a*.

Compressed air generated by a contracting operation of the pump 37*a* is mixed with the toner conveyed by the screw member 35 and then is sent from the discharge opening 31*a* to the shutter member 34 through the nozzle member 33*b*. The shutter member 34 includes an inlet 34*g* for receiving the toner, a flow passage 34*b* (toner conveying path) for establishing communication between the inlet 34*g* and the toner discharge opening 34*a*, and an edge portion 34*d* where the toner discharge opening 34*a* opens (FIG. 17). The toner flows together with the compressed air into the flow passage 34*b* in the shutter member 34 through the inlet 34*g* and then is discharged through the toner discharge opening 34*a*.

The toner discharged through the toner discharge opening 34*a* is received by the process cartridge B.

The flow passage 34*b* extends in a direction which is a direction crossing the axis G being the rotational axis of the PS drive input portion 39 and in which the flow passage is away from the axis G. That is, the toner discharged from the toner supplying portion 30 is guided by the shutter member 34 in a discharging direction in which the toner is away from the axis guide, and then is discharged. The shutter member 34 is constituted so as to be opened in interrelation with mounting of the toner cartridge C to the printer main body A and to be closed in interrelation with demounting of the toner cartridge C from the printer main body A.

As shown in part (a) FIG. 12, the shutter member 34 is provided on a side (Z1 direction), in the toner accommodating portion 30*a*, close to the PS drive input portion 39 in the longitudinal direction (Z direction). The shutter member 34 is provided on the same side as the PS drive input portion 39 at least with respect to a center position of the toner accommodating portion 30*a* in the Z direction. By this, loss when the toner is discharged by volume fluctuation of the pump 37*a* can be reduced, so that it is possible to prevent upsizing of a discharging mechanism.

(Residual Toner Accommodating Portion)

As shown in FIG. 11, the residual toner collecting portion 40 includes a residual toner accommodating portion 40*a* and a receiving opening shutter 43. The residual toner collecting portion 40 is a toner accommodating portion for accommodating residual toner as an example of the toner. The residual toner accommodating portion 40*a* is formed by a accommodating frame 41 and an accommodating lid 42. An inside portion of the residual toner accommodating portion 40*a* is a space for accommodating the residual toner received from the process cartridge B.

The residual toner accommodating portion 40*a* is provided with a residual toner receiving opening 42*a* which is an opening for receiving the residual toner. In this embodiment, the residual toner receiving opening 42*a* is formed in the accommodating lid 42.

The receiving opening shutter 43 is an openable member (sealing member, shutter member) for opening and closing the residual toner receiving opening 42*a*. The receiving opening shutter 43 is movable in a movement direction J between a closed position where the receiving opening shutter 43 closes the residual toner receiving opening 42*a* and an open position where the receiving opening shutter 43 opens the residual toner receiving opening 42*a*.

As described later, the receiving opening shutter 43 is opened and closed in interrelation with mounting and demounting of the toner cartridge C relative to the printer main body A. That is, the receiving opening shutter 43 is constituted so as to move from the closed position to the open position in interrelation with mounting of the toner cartridge B to the printer main body B and to move from the open position to the closed position in interrelation with demounting of the toner cartridge C from the printer main body A.

As shown in part (a) of FIG. 12, the residual toner collecting portion 40 includes a partition member 46, a first screw 44, and a second screw 47. The partition member 46, the first screw 44, and the second screw 47 are provided inside the residual toner accommodating portion 40*a*. The first screw 44 conveys the residual toner, dropping from the residual toner receiving opening 42*a* into the residual toner accommodating portion 40*a*, in the Z direction (i.e., in the axial direction of the photosensitive drum 11 or in the longitudinal direction of the process cartridge C). The second screw 47 is rotated by transmission thereto a driving force from the first screw 44, and conveys the residual toner, conveyed by the first screw 44, obliquely upward. The residual toner is conveyed by the first screw 44 and the second screw 47, so that a filling rate of the residual toner in the residual toner accommodating portion 40*a* is enhanced and thus the residual toner in a larger amount can be accommodated.

A drive transmission constitution of the residual toner collecting portion 40 will be described. As shown in part (b) of FIG. 12, a rotation shaft 36*a* of the stirring conveying unit 36 penetrates through a wall surface of one end side and a wall surface of the other end side of the toner accommodating portion 30*a* in the longitudinal direction (Z direction) of the toner cartridge C. With respect to the longitudinal direction (Z direction) of the toner cartridge C, a side (Z1 direction) where the stirring drive input portion 38 is disposed in referred to as a drive side, and an opposite side (Z2 direction) to the side (Z1 direction) is referred to as a non-drive side. A part of the above-described driving force inputted to the stirring drive input portion 38 is transmitted from the drive side to the non-drive side of the toner accommodating portion 30*a* by the rotation shaft 36*a* of the stirring conveying unit 36.

The toner cartridge C includes a non-drive-side gear 38*a* and a gear train 45 which are provided between the toner supplying portion 30 and the residual toner collecting portion 40 with respect to the longitudinal direction (Z direction). The non-drive-side gear 38*a* is mounted to a non-drive-side end portion of the rotation shaft 36*a* of the stirring conveying unit 36 and is rotated together with the rotation shaft 36*a*. The gear train 45 is engaged with the non-drive-side gear 38*a* and transmits a driving force, received from the non-drive-side gear 38*a*, to the first screw 44 of the residual toner collecting portion 40. As described above, inside the residual toner collecting portion 40, by the first screw 44, the second screw 47 is rotationally driven.

As shown in part (b) of FIG. 12, the toner cartridge C includes a non-drive-side side cover 60 forming an end surface of the toner cartridge C on the non-drive side (Z2 direction) in the longitudinal direction (Z direction). The non-drive-side side cover 60 is mounted to a side surface portion of the residual toner collecting portion 40 with respect to the Z2 direction. The non-drive-side side cover 60 forms a frame of the residual toner accommodating portion 40*a* (frame of the residual toner collecting portion 40) in cooperation with the accommodating frame 41 and the accommodating lid 42.

According to the above-described drive constitution, a drive transmission path through the PS drive input portion 39 and a drive transmission path through the stirring drive input portion 38 can be driven independently from each other. For this reason, the image forming apparatus can input the driving force only to the stirring drive input portion 38 without inputting the driving force to the PS drive input portion 39. In this case, even when the toner supplying portion 30 does not supply the toner to the process cartridge B, the first screw 44 and the second screw 47 in the residual toner collecting portion 40 can be driven. Conveyance of the residual toner in the residual toner accommodating portion 40*a* is continued by the first screw 44 and the second screw 47, so that a state in which the residual toner collecting portion 40 receives and collects the residual toner from the process cartridge B can be maintained.

Further, according to the above-described drive constitution, input of the drive from the printer main body A can be put together on one end side (drive side) of the toner cartridge C with respect to the longitudinal direction of the toner cartridge C. For this reason, a constitution of a driving unit, provided in the printer main body A, for inputting the driving force to the process cartridge C can be simplified. The driving unit is a drive transmitting portion including a motor which is a driving source and a gear train or the like for transmitting the driving force from the motor to the stirring drive input portion 38 and the PS drive input portion 39.

Further, by using the stirring conveying unit 36, the driving force is transmitted from the one end side (drive side) to the other end side (non-drive side) of the toner accommodating portion 30*a* in the longitudinal direction of the toner cartridge C, so that additional component parts for drive transmission can be omitted. By this, compared with the case where with respect to the longitudinal direction of the toner cartridge C, an additional driving unit for driving the residual toner collecting portion 40 is provided on the non-drive side (Z2 direction) in this embodiment, it becomes possible to downsize the toner cartridge C and the printer main body A in the Z direction. That is, when the additional driving unit is disposed, corresponding to an arrangement space thereof, the printer main body A is upsized in the Z direction, so that a gear or the like for receiving the driving force is provided to the toner cartridge C on a Z2 direction side. Compared with such a constitution, according to this embodiment, the residual toner collecting portion 40 can be driven while avoiding the upsizing of the toner cartridge C and the printer main body A in the Z direction.

(Mounting and Demounting Method of Process Cartridge B and Toner Cartridge C)

Subsequently, a mounting and demounting method of the process cartridge B and the toner cartridge C relative to the printer main body A will be described using parts (a) and (b) of FIG. 14 and parts (a) to (c) of FIG. 15. Parts (a) and (b) of FIG. 14 are perspective views for illustrating the mounting and demounting method of the process cartridge B and the toner cartridge C relative to the printer main body A. Parts (a) to (c) of FIG. 15 are side views for illustrating the mounting and demounting method of the process cartridge B and the toner cartridge C relative to the printer main body A.

As shown in part (a) of FIG. 14, inside the printer main body A, a mounting portion (mounting space) in which the process cartridge B and toner cartridge C are mounted is provided. The printer main body A is provided with an open/close door 107 (see also FIG. 2) as an openable member movable (openable) to a closed position where the open/close door 107 closes the mounting portion and an open position where the open/close door 107 opens the mounting portion. The open/close door 107 is provided rotatably about a rotational axis R5 relative to the frame of the printer main body A. As shown in part (a) of FIG. 14, in a state in which the open/close door 107 is opened, mounting and demounting of the process cartridge B and the toner cartridge C are permitted.

The printer main body A includes guiding portions 108 and 109. The process cartridge B includes a portion-to-be-guided projecting from an end surface of each of left and right sides thereof. The process cartridge B is guided by the guiding portions 108 and 109 at the portions-to-be-guided thereof, and is moved in a predetermined mounting direction develop relative to the printer main body A, so that the process cartridge B is mounted in a predetermined mounting completion position in the printer main body A. The mounting completion position is a position where the image forming apparatus is capable of executing an image forming operation with use of the process cartridge B.

As shown in parts (a) and (b) of FIG. 7, the process cartridge B of this embodiment includes, as the portions-to-be-guided, upper portions-to-be-guided 93 and 94 (upper bosses) and lower portions-to-be-guided 95 and 96 (lower bosses). As shown in part (a) of FIG. 15, the process cartridge B is mounted in the printer main body A in a state in which the guiding portion 108 is sandwiched between the upper portion-to-be-guided 93 and the lower portion-to-be-guided 95 and the guiding portion 109 is sandwiched between the upper portion-to-be-guided 94 and the lower portion-to-be-guided 96.

The toner cartridge C is mounted to the printer main body A in a state in which the process cartridge B is completely mounted to the printer main body A. As shown in part (b) of FIG. 15, the toner cartridge C includes positioning bosses 50*a* and 60*a* and portions-to-be-guided 50*b* and 60*b*. The positioning boss 50*a* and the portion-to-be-guided 50*b* are provided on the driving-side side cover 50 of the toner cartridge C (part (a) of FIG. 12, FIG. 13). The positioning boss 60a and the portion-to-be-guided 60b are provided on the non-driving-side side cover 60 of the toner cartridge C (part (b) of FIG. 12).

As shown in part (b) of FIG. 14 and part (b) of FIG. 15, the toner cartridge C is inserted into the printer main body A so as to place the portions-to-be-guided 50b and 60b on the guiding portions 108 and 109.

The toner cartridge C is moved in a predetermined mounting direction D relative to the printer main body A while the portions-to-be-guided 50b and 60b thereof are guided by the guiding portions 108 and 109, and is mounted in a predetermined mounting completion position in the printer main body A. The mounting completion position is a position where the toner can be supplied from the toner supplying portion 30 of the toner cartridge C to the process cartridge B. Further, the mounting completion position is a position where the residual toner can be collected from the process cartridge B to the residual toner collecting portion 40 of the toner cartridge C.

The positioning bosses 50a and 60a are disposed downstream (on the front side in the mounting direction D) of the portions-to-be-guided 50b and 60b with respect to the mounting direction D. The stay 21 of the process cartridge B is provided with abutting portions 21a and 21b (see also part (b) of FIG. 7, part (b) of FIG. 14) to which the positioning bosses 50a and 60a abut.

As shown in part (c) of FIG. 15, when the toner cartridge C is inserted into the predetermined mounting completion position, the positioning bosses 50a and 60a of the toner cartridge C abut against the abutting portions 21a and 21b of the process cartridge B, respectively. The abutting portions 21a and 21b are recessed-shaped portions opening toward an upstream side of the mounting direction D, and the positioning bosses 50a and 60a are engaged with these recessed-shaped portions. By this, the toner cartridge C is positioned to the process cartridge B. Incidentally, when the positioning bosses 50a and 60a are engaged with the abutting portions 21a and 21b, leading end portions of the portions-to-be-guided 50b and 60b in the mounting direction D somewhat float from the guiding portions 108 and 109, respectively. Further, trailing end portions of the portions-to-be-guided 50b and 60b in the mounting direction D are supported by the guiding portions 108 and 109, respectively. Thus, the position of the toner cartridge C in the printer main body A is determined.

By closing the open/close door 107 in a state in which the toner cartridge C is mounted in the mounting completion position, the image forming apparatus is in a state in which the image forming operation is executable.

In the case where the process cartridge B and the toner cartridge C are demounted from the printer main body A, a procedure opposite to the above-described procedure may only be required to be performed. That is, the toner cartridge C mounted in the mounting portion of the printer main body A is exposed by opening the open/close door 107, and then the toner cartridge C is pulled out toward an opposite side of the mounting direction D, so that the toner cartridge C is demounted from the printer main body A. Then, the process cartridge B is demounted from the printer main body A by being pulled out toward the opposite side of the mounting direction D.

(Toner Supply Passage of Process Cartridge)

Subsequently, a toner supply passage of the process cartridge B will be described using FIG. 8, parts (a) and (b) of FIG. 16, FIG. 12, and FIG. 23. Part (a) of FIG. 16 is a perspective view showing a supply opening of the process cartridge B, and part (b) of FIG. 16 is an enlarged view of a part (rectangular region of a broken line) thereof. FIG. 21 is a perspective view showing a development drive train of the process cartridge B. FIG. 23 is a schematic sectional view of the process cartridge B.

As shown in parts (a) and (b) of FIG. 16, the stay 21 of the process cartridge B is provided with a supply opening 21c for receiving the toner supplied from the toner cartridge C. Further, the stay 21 of the process cartridge B is provided with a delivery opening 21d which is an opening through which the toner is delivered to the developing unit 15. The developing unit 15 is provided with a receiving opening 153a which is an inlet of the toner receiving chamber 153.

The toner discharged toner the toner discharge opening 34a (FIG. 17) of the toner cartridge C is received by the toner receiving chamber 153 through the supply opening 21c, the delivery opening 21d, and the receiving opening 153a. The toner receiving chamber 153 is provided with a conveying member 153b for conveying the toner. Further, the toner receiving chamber 153 and the toner accommodating chamber 152 communicate with each other through a communicating opening 152a. The toner received by the toner receiving chamber 153 is conveyed to the communicating opening 152a, and passes through the communicating opening 152a and moves to the toner accommodating chamber 152.

To a periphery of the receiving opening 153a of the toner receiving chamber 153, a sealing member 153c is attached. The sealing member 153c closes a gap between the stay 21 and the developing unit 15 at a periphery of the delivery opening 21d on the stay 21 side and the receiving opening 153a on the developing unit 15 side.

As shown in parts (a) and (b) of FIG. 8 and FIG. 21, the developing unit 15 of the process cartridge B is provided with a developing coupling 155 as a drive input member for receiving the driving force from the printer main body A. Further, the developing unit 15 is provided with a developing roller gear 16a for transmitting a rotational force to the developing roller 16 and a stirring gear 154a for transmitting a rotational force to the stirring member 154. The driving force inputted to the developing coupling 155 is transmitted to the developing roller gear 16a, the stirring gear 154a, and the like through a gear train provided to the process cartridge B, so that driving objects in the process cartridge B are driven.

As shown in FIG. 22, with respect to the longitudinal direction (Z direction) of the process cartridge B, on an end surface of the process cartridge B on an opposite side (non-drive side) from a side (drive side) where the developing coupling 155 is provided, contacts for receiving electric power supply from a power source circuit of the printer main body A are provided. The process cartridge B of this embodiment includes a developing contact 16b for applying a voltage for development to the developing roller 16 and a developing blade contact 18a for applying a voltage to the developing blade 18.

As shown in FIG. 23, in the direction (Z direction) of the rotational axis of the photosensitive drum 11, the supply opening 21c of the process cartridge B is disposed on a side closer to the developing coupling 155 than to the developing contact 16b. The toner supplied through the supply opening 21c is conveyed in a direction (Z2 direction) away from the developing coupling 155 in the toner receiving chamber 153, and then is conveyed to the toner accommodating chamber 152 in the developing unit 15.

(Residual Toner Conveying Passage)

A constitution in which the residual toner is conveyed from the process cartridge B to the residual toner collecting portion 40 will be described. FIG. 24 is a schematic view showing the process cartridge B and the toner cartridge C which a mutually connected state in the printer main body A. The mutually connected state in the printer main body A is a state in which each of the process cartridge B and the toner cartridge C is mounted in the mounting completion position. FIG. 25 is a sectional view of the process cartridge B and the toner cartridge C taken along e-e line of FIG. 24.

As shown in FIGS. 24 and 25, the cleaning unit 10 of the process cartridge B is provided with the above-described second residual toner conveying passage 10*c*. In the direction (Z direction) of the rotational axis of the photosensitive drum 11, the second residual toner conveying passage 10*c* is provided at an end portion which is an end portion on one end side of the process cartridge B and which is on the same side as the residual toner collecting portion 40 of the toner cartridge C. The residual toner removed from the photosensitive drum 11 by the cleaning blade 17 (FIG. 6) is accommodated in the residual toner primary accommodating portion 10*a* which is an example of the toner accommodating portion. The toner accommodated in the residual toner primary accommodating portion 10*a* is conveyed to the second residual toner conveying passage through the first residual toner conveying passage 10*b* along the direction (Z direction) of the rotational axis of the photosensitive drum 11.

The second residual toner conveying passage 10*c* is provided with a screw 25 as a conveying member for conveying the toner. The second residual toner conveying passage 10*c* extends in a direction crossing (preferably perpendicular to) the rotational axis of the photosensitive drum 11. An extending direction (rotational axis direction of the screw 25) of the second residual toner conveying passage 10*c* is a residual toner conveying direction L2. The residual toner conveying direction L2 is a direction inclined upward obliquely.

At a downstream end of the second residual toner conveying passage 10*c* in the residual toner conveying direction L2, a residual toner discharge opening 10*d* is provided. The residual toner discharge opening 10*d* is an opening through which the residual toner is discharged to an outside of the cleaning unit 10 (outside of the process cartridge B). The residual toner is discharged in a residual toner discharging direction L3 through the residual toner discharge opening 10*d*. The residual toner discharging direction L3 is a direction which is a direction crossing the residual toner conveying direction L2 and which is directed toward a lower side of a vertical direction.

The residual toner discharge opening 10*d* opposes the residual toner receiving opening 42*a* of the residual toner collecting portion 40. A space in the cleaning frame 20 communicates with a space in the residual toner accommodating portion 40*a* through the residual toner discharge opening 10*d* and the residual toner receiving opening 42*a*. The residual toner discharged through the residual toner discharge opening 10*d* passes through the residual toner receiving opening 42*a* and is received into the residual toner accommodating portion 40*a*.

The process cartridge B includes a discharge opening shutter 23 as an openable member (second openable member, sealing member, shutter member) for opening and closing the residual toner discharge opening 10*d*. The discharge opening shutter 23 closes the residual toner discharge opening 10*d* in the case where the toner cartridge c is demounted from the printer main body A and thus the residual toner receiving opening 42*a* is separated from the residual toner discharge opening 10*d*. By this, it is possible to prevent the residual toner from dropping through the residual toner discharge opening 10*d*.

(Discharge Opening Shutter)

The discharge opening shutter 23 will be specifically described using parts (a) and (b) of FIG. 26 and parts (a) and (b) of FIG. 27. Part (a) of FIG. 26 is a perspective view showing the discharge opening shutter 23 in a closed position. Part (b) of FIG. 26 is a perspective view showing the discharge opening shutter in an open position. Part (a) of FIG. 27 is a sectional view of the cleaning unit 10 taken along f1-f1 line of part (a) of FIG. 26. Part (b) of FIG. 27 is a sectional view of the cleaning unit 10 taken along f2-f2 line of part (b) of FIG. 26.

As shown in parts (a) and (b) of FIG. 26 and parts (a) and (b) of FIG. 27, the discharge opening shutter 23 is slidably (movably) supported by the cleaning frame 20 of the cleaning unit 10.

The discharge opening shutter 23 is capable of being reciprocated in a movement direction Ds crossing the residual toner discharging direction L3 which is an opening direction of the residual toner discharge opening 10*d*. The movement direction Ds of the discharge opening shutter 23 is a direction crossing (preferably perpendicular to) the direction (Z direction) of the rotational axis of the photosensitive drum 11. Further, the movement direction Ds of the discharge opening shutter 23 is a direction along the movement direction D (part (b) of FIG. 15) of the toner cartridge C. The movement direction Ds of the discharge opening shutter 23 may be parallel to the movement direction D of the toner cartridge C.

The discharge opening shutter 23 is movable between a closed position (second closed position) where the discharge opening shutter 23 closes the residual toner discharge opening 10*d* and an open position (second open position) where the discharge opening shutter 23 opens the residual toner discharge opening 10*d*. In the movement direction Ds of the discharge opening shutter 23, a direction from the closed position toward the open position is referred to as a first movement direction Ds1, and a direction from the open position toward the closed position is referred to as a second movement direction Ds2.

The discharge opening shutter 23 includes a shutter plate 23*c* provided with a shutter hole 23*d*. The discharge opening shutter 23 is urged in the second movement direction Ds2 by a shutter spring 231 (parts (a) and (b) of FIG. 26) as an urging member.

When the discharge opening shutter 23 is in the open position (parts (a) of FIG. 26 and part (a) of FIG. 27), the residual toner discharge opening 10*d* is closed by a portion of the shutter plate 23*c* other than the shutter hole 23*d*. When the discharge opening shutter 23 is in the open position (part (b) of FIG. 26, part (b) of FIG. 27), as viewed in the residual toner discharging direction L3, the shutter hole 23*d* and the residual toner discharge opening 10*d* at least partially overlap with each other, so that the residual toner discharge opening 10*d* is opened. That is, when the discharge opening shutter 23 is in the open position, the discharge opening shutter permits discharge of the residual toner through the residual toner discharge opening 10*d*.

The discharge opening shutter 23 has a portion-to-be-contacted 23*g* to which a part of the toner cartridge C is contacted during mounting of the toner cartridge C. The toner cartridge C includes a shutter contact portion 42*b* (FIG. 20) contacting the discharge opening shutter 203 during the mounting of the toner cartridge C. The portion-to-be-contacted 23*g* is provided on at least one end side (may also be on both sides) of the residual toner discharge opening 10*d* with respect to a direction (particularly, the Z direction) perpendicular to the movement direction Ds of the discharge opening shutter 23. Correspondingly thereto, the shutter contact portion 42*b* is provided on at least one end side (may also be on both sides) of the residual toner receiving opening 42*a* with respect to the direction (particularly, the Z direction) perpendicular to the movement direction Ds of the discharge opening shutter 23 (FIG. 20). The shutter contact portion 42*b* is a projection formed on the accommodating lid 42 of the residual toner collecting portion 40.

Before the toner cartridge C is mounted, the discharge opening shutter 23 is held in the closed position by an urging force of the shutter spring 231. When the toner cartridge C is inserted toward the mounting direction D, the shutter contact portion 42*b* contacts the portion-to-be-contacted 23*g* of the discharge opening shutter 23 and presses the discharge opening shutter 23 toward a downstream side of the mounting direction D. By this, the discharge opening shutter 23 is moved in the first movement direction Ds1 (opposite to a direction in which the discharge opening shutter 23 is urged by the shutter spring 231). Then, movement of the shutter from the closed position to the open position is completed until the toner cartridge C reaches the mounting completion position.

As described later, in interrelation with the mounting of the toner cartridge C, the receiving opening shutter 43 is also moved from the closed position to the open position, so that the residual toner receiving opening 42*a* is opened. For this reason, by the completion of the mounting of the toner cartridge C, the residual toner discharge opening 10*d* and the residual toner receiving opening 42*a* communicate with each other, so that it becomes possible to discharge the residual toner from the process cartridge B to the toner cartridge C.

In the case where the toner cartridge C is demounted from the printer main body A, the discharge opening shutter 23 is released from pressing of the shutter contact portion 42*b* and is moved in the second movement direction Ds2 by the urging force of the shutter spring 231. For this reason, the discharge opening shutter 23 is moved from the open position to the closed position in interrelation with the demounting of the toner cartridge C.

(Discharging Opening Lock)

A discharge opening lock 24 as a restricting member (second restricting member, discharge opening shutter locking member) for restricting the movement of the discharge opening shutter 23 will be described using parts (a) and 8*b*) of FIG. 28, parts (a) and (b) of FIG. 29, and parts (a) and (b) of FIG. 30.

Part (a) of FIG. 28 is a schematic view showing the discharge opening shutter 23 and the discharge opening lock 24 when the discharge opening shutter 23 is in the closed position and the discharge opening lock 24 is in a lock position. Part (b) of FIG. 28 is a schematic view showing the discharge opening shutter 23 and the discharge opening lock 24 when the discharge opening shutter 23 is in the open position and the discharge opening lock 24 is in a lock release position. Part (a) of FIG. 29 is a schematic view showing a state in which the discharge opening shutter 23 and the discharge opening lock 24 in part (a) of FIG. 28 are observed in an arrow F1 direction. Part (b) of FIG. 29 is a schematic view showing a state in which the discharge opening shutter 23 and the discharge opening lock 24 in part (b) of FIG. 28 are observed in an arrow F2 direction. Part (a) of FIG. 30 is a sectional view of the discharge opening shutter 23 and the discharge opening lock 24 taken along g1-g1 line of part (a) of FIG. 29. Part (b) of FIG. 30 is a sectional view of the discharge opening shutter 23 and the discharge opening lock 24 of part (b) of FIG. 29.

As shown in part (a) of FIG. 28, part (a) of FIG. 29, and part (a) of FIG. 30, the discharge opening lock 24 includes a first engaging portion 24*a* and a second engaging portion 24*b*. The discharge opening shutter includes a first portion-to-be-engaged 23*a* engaged by the first engaging portion 24*a* and a second portion-to-be-engaged 23*b* engaged by the second engaging portion 24*b*.

As described in the following, by engagement between the first engaging portion 24*a* and the first portion-to-be-engaged 23*a*, the discharge opening lock 24 restricts movement of the discharge opening shutter 23 from the closed position to the open position. Further, by engagement between the second engaging portion 24*b* and the first portion-to-be-engaged 23*b*, movement of the discharge opening lock 24 toward a direction in which the first engaging portion 24*a* is disengaged from the first portion-to-be-engaged 23*a*.

As shown in part (a) of FIG. 30, one of the first engaging portion 24*a* and the first portion-to-be-engaged 23*a* is a projected-shaped portion projecting in a direction crossing the movement direction Ds of the discharge opening shutter 23, and the other one of the first engaging portion 24*a* and the first portion-to-be-engaged 23*a* is a recessed-shaped portion engaging with the projected-shaped portion. In this embodiment, the first engaging portion 24*a* is the projected-shaped portion and the first portion-to-be-engaged 23*a* is the recessed-shaped portion, but a relationship therebetween may be replaced.

The discharge opening lock 24 is supported rotatably (movably) about a supporting shaft 24*c*. The discharge opening lock 24 is movable to the lock position (part (a) of FIG. 30, engaging position) where the first engaging portion 24*a* and the first portion-to-be-engaged 23*a* are engaged with each other and the lock release position (part (b) of FIG. 30, engagement release position, disengaging position) where the engagement between the first engaging portion 24*a* and the first portion-to-be-engaged 23*a* is released.

In a movement direction N when the discharge opening lock 24 is moved between the lock position and the lock release position, a direction from the lock position toward the lock release position is a first movement direction N1, and a direction from the lock release position toward the lock position is a second movement direction N2. The movement direction of the discharge opening lock 24 (particularly, a movement direction of the first engaging portion 24*a*) is a direction crossing (preferably perpendicular to) the movement direction Ds of the discharge opening shutter 23.

The discharge opening lock 24 is urged toward the lock position (i.e., toward the second movement direction N2) by a lock spring 241 (part (b) of FIG. 29).

In a state in which the first engaging portion 24*a* and the first portion-to-be-engaged 23*a* are engaged with each other (part (a) of FIG. 30), movement of the discharge opening shutter 23 toward the movement direction Ds (particularly, toward the first movement direction Ds1) is restricted. That is, the discharge opening lock 24 restricts the movement of the discharge opening shutter 23 from the closed position to the open position. In a state in which the engagement between the first engaging portion 24*a* and the first portion-to-be-engaged 23*a* is released (part (b) of FIG. 30). Movement restriction of the discharge opening shutter 23 toward the first movement direction Ds1 is released. That is, the discharge opening lock 24 permits movement of the discharge opening shutter 23 from the closed position toward the open position.

The discharge opening lock 24 is a portion-to-be-contacted 24*d* (part (a) of FIG. 28) to which a part of the toner cartridge C is contacted during mounting of the toner cartridge C. The toner cartridge C includes a lock contact portion 49 (FIG. 20) contacting the discharge opening lock 24. The portion-to-be-contacted 24*d* includes an inclined surface inclined relative to the mounting direction D of the toner cartridge C as viewed in a direction (Z direction in this embodiment) of a rotational axis of the discharge opening lock 24. A direction of inclination of the inclined surface is set so that the discharge opening lock 24 is moved from the lock position to the lock release position in the case where the lock contact portion 49 of the toner cartridge C is moved in the mounting direction D while contacting the inclined surface of the portion-to-be-contacted 24*d*.

The portion-to-be-contacted 24*d* of the discharge opening lock 24 is provided so as to contact the lock contact portion 49 of the toner cartridge C before the shutter contact portion 42*b* (FIG. 20) of the toner cartridge C contacts the portion-to-be-contacted 23*g* (part (a) of FIG. 26) of the discharge opening shutter 23.

As shown in part (a) of FIG. 29, one of the second engaging portion 24*b* and the second portion-to-be-engaged 23*b* is a projected-shaped portion projecting in a direction along the movement direction N of the discharge opening lock 24, and the other one of the second engaging portion 24*b* and the second portion-to-be-engaged 23*b* is a recessed-shaped portion engaging with the projected-shaped portion. In this embodiment, the second engaging portion 24*b* is the projected-shaped portion and the second portion-to-be-engaged 23*b* is the recessed-shaped portion, but a relationship therebetween may be replaced.

By engagement between the second engaging portion 24*b* and the second portion-to-be-engaged 23*b*, the discharge opening lock 24 is restricted in attitude change in a direction different from the movement direction N during movement thereof between the lock position and the lock release position. The discharge opening lock 24 can be moved to the lock position (part (a) of FIG. 29) and the lock release position (part (b) of FIG. 29) while being kept in a state of the engagement between the second engaging portion 24*b* and the second portion-to-be-engaged 23*b*. In other words, the above-described shutter includes a guiding portion (second portion-to-be-engaged 23*b*) for guiding the above-described restricting member so as to restrict relative movement of the restricting member to the above-described shutter in the above-described direction of the rotational axis. Further, during the movement of the restricting member from the engaging position to the engagement release position.

(Operation of Discharge Opening Lock During Mounting and Demounting of Cartridge)

An operation of the discharge opening lock 24 in the case where the process cartridge B and the toner cartridge C are mounted to and demounted from the printer main body A will be described.

First, a state in which the process cartridge B is mounted to the printer main body A and the toner cartridge C is demounted from the printer main body A will be described. In this state, the discharge opening shutter 23 is in the closed position as described above. Further, in this state, the discharge opening lock 24 is held in the lock position (part (a) of FIG. 28, part (a) of FIG. 29, part (a) of FIG. 30) by the urging force of the lock spring 241. The discharge opening lock 24 is positioned in the lock position, and therefore, even when the user touches the discharge opening shutter 23, the movement of the discharge opening shutter 23 from the closed position to the open position is restricted by the engagement between the first engaging portion 24*a* and the first portion-to-be-engaged 23*a*.

Next, the case where the toner cartridge C is mounted to the printer main body A in a state in which the process cartridge B is mounted to the printer main body 4 will be described. When the toner cartridge C is inserted into the printer main body A along the mounting direction D, first, the lock contact portion 49 (FIG. 20) of the toner cartridge C contacts the portion-to-be-contacted 24*d* (part (a) of FIG. 28) of the discharge opening lock 24. The discharge opening lock 24 is moved from the lock position (part (a) of FIG. 30) to the lock release position (part (b) of FIG. 30) by being pressed by the lock contact portion 49. In other words, the above-described restricting member further includes a portion-to-be-pressed (portion-to-be-contacted 24*d*) and is moved from the engaging position to the engagement release position in the case where the portion-to-be-pressed is pressed. Thus, in interrelation with the mounting of the toner cartridge C to the printer main body A, movement restriction of the discharge opening shutter 23 by the discharge opening lock 24 is released.

Subsequent to the movement of the discharge opening lock 24, the shutter contact portion 42*b* (FIG. 20) of the toner cartridge C contacts the portion-to-be-contacted 23*g* (part (a) of FIG. 26) of the discharge opening shutter 23. The discharge opening shutter 23 is moved from the closed position (part (a) of FIG. 26, part (a) of FIG. 27) to the open position (part (b) of FIG. 26, part (b) of FIG. 27) by being pressed by the shutter contact portion 42*b*. Thus, in interrelation with the mounting of the toner cartridge C toward the printer main body A, the discharge opening shutter 23 in a state in which the movement restriction thereof by the discharge opening lock 24 is moved from the closed position to the open position, so that the residual toner discharge opening 10*d* of the process cartridge B is opened.

Next, the case where the toner cartridge C mounted to the printer main body A is demounted from the printer main body A in a state in which the process cartridge B is mounted to the printer main body A will be described. In this case, the lock contact portion 49 and the shutter contact portion 42*b* (FIG. 20) of the toner cartridge C are separated from the portion-to-be-contacted 24*d* of the discharge opening lock 24 and the portion-to-be-contacted 23*g* of the discharge opening shutter 23, respectively. The discharge opening shutter 23 is moved from the open position to the closed position by the urging force of the shutter spring 231 (part (a) of FIG. 26). Thus, in interrelation with demounting of the toner cartridge C from the printer main body A, the discharge opening shutter 23 is moved from the open position to the closed position, so that the residual toner discharge opening 10*d* of the process cartridge B is closed.

Further, the discharge opening lock 24 is moved from the lock release position to the lock position by the urging force of the lock spring 241 (part (b) of FIG. 29). Thus, in interrelation with the demounting of the toner cartridge C from the printer main body A, the discharge opening lock 24 is in a state in which movement of the discharge opening shutter 23, moved to the closed position, toward the open position is restricted. That is, in the printer main body A, it is possible to prevent unintentional opening of the residual toner discharge opening 10*d* of the process cartridge B.

Incidentally, also, in a state in which the process cartridge B is demounted from the printer main body A, a state in which the discharge opening shutter 23 is in the closed position and the discharge opening lock 24 in the lock position is maintained. For this reason, even after the process cartridge B is taken out from the printer main body A during exchange of the process cartridge B, the movement of the discharge opening shutter 23 from the closed position toward the open position is restricted. Thus, it is possible to prevent unintentional opening of the residual toner discharge opening 10*d* of the process cartridge B taken out to the outside of the printer main body A.

Here, a function of the second engaging portion 24*b* and the second portion-to-be-engaged 23*b* when the discharge opening lock 24 is moved from the lock position to the lock release position will be described. In this embodiment, by the second engaging portion 24*b* and the second portion-to-be-engaged 23*b*, the movement direction of the discharge opening lock 24 is restricted to the movement direction N (part (a) of FIG. 28, part (a) of FIG. 29) between the lock position and the lock release position. In other words, by engagement between the second engaging portion and the second portion-to-be-engaged, the movement of the restricting member toward the direction crossing the movement direction is restricted, so that the engagement between the second engaging portion and the second portion-to-be-engaged is maintained during movement of the restricting member from the engaging position to the engagement release position.

For this reason, an attitude of the discharge opening lock 24 when the discharge opening lock 24 is moved from the lock position to the lock release position is stabilized, so that release of the movement restriction of the discharge opening shutter 23 by the discharge opening lock 24 can be performed with reliability.

As shown in parts (a) and (b) of FIG. 30, in the case where the discharge opening shutter 23 and the discharge opening lock 24 are viewed in a direction (Z direction) of the rotational axis of the discharge opening lock 24, it is preferable that during movement of the discharge opening lock 24 from the lock position to the lock release position, a state in which the second engaging portion 24*b* which is the projected-shaped portion and the second portion-to-be-engaged 23*b* at least partially overlap with each other is maintained. In other words, during movement of the restricting member from the engaging position to the engagement release position, as viewed in the direction of the rotational axis, a state in which the projected-shaped portion and the recessed-shaped portion at least partially overlap with each other is maintained. By this, the attitude of the discharge opening lock 24 can be further stabilized.

(Receiving Opening Shutter)

A receiving opening shutter 43 of the toner cartridge C (residual toner collecting portion 40) will be specifically described using parts (a) and (b) of FIG. 31, parts (a) and (b) of FIG. 32, and FIG. 33.

Part (a) of FIG. 31 is a schematic view showing the receiving opening shutter 43 and a receiving opening lock 48 when the receiving opening shutter 43 is in a closed position and a receiving opening lock 48 is in a lock position. Part (b) of FIG. 31 is a schematic view showing the receiving opening shutter 43 and the receiving opening lock 48 when the receiving opening shutter 43 is in an open position and the receiving opening lock 48 is in a lock release position. Part (a) of FIG. 32 is a schematic view showing a state in which the receiving opening shutter 43 and the receiving opening lock 48 in part (a) of FIG. 31 are observed from obliquely above. Part (b) of FIG. 32 is a schematic view showing a state in which the receiving opening shutter 43 and the receiving opening lock 48 in part (b) of FIG. 31 are observed from obliquely above. FIG. 33 is a sectional view of the toner cartridge C taken along g-g line of part (b) of FIG. 31.

As shown in parts (a) and (b) of FIG. 31, parts (a) and (b) of FIG. 32, and FIG. 33, the receiving opening shutter 43 is rotatably (swingably) supported by the accommodating lid 42 which is a part of the residual toner collecting portion 40. The receiving opening shutter 43 is movable to the closed position where the receiving opening shutter 43 closes the residual toner receiving opening 42*a* and the open position where the receiving opening shutter 43 opens the residual toner receiving opening 42*a*.

The receiving opening shutter 43 includes a shaft portion held by a bearing portion of the accommodating lid 42 and is rotationally movable along a movement direction J about a shutter rotational axis 43*c* which is a center axis of the shaft portion. The predetermined rotational axis 43*c* extends in a direction crossing (preferably perpendicular to) the mounting direction D of the toner cartridge C. In the movement direction J of the toner cartridge C, a direction from the closed position toward the open position is a first movement direction J1, and a direction from the open position toward the closed position is a second movement direction J2.

The receiving opening shutter 43 is urged toward the second movement direction J1 (i.e., toward the closed position) by a shutter spring 431 (FIG. 33) as an urging member.

When the receiving opening shutter 43 is in the closed position (part (b) of FIG. 31, part (b) of FIG. 32), the residual toner receiving opening 42*a* is closed by the receiving opening shutter 43. When the receiving opening shutter 43 is in the open position (part (a) of FIG. 31, part (a) of FIG. 32), the receiving opening shutter 43 is opened. That is, when the receiving opening shutter 43 is in the open position, the receiving opening shutter 43 permits reception of the residual toner by the residual toner collecting portion 40 through the residual toner receiving opening 42*a*.

The receiving opening shutter 43 includes a portion-to-be-contacted 43*e* to which a part of the process cartridge B is contacted during mounting of the toner cartridge C. The process cartridge B includes a shutter contact portion 23*e* (part (a) of FIG. 26, part (a) of FIG. 27) to which the receiving opening shutter 43 is contacted. The shutter contact portion 23*e* in this embodiment is a part of the discharge opening shutter 23. Incidentally, it is also possible to provide the shutter contact portion 23*e* at a portion other than the discharge opening shutter 23 of the process cartridge B or a part of the printer main body A.

In a state before the mounting of the toner cartridge C, the receiving opening shutter 43 is held in the closed position by an urging force of the shutter spring 431. When the toner cartridge C is inserted toward the mounting direction D, the shutter contact portion 23*e* of the process cartridge B contacts the portion-to-be-contacted 43*e* of the receiving opening shutter 43. The shutter contact portion 23*e* moves the receiving opening shutter 43 in the first movement direction by getting into between the receiving opening shutter 43 and the residual toner receiving opening 42*a*.

Then, movement of the receiving opening shutter 43 from the closed position to the open position is ended until the toner cartridge C reaches the mounting completion position.

In the case where the toner cartridge C is demounted from the printer main body A, the receiving opening shutter 43 is released from pressing by the shutter contact portion 23*e*, and is moved in the second movement direction J2 by the urging force of the shutter spring 431.

Thus, in interrelation with the mounting of the toner cartridge C toward the printer main body A, the receiving opening shutter 43 is moved from the closed position to the open position, so that the residual toner receiving opening 42*a* is opened. Further, in interrelation with the demounting of the toner cartridge C form the printer main body A, the receiving opening shutter 43 is moved from the open position to the closed position, so that the residual toner receiving opening 42*a* is closed. An operation of the receiving opening shutter 43 with the mounting and demounting of the toner cartridge C will be described later in combination with an operation of the discharge opening shutter 23 of the process cartridge B.

Incidentally, the receiving opening shutter 43 and the residual toner accommodating portion 40*a* are in a positional relationship in which these portions overlap with each other as viewed in the mounting direction D of the toner cartridge C. As shown in FIG. 11, the residual toner accommodating portion 40*a* includes a portion 401 which is positioned on a side upstream of the shutter rotational axis 43*c* with respect to the mounting direction D of the toner cartridge C and which overlaps with the shutter rotational axis 43*c* as viewed in the movement direction D. In other words, the toner accommodating portion includes a portion which is positioned on a side upstream of the rotational axis with respect to the mounting direction of the cartridge to the apparatus main assembly of the image forming apparatus and which overlaps with the rotational axis of the openable member as viewed in the mounting direction. That is, a constitution in which the receiving opening shutter 43 is rotated about the shutter rotational axis 43*c* is employed and the portion 401 of the residual toner accommodating portion 40*a* is disposed by utilizing a space on a side upstream of the shutter rotational axis 43*c* with respect to the mounting direction D. By this, a volume of the residual toner accommodating portion 40*a* can be made large without preventing opening and closing of the receiving opening shutter 43, so that an amount of the residual toner collectable by the residual toner collecting portion 40 can be increased.

(Receiving Opening Lock)

The receiving opening lock 48 as a restricting member (receiving opening shutter locking member) for restricting movement of the receiving opening shutter 43 of the toner cartridge C (residual toner collecting portion 40) will be described using parts (a) and (b) of FIG. 31, parts (a) and (b) of FIG. 32, and FIG. 33.

As shown in part (b) of FIG. 31, part (b) of FIG. 32, and FIG. 33, the receiving opening lock 48 includes a first engaging portion 48*a* and a second engaging portion 48*b*. The receiving opening shutter 43 includes a portion-to-be-engaged 43*a* with which the first engaging portion 48*a* is engaged and a second portion-to-be-engaged 43*b* with which the second engaging portion 48*b* is engaged.

As described in the following, by engagement between the first engaging portion 48*a* and the first portion-to-be-engaged 43*a*, the receiving opening lock 48 restricts movement of the receiving opening shutter 43 from the closed position toward the open position. Further, by engagement between the second engaging portion 48*b* and the second portion-to-be-engaged 43*b*, in the direction of the rotational axis of the receiving opening shutter 43, movement of the receiving opening lock 48 relative to the receiving opening shutter 43 is restricted.

As shown in FIG. 33, one of the first engaging portion 48*a* and the first portion-to-be-engaged 43*a* is a projected shaped portion projecting in a direction crossing the movement direction J of the receiving opening shutter 43, and the other one of the first engaging portion 48*a* and the first portion-to-be-engaged 43*a* is a recessed-shaped portion engaging with the projected-shaped portion. In this embodiment, the first engaging portion 48*a* is the projected-shaped portion, and the first portion-to-be-engaged 43*a* is the recessed-shaped portion, but a relationship between therebetween may be replaced.

The first engaging portion 48*a* extends toward the receiving opening shutter 43 on a side of the Z2 direction of the receiving opening shutter 43. In other words, the first engaging portion 48*a* extends toward the shutter on a second end portion side opposite from a first end portion side of the shutter in the direction of the rotational axis.

The receiving opening lock 48 is rotatably (swingably) supported about a lock rotational axis 48*c* by the frame of the residual toner collecting portion 40. In this embodiment, the receiving opening lock 48 is supported by a supporting portion 60*c* of the non-drive-side side cover 60 and a supporting portion 42*c* of the accommodating lid 42. The receiving opening lock 48 is movable between a lock position where the receiving opening lock 48 is engaged with the receiving opening shutter 43 in a state in which the receiving opening shutter 43 is in the closed position, and a lock release position where engagement of the receiving opening lock with the receiving opening shutter 43 is released. The lock position is a position (part (b) of FIG. 31, part (b) of FIG. 32, FIG. 33, engaging position) where the first engaging portion 48*a* and the first portion-to-be-engaged 43*a* are engaged with each other. The lock release position is a position (part (a) of FIG. 31, part (a) of FIG. 32, engagement release position, disengaging position).

In a movement direction K in which the receiving opening lock 48 is moved between the first position and the lock release position, a direction from the lock position toward the lock release position is a first movement direction K1, and a direction from the lock release position toward the lock position is a second movement direction K2 (parts (a) and (b) of FIG. 32).

A direction of the rotational axis (lock rotational axis 48*c*) of the receiving opening lock 48 crosses the rotational axis (shutter rotational axis 43*c*) of the receiving opening shutter 43 (part (a) of FIG. 31, part (a) of FIG. 32). In other words, the shutter rotational axis 43*c* is first rotational axis, and the lock rotational axis 48*c* is a second rotational axis. The direction of the lock rotational axis 48*c* may be perpendicular to the direction of the shutter rotational axis 43*c*. In this embodiment, the direction of the shutter rotational axis 43*c* is substantially parallel to the longitudinal direction (Z direction, direction of the rotational axis of the photosensitive drum 11) of the toner cartridge C. In addition, the direction of the lock rotational axis 48*c* is perpendicular to the direction of the shutter rotational axis 43*c*.

The receiving opening lock 48 is urged toward the lock position (i.e., toward the second movement direction) by a lock spring 481 (FIGS. 1 and 20) as an urging member.

In a state in which the first engaging portion 48*a* and the first portion-to-be-engaged 43*a* are engaged with each other (FIG. 33), movement toward the movement direction J (particularly toward the movement direction J1) of the receiving opening shutter 43 is restricted. That is, the receiving opening lock 48 restricts movement of the receiving opening shutter 43 from the closed position to the open position. In a state in which engagement between the first engaging portion 48*a* and the first portion-to-be-engaged 43*a* is released (part (a) of FIG. 31, part (a) of FIG. 32), restriction movement of the receiving opening shutter 43 in the first movement direction J1 is released. That is, the receiving opening lock 48 permits movement of the receiving opening shutter 43 from the closed position toward the open position.

The receiving opening lock 48 includes a portion-to-be-contacted 48*f* (part (b) of FIG. 31, part (b) of FIG. 32) to which a part of the process cartridge B is contacted during the mounting of the toner cartridge C. The portion-to-be-contacted 48*f* is a surface facing toward a downstream side of the mounting direction D in the state before the mounting of the toner cartridge C. The recess B includes a lock contact portion 23*f* (part (a) of FIG. 26, part (a) of FIG. 27) contacting the portion-to-be-contacted 48*f* of the receiving opening lock 48 during the mounting of the toner cartridge C.

In this embodiment, the lock contact portion 23*f* is a part of the discharge opening shutter 23.

The portion-to-be-contacted 48*f* of the receiving opening lock 48 is provided so that the lock contact portion 23*f* of the process cartridge B contacts the portion-to-be-contacted 48*f* before the shutter contact portion 23*e* of the process cartridge B contacts the portion-to-be-contacted 43*e* of the receiving opening shutter 43.

As shown in part (b) of FIG. 31 and part (b) of FIG. 32, one of the second engaging portion 48*b* and the second portion-to-be-engaged 43*b* is a projected-shaped portion projecting in a direction crossing a direction of the shutter rotational axis 43*c*, and the other one of the second engaging portion 48*b* and the second portion-to-be-engaged 43*b* is a recessed-shaped portion engaging with the projected-shaped portion. In this embodiment, the second engaging portion 48*b* is the projected-shaped portion, and the second portion-to-be-engaged 43*b* is the recessed-shaped portion, but a relationship between therebetween may be replaced.

The second engaging portion 48*b* engages with the receiving opening shutter 43 so as to restrict relative movement of the receiving opening lock 48 to the receiving opening shutter 43 toward the Z2 direction when the receiving opening shutter 43 is in the closed position. In other words, the restricting member includes a second engaging portion engaging with the shutter so that when the shutter is in the closed position, relative movement of the second engaging portion to the shutter in a direction from the first end portion toward the second end portion is restricted. By this constitution, in the case where the user presses the receiving opening shutter 43, the residual toner receiving opening 42*a* is not readily opened unintentionally.

The recessed-shaped portion of the second portion-to-be-engaged 43*b* is a groove-shaped portion opening toward the movement direction (first movement direction K1) when the receiving opening lock 48 is moved from the lock position to the lock release position as viewed in the direction of the shutter rotational axis 43*c*. In other words, when the recessed shaped portion is viewed in the direction of the second rotational axis, the recessed-shaped portion is the groove-shaped portion opening toward one side of the movement direction in which the second engaging portion moves about the second rotational axis. By this, the receiving opening lock 48 is rotated about the shutter rotational axis 43*c*, so that it becomes possible to perform an operation in which the second engaging portion 48*b* is engaged with and disengaged from the second portion-to-be-engaged 43*b*.

By engagement between the second engaging portion 48*b* and the second portion-to-be-engaged 43*b*, in the shutter rotational axis 43*c*, movement of the receiving opening lock 48 relative to the receiving opening shutter 43 is restricted.

(Engagement Between Second Engaging Portion and Second Portion-to-be-Engaged)

Action resulting from the engagement between the second engaging portion 48*b* and the second portion-to-be-engaged 43*b* will be described.

In a state in which the toner cartridge C is demounted from the printer main body A, the user can touch the receiving opening shutter 43. In the case where the user touches the receiving opening shutter 43 and receiving opening shutter 43 receives a pressing force in a direction (first movement direction J1) from the closed position toward the open position. When the receiving opening shutter 43 is moved to the open position, the residual toner receiving opening 42*a* is opened unintentionally.

In this embodiment, in a state in which the toner cartridge C is demounted from the printer main body A, the receiving opening lock 48 is in the lock position, so that movement of the receiving opening shutter 43 toward the open position is restricted by engagement between the first engaging portion 48*a* and the first portion-to-be-engaged 43*a* (FIG. 33).

However, in the case where the receiving opening shutter 43 is strongly pressed in the first movement direction J1, the receiving opening lock 48 receives a pressing force through the receiving opening shutter 43, so that there was a possibility that engagement between the first engaging portion 48*a* and the first portion-to-be-engaged 43*a* is released.

Figure 1:
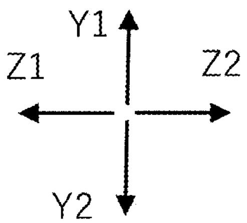
FIG. 1 is an illustration of a receiving opening shutter and a receiving opening lock in an embodiment.
Figure 1:
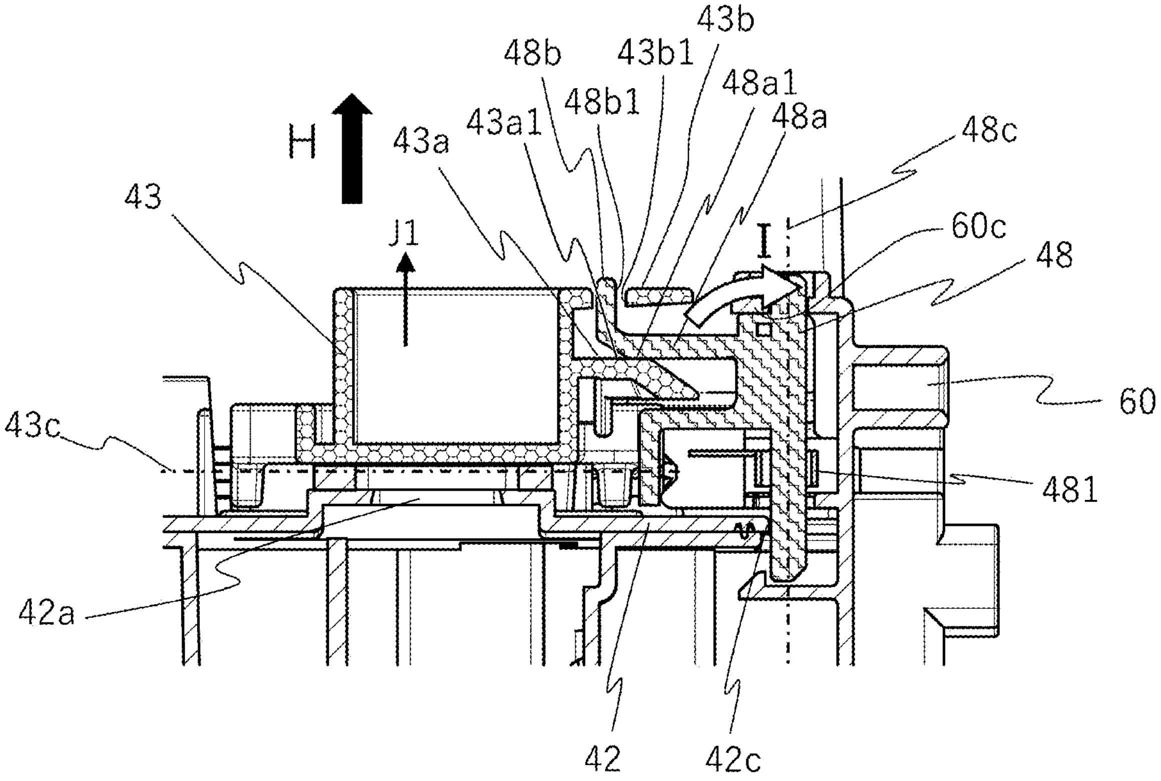

The case where the engagement between the first engaging portion 48*a* and the first portion-to-be-engaged 43*a* is released will be described using FIG. 1. FIG. 1 is a sectional view of the toner cartridge C taken along h-h line of FIG. 33.

FIG. 1 shows a state in which the receiving opening shutter 43 is in the closed position and the receiving opening lock 48 is in the lock position and in which the receiving opening shutter 43 receives a strong pressing force H in the direction (first movement direction J1) toward the open position.

In the following, release of the engagement between the first engaging portion 48*a* and the first portion-to-be-engaged 43*a* is described on the assumption that the second engaging portion 48*b* and the second portion-to-be-engaged 43*b* are not present in FIG. 1, and thereafter, the action of the second engaging portion 48*b* and the second portion-to-be-engaged 43*b* in this embodiment will be described.

When the receiving opening shutter 43 receives the pressing force H, the receiving opening lock 48 receives at least a part of the pressing force H in a contact portion between the first engaging portion 48*a* and the first portion-to-be-engaged 43*a*. A lower portion of the receiving opening lock 48 is held by the supporting portion 42*c* provided to the accommodating lid 42 of the residual toner collecting portion 40. The lower portion of the receiving opening lock 48 is restricted in movement of the receiving opening shutter 43 toward a direction (particularly toward the Z1 direction) of the shutter rotational axis 43*c* by the supporting portion 42*c*. Further, in the direction of the shutter rotational axis 43*c*, a contact position between the first engaging portion 48*a* and the first portion-to-be-engaged 43*a* (contact position between a first surface 43*al* and a third surface 48*al* described later) is different from a position of the supporting portion 42*c*. For that reason, in the receiving opening lock 48 receiving the force in a contact portion between the first engaging portion 48*a* and the portion-to-be-engaged 43*a*, rotation moment I about the supporting portion 42*c* in the clockwise direction in FIG. 1 generates.

By the rotation moment I, the receiving opening lock 48 is liable to rotate so that an upper portion of the receiving opening lock 48 moves in the Z2 direction. In other words, the receiving opening lock 48 is liable to move so that the lock rotational axis 48*c* inclines in the clockwise direction in FIG. 1 about the supporting portion 42*c*. Further, in other words, by the rotation moment I, the receiving opening lock 48 is liable to move relative to the receiving opening shutter 43 so that an amount of engagement (engaging amount) between the first engaging portion 48*a* and the first portion-to-be-engaged 43*a* becomes small. The amount of engagement (engaging amount) between the first engaging portion 48*a* and the first portion-to-be-engaged 43*a* is a width, in the direction of the shutter rotational axis 43*c*, of a contacting region in which the first engaging portion 48*a* and the first portion-to-be-engaged 43*a* are in contact with each other when the receiving opening shutter 43 receives the pressing force H in the first movement direction J1.

When the engagement between the first engaging portion 48*a* and the first portion-to-be-engaged 43*a* is released (when the amount of the engagement becomes zero) by the movement of the receiving opening lock 48, restriction of the movement of the receiving opening shutter 43 by the receiving opening lock 48 is released. As a result, the receiving opening shutter 43 is moved to the open position in accordance with the pressing force H.

Next, the case of this embodiment in which the second engaging portion 48*b* and the second portion-to-be-engaged 43*b* are provided will be described.

As shown in FIG. 1, in this embodiment, the projected-shaped second engaging portion 48*b* engages with the recessed-shaped second portion-to-be-engaged 43*b* for receiving the projected-shaped portion. By engagement between the second engaging portion 48*b* and the second portion-to-be-engaged 43*b*, in the direction of the shutter rotational axis 43*c*, movement of the receiving opening lock 48 relative to the receiving opening shutter 43 is restricted.

For this reason, the receiving opening shutter 43 receives the pressing force H, and even when the rotation moment I in the clockwise direction in FIG. 1 generates in the receiving opening lock 48, the receiving opening lock 48 is not moved in the direction of the shutter rotational axis 43*c*. Further, a decrease in amount of engagement (engaging amount) between the first engaging portion 48*a* and the first portion-to-be-engaged 43*a* is suppressed. As a result, the engagement between the first engaging portion 48*a* and the first portion-to-be-engaged 43*a* is maintained, so that the movement of the receiving opening shutter 43 from the closed position toward the open position can be restricted.

Thus, by providing the second engaging portion 48*b* and the second portion-to-be-engaged 43*b*, it is possible to prevent the residual toner detecting opening 42*a* of the toner cartridge from being unintentionally opened.

A relationship between the receiving opening shutter 43 and the receiving opening lock 48 will be further described using FIG. 1. The receiving opening shutter 43 includes the first surface 43*al* extending in a direction crossing the first movement direction J1 and a second surface 43*b*1 extending in a direction crossing the shutter rotational axis 43*c*. In other words, the openable member includes a first surface extending in a direction crossing the movement direction in which the openable member is moved from the closed position toward the open position and a second surface extending in a direction crossing the direction of the rotational axis. The first surface 43*al* is a surface facing toward the Y1 direction of the first portion-to-be-engaged 43*a*. The second surface 43*b*1 is a surface facing toward the Z1 direction of the second portion-to-be-engaged 43*b*.

The receiving opening lock 48 includes a third surface 48*al* opposing the first surface 43*a* of the receiving opening shutter 43 and a fourth surface 48*b*1 opposing the second surface 43*b*1 of the receiving opening shutter 43 in a state in which the receiving opening shutter 43 is in the closed position and the receiving opening lock 48 is in the lock position. In other words, the restricting member includes the third surface opposing the first surface in an engagement state in which the openable member is in the closed position and the restricting member is in the engaging position, and includes a fourth surface opposing the second surface in the engagement state. The third surface 48*al* is a surface facing toward the Y2 direction of the first engaging portion 48*a*. The fourth surface 48*b*1 is a surface facing toward the Z1 direction of the second engaging portion 48*b*.

In other words, the restricting member includes a contact surface (third surface 48*a*1) facing toward a direction (Z2 direction) from the first end portion toward the second end portion in a state in which the restricting member is in the engaging position. Further, the shutter includes a surface-to-be-contacted (fourth surface 48*b*1) facing toward a direction (Z1) from the second end portion toward the first end portion in a state in which the shutter is in the closed position. By contact between the contact surface and the surface-to-be-contacted, relative movement of the restricting member to the shutter in the direction (Z2 direction) from the first end portion toward the second end portion is restricted.

In the following, this will be specifically described. In the case where the receiving opening shutter 43 receives the pressing force H in a state of FIG. 1 in which the receiving opening shutter 43 is in the closed position and the receiving opening lock 48 is in the lock position, by the contact between the first surface 43*al* and the third surface 48*al*, movement of the receiving opening shutter 43 from the closed position toward the open position is restricted. Further, in the case where the receiving opening shutter 43 receives the pressing force H in the state of FIG. 1, by the contact between the second surface 43*b*1 and the fourth surface 48*b*1, movement of the receiving opening lock 48 in the Z2 direction is restricted so that a contact area between the first surface 43*al* and the third surface 48*al* becomes small. In other words, in the case where the openable member receives an external force in the engagement state, movement of the openable member from the closed position toward the open position is restricted by the contact between the first surface and the third surface, and movement of the restricting member in the direction of the rotational axis by the contact between the second surface and the fourth surface so that the contact area between the first surface and the third surface becomes small.

Thus, the first surface 43*al* and the second surface 43*b*1 are provided to the receiving opening shutter 43, and the third surface 48*a*1 and the fourth surface 48*b*1 are provided to the receiving opening lock 48, so that unintentional opening of the residual toner receiving opening 42*a* of the toner cartridge C can be prevented.

As described later, the receiving opening lock 48 includes the portion-to-be-contacted 48*f* as a portion-to-be-pressed which is pressed by a part of the process cartridge B during the mounting of the toner cartridge C to the printer main body A. The receiving opening lock 48 is moved from the lock position to the lock release position in the case where the portion-to-be-contacted 48*f* is pressed, and is moved from the lock release position to the lock position in the case where pressing of the portion-to-be-contacted 48*f* is released. In other words, the restricting member further includes a portion-to-be-pressed, and the restricting member is moved from the engaging position to the engagement release position in the case where the portion-to-be-pressed is pressed and is moved from the engagement release position to the engaging position by the urging force of the urging member in the case where the pressing of the portion-to-be-pressed is released.

By this constitution, the receiving opening lock 48 is in the lock position in the toner cartridge C in a state in which the toner cartridge C is taken out from the printer main body A, and therefore, the residual toner receiving opening 42*a* can be prevented from being unintentionally opened.

Incidentally, in this embodiment, an example in which the second portion-to-be-engaged 43*b* is the recessed-shaped portion (groove-shaped portion) was described, but when the second engaging portion 48*b* and the second portion-to-be-engaged 43*b* are constituted so as to restrict the movement of the second engaging portion 48*b* in the Z2 direction, an advantage similar to the advantage of this embodiment can be obtained.

Further, in this embodiment, an example in which the second portion-to-be-engaged 43*b* is the recessed-shaped portion and the second engaging portion 48*b* is the projected-shaped portion was described, but the second portion-to-be-engaged 43*b* may also be the projected-shaped portion and the second engaging portion 48*b* may also be the recessed-shaped portion.

(Operation of Each Shutter and Receiving Opening Lock During Mounting and Demounting of Cartridge)

An operation of the receiving opening lock 48 in the case where the process cartridge B and the toner cartridge C are mounted to and demounted from e printer main body A will be described using FIGS. 34 to 40. In this embodiment, the receiving opening lock 48 contacts the discharge opening shutter 23 of the process cartridge B, and therefore, an operation of the discharge opening shutter 23 is also described in combination.

Each of FIGS. 34 to 40 is an illustration showing stages of a process for mounting the toner cartridge C to the printer main body A in a state in which the process cartridge B is mounted to the printer main body A. In this embodiment, by a mounting operation of the toner cartridge C, the process cartridge B and the toner cartridge C are sequentially shifted in state from a state of FIG. 34 to a state of FIG. 40.

FIG. 34 shows the state during mounting of the toner cartridge C to the printer main body A. FIG. 35 shows the state when the receiving opening lock 48 is started to move from the state of FIG. 34. FIG. 36 shows the state when engagement between the receiving opening lock 48 and the receiving opening shutter 43 is released. FIG. 37 shows the state during movement of the receiving opening shutter 43 from the closed position toward the open position. FIG. 38 shows the state when the discharge opening lock 24 is started to move. FIG. 39 shows the state when engagement between the discharge opening lock 24 and the discharge opening shutter 23 is released. FIG. 40 shows the state when the discharge opening shutter 23 is moved to the open position and the toner cartridge C reaches the mounting completion position. Incidentally, as regards FIGS. 38, 39, and 40, for explanation, only the residual toner collecting portion 40 is illustrated for the toner cartridge C.

As shown in FIG. 34, the toner cartridge C is inserted into the printer main body A in the mounting direction D. In a state in which the receiving opening shutter 43 and the receiving opening lock 48 of the toner cartridge C contact the process cartridge B, the receiving opening shutter 43 is in the closed position and the receiving opening lock 48 is in the lock position.

Subsequently, as shown in FIG. 35, the portion-to-be-contacted 48*f* of the receiving opening lock 48 contacts the lock contact portion 23*f* of the discharge opening shutter 23 of the process cartridge B. In other words, the portion-to-be-pressed (portion-to-be-contacted 48*f*) is pressed by the second openable member (discharge opening shutter 23) in the case where the toner cartridge is mounted to the apparatus main assembly in a state in which the process cartridge is mounted to the apparatus main assembly. As shown in FIG. 36, the receiving opening lock 48 is moved in the first movement direction K1 from the lock position toward the lock release position by being pressed by the lock contact portion 23*f*, and reaches the lock release position. Thus, in interrelation with the mounting of the toner cartridge C to the printer main body A, restriction of the movement of the receiving opening shutter 43 by the receiving opening lock 48 is released.

Subsequently, as shown in FIG. 37, the portion-to-be-contacted 43*e* of the receiving opening shutter 43 contacts the shutter contact portion 23*e* of the discharge opening shutter 23 of the process cartridge B. The receiving opening shutter 43 is started to move from the closed position toward the open position in the first movement direction J1 by being pressed by the shutter contact portion 23*e*. Thereafter, the receiving opening shutter 43 reaches the open position until the toner cartridge C reaches the mounting completion position. Thus, in interrelation with the mounting of the toner cartridge C to the printer main body A, the receiving opening shutter 43 in a state in which restriction of the movement by the receiving opening lock 48 is released is moved from the closed position toward the open position.

Subsequently, as shown in FIG. 38, the lock contact portion 49 of the toner cartridge C contacts the portion-to-be-contacted 24*d* of the discharge opening lock 24 of the process cartridge B. As shown in FIG. 39, the discharge opening lock 24 is moved by the lock contact portion 49 from the lock position toward the lock release position in the first movement direction N1 and reaches the lock release position.

Subsequently, as shown in FIG. 40, the shutter contact portion 42*b* of the toner cartridge C contacts the portion-to-be-contacted 23*g* of the discharge opening shutter 23 of the process cartridge B. The discharge opening shutter 23 is moved from the closed position toward the open position in the first movement direction Ds1 by being pressed by the shutter contact portion 42*b*.

Thus, in the toner cartridge C, in interrelation with the mounting operation of the toner cartridge C, restriction of the movement of the receiving opening shutter 43 by the receiving opening lock 48 is released, and further, the receiving opening shutter 43 is moved from the closed position to the open position. Further, in the process cartridge B, in interrelation with the mounting operation, restriction of the movement of the discharge opening shutter 23 by the discharge opening lock 24 is released, and further, the discharge opening shutter 23 is moved from the closed position to the open position.

By this, an inside space of the process cartridge B and an inside space of the toner cartridge C communicate with each other through the residual toner discharge opening 10*d* and the residual toner receiving opening 42*a*. That is, a state in which the process cartridge B discharges the residual toner, collected from the photosensitive drum 11, through the residual toner discharge opening 10*d* and in which the toner cartridge B is capable of receiving the residual toner through the residual toner receiving opening 42*a* is formed.

Next, the case where the toner cartridge C mounted to the printer main body A is demounted from the printer main body A in a state in which the process cartridge B is mounted to the printer main body A will be described. In this case, the residual toner discharge opening 10*d* and the residual toner receiving opening 42*a* are closed by following the process of FIGS. 35 to 40 in reverse.

That is, the toner cartridge C is pulled out toward an opposite side with respect to the mounting direction D, so that the receiving opening shutter 43 is separated from the shutter contact portion 23*e*, and the receiving opening lock 48 is separated from the lock contact portion 23*f*. The receiving opening shutter 43 released from the shutter contact portion 23*e* is moved from the open position to the closed position by the urging force of the shutter spring 431. The receiving opening lock 48 released from the lock contact portion 23*f* is moved from the lock release position to the lock position by the urging force of the lock spring 481.

Further, the toner cartridge C is pulled out toward an opposite side with respect to the mounting direction D, so that the discharge opening shutter 23 is separated from the shutter contact portion 42*b*, and the discharge opening lock 24 is separated from the lock contact portion 49. The discharge opening shutter 23 released from the shutter contact portion 42*b* is moved from the open position to the closed position by the urging force of the shutter spring 231. The discharge opening lock 24 released from the lock contact portion 49 is moved from the lock release position to the lock position by the urging force of the lock spring 241.

Thus, in interrelation with the demounting of the toner cartridge C from the printer main body A, the receiving opening shutter 43 is moved from the open position to the closed position, so that the residual toner receiving opening 42*a* of the toner cartridge C is closed. Further, in interrelation with the demounting of the toner cartridge C from the printer main body A, the receiving opening lock 48 is in a state in which the receiving opening lock 48 restricts movement of the receiving opening shutter 43, moved to the closed position, toward the open position. That is, it is possible to prevent that the residual toner receiving opening 42*a* of the toner cartridge C taken out to the outside of the printer main body A is unintentionally opened.

As described above, according to this embodiment, even when a force is exerted on the receiving opening shutter 43 by that the user touches the receiving opening shutter 43 provided to the toner cartridge C or by the like manner, it is possible to prevent the residual toner receiving opening 42*a* to be unintentionally opened.

Incidentally, in this embodiment, the discharge opening lock 24 is disposed on one side (Z1 direction) in the Z direction with respect to the residual toner discharge opening 10*d* (part (b) of FIG. 26). On the other hand, the receiving opening lock 48 is disposed on the other side (Z2 direction) in the Z direction with respect to the residual toner receiving opening 42*a* (FIG. 32). That is, a constitution in which in the mounting state of the process cartridge B and the toner cartridge C, relative to the residual toner discharge opening 10*d* and the residual toner receiving opening 42*a*, the discharge opening lock 24 is positioned on one side and the receiving opening lock 48 is positioned on the other side is employed. In other words, inside and outside the process cartridge B and the toner cartridge C with respect to the longitudinal direction (Z direction), the discharge opening lock 24 and the receiving opening lock 48 are disposed, respectively.

In other words, the restricting member (receiving opening lock 48) is disposed on one side relative to the opening (residual toner receiving opening 42*a*) and the discharge opening (residual toner discharge opening 10*d*) in the direction of the rotational axis (shutter rotational axis 43*c*). The second restricting member (discharge opening lock 24) is disposed on the other side relative to the opening and the discharge opening in the direction of the rotational axis.

By this constitution, with respect to the longitudinal direction (Z direction) of the process cartridge B and the toner cartridge C, spaces on both sides of the residual toner discharge opening 10*d* and the residual toner receiving opening 42*a* are utilized, so that space saving can be realized.

MODIFIED EMBODIMENT

In the above-described embodiment, an example in which the receiving opening lock 48 is provided rotatably was described.

As a modified embodiment, an example in which a receiving opening lock 480 which is linearly movable is provided will be described using parts (a) and (b) of FIG. 41. The receiving opening lock 480 is an example of the restricting member. In the following, elements represented by reference numerals or symbols common to this modified embodiment and the above-described embodiment basically have the same constitutions and functions as those described in the above-described embodiment unless otherwise specified, and a portion different from the above-described embodiment unless otherwise specified, and a portion different from the above-described embodiment will be principally described.

Part (a) of FIG. 41 is a perspective view showing a state in which the receiving opening shutter 43 is in the closed position and the receiving opening lock 480 is in the lock position. Part (b) of FIG. 41 is a perspective view showing a state in which the receiving opening shutter 43 is in the open position and the receiving opening lock 480 is in the lock release position.

The receiving opening lock 480 is supported by the non-drive-side side cover 60 or the accommodating lid 42 and is provided so as to be linearly movable (slidable) in a predetermined movement direction M. The receiving opening lock 480 is movable to a lock position (part (a) of FIG. 41, engaging position) where the receiving opening lock 480 engages with the receiving opening shutter 43 and a lock release position (part (b) of FIG. 41, engagement release position) where engagement of the receiving opening lock 480 with the receiving opening shutter 43 is released.

The movement direction M of the receiving opening lock 480 is a direction crossing (preferably perpendicular to) a direction (Z direction) of the shutter rotational axis 43*c*. The movement direction M may be a direction along the mounting direction D and may be substantially parallel to the mounting direction D.

The receiving opening lock 480 includes a first engaging portion 480*a* engaging with the first portion-to-be-engaged 43*a* of the receiving opening shutter 43 and a second engaging portion 480*b* engaging with the second portion-to-be-engaged 43*b* of the receiving opening shutter 43. Functions of the first engaging portion 480*a* and the second engaging portion 480*b* are basically the same as the functions of the first engaging portion 48*a* and the second engaging portion 48*b* in the above-described embodiment.

The receiving opening lock 480 is urged toward the lock position by an unshown urging spring. Further, the receiving opening lock 480 includes a portion-to-be-contacted 480*f* (portion-to-be-pressed) to which the lock contact portion 23*f* (part (a) of FIG. 26) of the process cartridge B contacts during the mounting of the process cartridge C.

The receiving opening lock 480 is moved from the lock position to the lock release position by being projected at the portion-to-be-contacted 480*f* by the lock contact portion 23*f* in interrelation with the mounting of the toner cartridge C to the printer main body A. Further, in interrelation with demounting of the toner cartridge C from the printer main body A, by an urging force of the urging spring, the receiving opening lock 480 is moved from the lock release position to the lock position.

Also, in a constitution of this modified embodiment, an advantage similar to the advantage of the above-described embodiment can be obtained.

OTHER EMBODIMENTS

In the above-described embodiments, as an example of the "cartridge", description was made by citing the toner cartridge C provided with the toner supplying portion 30 and the residual toner collecting portion 40 and the process cartridge B provided with the photosensitive drum 11. The cartridge may be a cartridge (residual toner collecting container) provided with only a toner accommodating portion for accommodating the residual toner. Further, the cartridge may also be a cartridge provided with only a toner accommodating portion for accommodating toner for being supplied to the process cartridge or the developing unit. The "opening" may be an opening for permitting supply of the toner to an outside of the contact.

The discharge opening shutter 23 which is slidable (linearly movable) and the discharge opening lock 24 for restricting the movement of the discharge opening shutter 23, which are in the above-described embodiments may be provided to the residual toner receiving opening 42*a* or the toner discharge opening 34*a* of the toner cartridge C. Further, the rotatable receiving opening shutter 43 and the receiving opening lock 48 for restricting the movement of the receiving opening shutter 43, which are in the above-described embodiments may be provided to the residual toner discharge opening 10*d* of the process cartridge B.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-177813 filed on Oct. 13, 2023, which is hereby incorporated by reference herein in its entirety.

What is claimed is:

1. A cartridge comprising:

a toner accommodating portion configured to accommodate toner and provided with an opening through which the toner is received;

a shutter rotatable about a rotational axis between a closed position where the shutter closes the opening and an open position where the shutter opens the opening, the shutter including a first end portion and a second end portion opposite from the first end portion with respect to a direction of the rotational axis; and a restricting member provided on a side of the second end portion of the shutter, the restricting member including a first engaging portion, and the restricting member being movable between an engaging position where the first engaging portion engages with the shutter so as to restrict rotation of the shutter from the closed position to the open position and a released position where engagement between the first engaging portion and the shutter is released so that the rotation of the shutter from the closed position to the open position is allowed, wherein the restricting member includes a second engaging portion engageable with the shutter so that when the shutter is in the closed position, movement of the restricting member relative to the shutter in a direction from the first end portion toward the second end portion is restricted.

2. The cartridge according to claim 1, wherein the rotational axis is a first rotational axis, and wherein the restricting member is rotatable about a second rotational axis extending in a direction crossing the direction of the first rotational axis.

3. The cartridge according to claim 1, wherein the restricting member is linearly movable in a direction crossing the direction of the rotational axis.

4. The cartridge according to claim 1, wherein the restricting member is supported movably between the engaging position and the released position by a frame constituting the toner accommodating portion.

5. The cartridge according to claim 1, wherein the shutter includes a portion-to-be-engaged with which the first engaging portion engages, and wherein one of the first engaging portion and the portion-to-be-engaged has a projected shape projected in the direction of the rotational axis in a state in which the shutter is in the closed position and the restricting member is in the engaging position, and the other of the first engaging portion and the portion-to-be-engaged has a recessed shape engaging with the projected shape.

6. The cartridge according to claim 1, wherein the shutter includes a portion-to-be-engaged with which the second engaging portion engages, and wherein one of the second engaging portion and the portion-to-be-engaged has a projected shape projected in a direction crossing the rotational axis in a state in which the shutter is in the closed position and the restricting member is in the engaging position, and the other of the second engaging portion and the portion-to-be-engaged has a recessed shape engaging with the projected shape.

7. The cartridge according to claim 6, wherein the rotational axis is a first rotational axis, wherein the restricting member is rotatable about a second rotational axis extending in a direction crossing a direction of the first rotational axis, and wherein when the recessed shape is viewed in a direction of the second rotational axis, the recessed shape is a groove shape such that the recessed shape opens toward one side of a movement direction in which the second engaging portion is moved about the second rotational axis.

8. The cartridge according to claim 1, wherein the restricting member has a contact surface facing in a direction from the first end portion toward the second end portion in a state in which the restricting member is in the engaging position, wherein the shutter has a surface-to-be-contacted facing in a direction from the second end portion toward the first end portion in a state in which the shutter is in the closed position, and wherein the movement of the restricting member relative to the shutter in the direction from the first end portion toward the second end portion is restricted by contact of the contact surface with the surface-to-be-contacted.

9. The cartridge according to claim 8, wherein the toner accommodating portion includes a supporting portion configured to support the restricting member, and wherein in the direction of the rotational axis, a contact position between the contact surface and the surface-to-be-contacted is different from a position of the supporting portion.

10. The cartridge according to claim 1, wherein the toner accommodating portion includes a part positioned on a side upstream of the rotational axis in a mounting direction of the cartridge to a main assembly of an image forming apparatus, and includes a part overlapping with the rotational axis of the shutter as viewed in the mounting direction.

11. The cartridge according to claim 1, further comprising an urging member configured to urge the restricting member toward the engaging position, and wherein the restricting member further includes a portion-to-be-pressed, and the restricting member is movable from the engaging position to the released position in a case where the portion-to-be-pressed is pressed, and is moved from the released position to the engaging position by an urging force of the urging member in a case where pressing of the portion-to-be-pressed is released.

12. The cartridge according to claim 1, wherein residual toner is received from an outside of the cartridge through the opening and is accommodated in the toner accommodating portion.

13. The cartridge according to claim 1, wherein the toner accommodated in the toner accommodating portion is supplied to an outside of the cartridge through the opening.

14. An image forming apparatus comprising:

a cartridge according to claim 1; and a main assembly to which the cartridge is detachably mountable.

15. The image forming apparatus according to claim 14, further comprising a process cartridge detachably mountable to the main assembly, wherein the process cartridge includes a photosensitive drum, a cleaning member configured to clean a surface of the photosensitive drum, and a discharge opening through which residual toner collected by the cleaning member is discharged, wherein the discharge opening and the opening communicate with each other in a state in which the process cartridge and the cartridge are mounted to the main assembly, and wherein the cartridge receives the residual toner, discharged through the discharge opening, through the opening and accommodates the residual toner in the toner accommodating portion.

16. The image forming apparatus according to claim 15, wherein the cartridge includes a residual toner collecting portion configured to receive the residual toner discharged through the discharge opening and to collect the residual toner in the toner accommodating portion, and includes a toner supplying portion configured to supply the toner to the process cartridge.

17. The image forming apparatus according to claim 15, wherein the process cartridge further includes a second shutter movable between a second closed position where the second shutter closes the discharge opening and a second open position where the second shutter opens the discharge opening, and wherein a portion-to-be-pressed of the restricting member is pressed by the second shutter in a case where the cartridge is mounted to the main assembly in a state in which the process cartridge is mounted to the main assembly.

18. The image forming apparatus according to claim 17, wherein the process cartridge further includes a second restricting member configured to restrict movement of the second shutter from the second closed position toward the second open position, wherein the restricting member is provided on one side relative to the opening and the discharge opening with respect to the direction of the rotational axis, and wherein the second restricting member is provided on the other side relative to the opening and the discharge opening with respect to the direction of the rotational axis.

19. The cartridge according to claim 1, wherein the first engaging portion is located farther in the direction from the first end portion toward the second end portion when the restricting member is in the released position than when the restricting member is in the engaging position.

20. A cartridge comprising:

a toner accommodating portion configured to accommodate toner;

an opening communicating with the toner accommodating portion;

a shutter movable between a closed position where the shutter closes the opening and an open position where the shutter opens the opening; and a restricting member rotatable about a rotational axis between an engaging position where the restricting member engages with the shutter so as to restrict movement of the shutter from the closed position to the open position and a released position where engagement between the restricting member and the shutter is released so as to allow the movement of the shutter from the closed position to the open position, wherein the shutter includes a guiding portion configured to guide the restricting member so as to restrict movement of the restricting member relative to the shutter in a direction of the rotational axis, and wherein the restricting member is guided by the guiding portion during movement of the restricting member from the engaging position to the released position.

21. The cartridge according to claim 19, wherein the restricting member includes a portion-to-be-guided which is guided by the guiding portion, wherein either one of the guiding portion and the portion-to-be-guided has a projected shape projected in a direction crossing the direction of the rotational axis, and the other of the guiding portion and the portion-to-be-guided has a recessed shape engaging with the projected shape, and wherein during the movement of the restricting member from the engaging position to the released position, a state in which the projected shape and the recessed shape at least partially overlap with each other as viewed in the direction of the rotational axis is maintained.

22. The cartridge according to claim 20, further comprising:

a photosensitive drum;

a cleaning member configured to clean a surface of the photosensitive drum; and a conveying member configured to convey the toner, wherein the toner accommodating portion accommodates residual toner collected from the photosensitive drum by the cleaning member, wherein the conveying member conveys the residual toner from the toner accommodating portion toward the opening, and wherein the residual toner is discharged to an outside of the cartridge through the opening.

* * * * *